US005742585A

United States Patent [19]
Yamamoto et al.

[11] Patent Number: 5,742,585
[45] Date of Patent: Apr. 21, 1998

[54] NETWORK FOR CONNECTING A PLURALITY OF NODES USING A PLURALITY OF CHANNELS

[75] Inventors: Mitsuru Yamamoto, Yokohama; Jun Hattori, Kawasaki, both of Japan

[73] Assignee: Canon Kabushiki Kaisha, Japan

[21] Appl. No.: 657,498

[22] Filed: Jun. 4, 1996

Related U.S. Application Data

[63] Continuation of Ser. No. 294,735, Aug. 23, 1994, abandoned.

[30] Foreign Application Priority Data

| Aug. 24, 1993 | [JP] | Japan | 5-209540 |
| Oct. 21, 1993 | [JP] | Japan | 5-263729 |
| Jul. 29, 1994 | [JP] | Japan | 6-178481 |
| Aug. 1, 1994 | [JP] | Japan | 6-180128 |
| Aug. 2, 1994 | [JP] | Japan | 6-181285 |

[51] Int. Cl.⁶ .................................. H04L 121/421
[52] U.S. Cl. .................. 370/223; 370/406; 370/535
[58] Field of Search ........................ 370/16.1, 85.5, 370/85.12, 85.15, 112, 222, 223, 224, 225, 228, 406, 535; 340/825.05, 827; 359/115, 118, 119, 124

[56] References Cited

U.S. PATENT DOCUMENTS

| 4,965,790 | 10/1990 | Nishimo et al. | 370/85.12 |
| 5,105,188 | 4/1992 | Jung et al. | 370/85.12 |
| 5,179,548 | 1/1993 | Sandesara | 370/85.12 |
| 5,307,535 | 5/1994 | Yamashita et al. | 371/11.2 |
| 5,341,364 | 8/1994 | Marra et al. | 370/16.1 |
| 5,349,583 | 9/1994 | Christensen et al. | 370/85.12 |
| 5,396,357 | 3/1995 | Goossen et al. | 359/119 |

FOREIGN PATENT DOCUMENTS 0482813  4/1992  European Pat. Off. .

OTHER PUBLICATIONS

Trans. IEICE, vol. E73, No. 10, Oct. 1990, pp. 1696–1703, Zhao et al., "Adaptive routing and control algorithms for the highly reliable bidirectional shuffle ring network".

Electronics and Comm. in Japan, vol. 73, No. 1, Jan. 1990, pp. 22–35, Mori et al., "A Method of Constructing Broadcast Multilane Ring Networks by Autonomous Switching".

Supercom/ICC '92, vol. 3, Jun. 14, 1992, pp. 1168–1172, Gerla et al., "Multilevel Optical Networks."

Nicholas F. Maxemchuk, *The Manhattan Street Network*, Proc. Globecom '85 at 255 (1986).

Nicholas F. Maxemchuk, *Routing in the Manhattan Street Network*, 35 IEEE Transactions on Communications 503 (1987).

IEEE J. Selected Areas Comm., vol. 8, No. 8, Oct. 1990, pp. 1439–1448, Karol et al., "High-Performance Optical Local and Metropolitan Area Area Networks: Enhancements of EDDI and IEEE 802.6 DQDB."

Globecom 1987, vol. 1, Nov. 15, 1987, pp. 678–683, Smith et al., "Optical Processing In Future Coherent Networks."

*Primary Examiner*—Hassan Kizou
*Attorney, Agent, or Firm*—Fitzpatrick, Cella, Harper & Scinto

[57] ABSTRACT

In a network system, a loop-shaped transmission path is constituted by multiplexing a plurality of loop-shaped transmission channels. A plurality of nodes are connected to the loop-shaped transmission path. Each of the plurality of nodes can access at least two channels of the plurality of channels multiplexed in the loop-shaped transmission path. Each of plurality of nodes has a loop-shaped transmission route which is formed via a plurality of channels and which does not exceed one round of the loop-shaped transmission path.

18 Claims, 27 Drawing Sheets

FIG. 23A

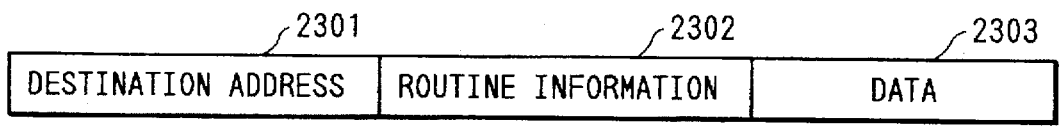

| 2301 | 2302 | 2303 |
|---|---|---|
| DESTINATION ADDRESS | ROUTINE INFORMATION | DATA |

FIG. 23B

| 2301 | |
|---|---|
| DESTINATION ADDRESS | DATA |

FIG. 25

| WAVELENGTH | CHANNEL NUMBER | TRANSMISSION DIRECTION | |
|---|---|---|---|
| $\lambda_1$ | 0 0 | EVEN | RIGHT |
| $\lambda_2$ | 0 1 | ODD | LEFT |
| $\lambda_3$ | 1 0 | ODD | LEFT |
| $\lambda_4$ | 1 1 | EVEN | RIGHT |
| $\lambda_5$ | 1 0 0 | ODD | LEFT |
| $\lambda_6$ | 1 0 1 | EVEN | RIGHT |
| $\lambda_7$ | 1 1 0 | EVEN | RIGHT |
| $\lambda_8$ | 1 1 1 | ODD | LEFT |
| $\lambda_9$ | 1 1 0 0 | EVEN | RIGHT |
| $\lambda_{10}$ | 1 1 0 1 | ODD | LEFT |
| $\lambda_{11}$ | 1 1 1 0 | ODD | LEFT |
| $\lambda_{12}$ | 1 1 1 1 | EVEN | RIGHT |

NETWORK FOR CONNECTING A PLURALITY OF NODES USING A PLURALITY OF CHANNELS

This application is a continuation of application Ser. No. 08/294,735 filed Aug. 23, 1994, abandoned.

BACKGROUND OF THE INVENTION

1. Field of the Invention

The present invention relates to a network for connecting a plurality of nodes using a plurality of channels.

2. Related Background Art

Most of conventional networks having a plurality of channels are constituted by a plurality of unidirectional or bidirectional channels and a plurality of nodes for accessing all these channels to transmit/receive data. In such a network, high-speed, large-capacity data transfer can be realized using a plurality of channels. On the other hand, since each node must execute transmission/reception processing for all channels, processing cost is high, and the node arrangement tends to be complicated since it requires a large number of transmitters and receivers, and the like.

In order to eliminate the above-mentioned drawbacks, a system for regularly selecting channels to be accessed by nodes to decrease the number of channels to be accessed by each node to be smaller than the total number of channels has been proposed. A system, disclosed in Japanese Laid-Open Patent Application No. 64-24539 as an example of the above-mentioned system, has a unidirectional loop-shaped transmitting path obtained by multiplexing $d^k$ (d and k are natural numbers equal to or larger than 2) channels having the same transmission direction, and each node is arranged to access d channels which are regularly selected. In this arrangement, when packet transmission is performed between arbitrary nodes, an intermediate node located at an intermediate position between transmitting and receiving nodes selects a channel for transmitting a packet in accordance with a proper routing algorithm, and repeats and transfers the packet, thus realizing a communication even when the transmitting and receiving nodes do not access the same channel.

FIG. 1 shows the arrangement of the conventional system when the number of channels to be multiplexed is 8, and the number of channels to be accessed by each node is 2 (i.e., d=2 and k=3). Referring to FIG. 1, loop-shaped channels 101 to 108 have a counterclockwise transmission direction in FIG. 1. Each of nodes 109 to 144 is connected to two channels indicated by marks ○.

In this conventional system, since the number of channels to be accessed by each node is small, the node arrangement can be simplified. However, the average transmitting route length of a packet from a transmitting node to a receiving node is always more than half a round of the transmitting path in the case of a uniform traffic distribution. Furthermore, in terms of the characteristics of the network arrangement, the transmitting route length from a given node to a near node particularly becomes as large as one round or more of the transmitting path. For example, when the transmitting node is the node 109 and the receiving node is the node 110 adjacent to the node 109, an example of the shortest transmitting route is one which regenerates data from the transmitting node 109 via the intermediate nodes 113, 117, 121, 125, 129, 133, 137, and 143, and reaches the receiving node 110, and this transmitting path becomes more then one round of the transmitting path (in this case, data is transmitted from the node 109 to 137 using the channel 101, changes the channel to the channel 103 at the intermediate node 137, and thereafter, is transmitted to the receiving node 110 using the channel 103). Similarly, when the transmitting node is the node 109, the transmitting route length becomes more than one round of the transmitting path when the receiving node is the node 111, 112, 115, or 116.

Such an increase in transmitting route length leads to an increase in transmission delay time of a packet, and disturbs improvement of the throughput of the network.

The following network will be described as the second prior art. A Manhattan street network announced by Maxemchuk in "The Manhattan street network", Proc. GLOBECOM '85, New Orleans, pp. 255–261 (1986), can be applied from a small-scale network to a large-scale network, and various examinations have been made. In the Manhattan street network as this prior art, as shown in FIG. 2, a plurality of nodes 206, 207, . . . , 241 are arranged in a two-dimensional matrix and are connected via a plurality of vertical loop-shaped transmitting paths 242, 243, 244, 245, 246, and 247, and a plurality of horizontal loop-shaped transmitting paths 248, 249, 250, 251, 252, and 253. The transmission directions of these vertical and horizontal transmitting paths are reversed every other path.

In this prior art, the presence of a route for transmitting information from an arbitrary node to another arbitrary node is guaranteed. The repeating and route selection operations for information transmitted from a transmitting node are realized by nodes on the route to transmit the information to a target receiving node.

However, in the above-mentioned prior art, in order to connect N nodes, loop-shaped transmitting paths as large as $2\sqrt{N}$ paths are required. For this reason, laying, maintenance, and management of the network are complicated.

As the third prior art for solving the above-mentioned problem, a prior art for one-dimensionally arranging nodes using a cable such as a multi-core optical fiber which bundles a plurality of transmitting paths while maintaining the logical connection relationship among nodes of the Manhattan street network is known. FIG. 3 shows the above-mentioned third prior art, and illustrates the arrangement for connecting 36 nodes using a 12-core optical fiber. In FIG. 3, only 18 nodes are illustrated.

Referring to FIG. 3, first, second, third, fourth, fifth, and sixth cores 254, 255, 256, 257, 258, and 259 of the optical fiber respectively correspond to the vertical loop-shaped transmitting paths 242, 243, 244, 245, 246, and 247 in the second prior art, and seventh, eighth, ninth, 10th, 11th, and 12th cores 260, 261, 262, 263, 264, and 265 respectively correspond to the horizontal loop-shaped transmitting paths 248, 249, 250, 251, 252, and 253 in the second prior art. In the third prior art, complexity associated with laying, maintenance, and management of the transmitting path can be improved slightly. However, an optical fiber which has cores as large as $2\sqrt{N}$ cores must be used for N nodes.

As a method of solving the problem of the third prior art, it is possible to realize the system of the third prior art using a single-core optical fiber by optical wavelength multiplexing using a plurality of transmitting wavelengths. FIG. 4 shows an example of the arrangement of a network constituted by 16 nodes 274 to 289 using eight independent wavelengths $\lambda_1$ to $\lambda_8$ 266 to 273. Each node transmits/receives light components of only two designated wavelengths indicated by marks ○. In this case, the wavelengths are selected so as not to interfere with each other in transmission/reception using different wavelengths. In this arrangement, a plurality of channels constituted by the multi-core optical fiber in the third prior art are replaced by channels using light components of different wavelengths. In this manner, the Manhattan street network can be realized by using a single-core optical fiber. However, in this case, a wavelength-multiplexed transmitting path having wavelengths as large as $2\sqrt{N}$ wavelengths must be constituted for N nodes. In addition, the arrangement of each node used in this network is not known.

SUMMARY OF THE INVENTION

The present invention has been made in consideration of the above-mentioned problems, and has as its object to provide a low-cost network which can reduce the number of so-called channels such as the number of wiring lines in a network, the number of cores of a multi-core optical fiber, the number of wavelengths in a wavelength-multiplexed transmission system, the number of media to be multiplexed in other multiplex transmission systems, and the like, can easily connect a larger number of nodes, realizes high-speed, large-capacity transmission, and allows a simple arrangement of each node.

More specifically, the present invention provides the following network.

According to the present invention, there is provided a network constituted by connecting a plurality of nodes, comprising:
 a loop-shaped transmission path constituted by multiplexing a plurality of loop-shaped transmission channels; and
 a plurality of nodes which are connected to the loop-shaped transmission path and each of which can access at least two channels of the plurality of channels multiplexed in the loop-shaped transmission path,
 wherein each of the plurality of nodes can form a loop-shaped transmission route which is formed via a plurality of channels and does not exceed one round of the loop-shaped transmission path.

According to the present invention, there is also provided a network constituted by connecting a plurality of nodes, comprising:
 a loop-shaped transmission path constituted by multiplexing a plurality of loop-shaped transmission channels, the plurality of channels being divided into a first channel group consisting of one or a plurality of channels, a second channel group consisting of one or a plurality of channels having a transmission direction opposite to a transmission direction of the first channel group, and a third channel group consisting of one or a plurality of channels;
 a plurality of nodes divided into first and second node groups, each of the nodes in the first node group accessing one or a plurality of channels in the first channel group and one or a plurality of channels in the third channel group, and each of the nodes in the second node group accessing one or a plurality of channels in the second channel group and one or a plurality of channels in the third channel group; and
 connection means for connecting the first and second channel groups.

According to the present invention, there is also provided a network constituted by connecting a plurality of nodes, comprising:
 a loop-shaped transmission path constituted by multiplexing a plurality of loop-shaped transmission channels, the plurality of channels being divided into a first channel group consisting of one or a plurality of channels, a second channel group consisting of one or a plurality of channels having a transmission direction opposite to a transmission direction of the first channel group, and a third channel group consisting of one or a plurality of channels; and
 a plurality of nodes divided into first and second node groups, each of the nodes in the first node group accessing one or a plurality of channels in the first channel group and one or a plurality of channels in the third channel group, and each of the nodes in the second node group accessing one or a plurality of channels in the second channel group and one or a plurality of channels in the third channel group,
 wherein each of the first and second node groups is constituted by subgroups in units of a plurality of neighboring nodes, and a loop-shaped transmission route is formed by connecting the nodes at a given end position in the plurality of subgroups in the single node group via one of the first and second channel groups and the third channel group.

According to the present invention, there is also provided a network constituted by connecting a plurality of nodes, comprising:
 a loop-shaped transmission path constituted by multiplexing a plurality of loop-shaped transmission channels, the plurality of channels being divided into a first channel group consisting of one or a plurality of channels, and a second channel group consisting of one or a plurality of channels; and
 a plurality of nodes for accessing at least the first channel group, the plurality of nodes being divided into a plurality of node groups in units of a plurality of neighboring nodes, at least the two nodes at two ends of each of the plurality of node groups accessing an identical channel, having a transmission direction opposite to a transmission direction of the first channel group in the node group, of the channels in the second channel group.

According to the present invention, there is also provided a network constituted by connecting a plurality of nodes, comprising:
 a loop-shaped transmission path constituted by multiplexing a plurality of loop-shaped transmission channels, the plurality of channels being divided into a first channel group consisting of one or a plurality of channels, and a second channel group consisting of one or a plurality of channels having a transmission direction opposite to a transmission direction of the first channel group; and
 a plurality of nodes each for accessing both the first and second channel groups.

BRIEF DESCRIPTION OF THE DRAWINGS

FIGS. 23A and 23B show the formats of packets used in the present invention;

FIG. 25 is a table showing channel numbers of the ninth embodiment;

DETAILED DESCRIPTION OF THE PREFERRED EMBODIMENTS (First Embodiment)

Figure 5:
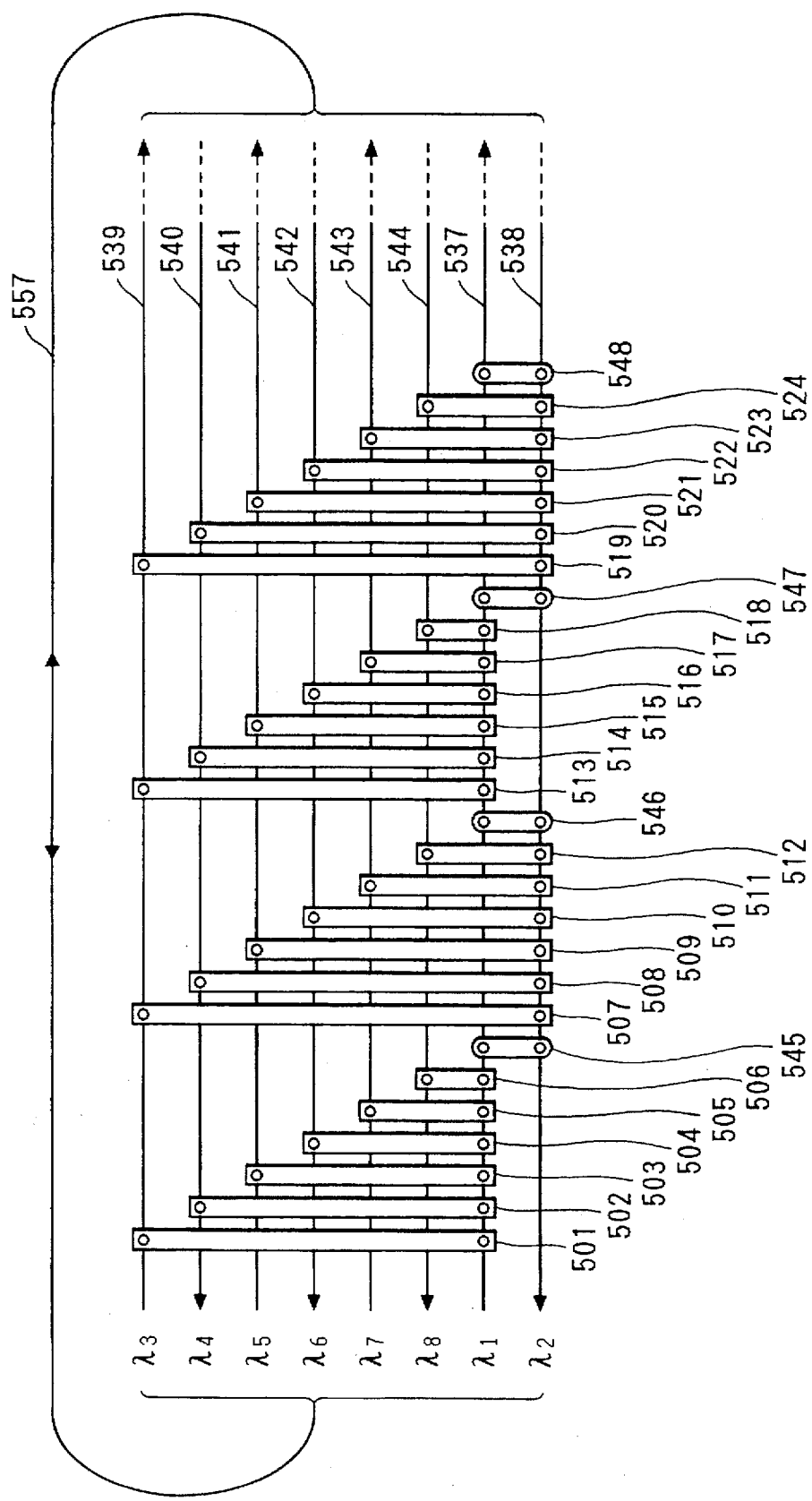
FIG. 5 is a schematic view showing the arrangement of a network according to the first embodiment of the present invention.

FIG. 5 shows the first embodiment of the present invention. In this embodiment, a communication control means of the Manhattan street network can be used. FIG. 5 illustrates a connection example obtained when 36 nodes are connected via eight channels each of which forms a loop-shaped transmitting route and which are formed by multiplexing eight wavelengths in a single-core optical fiber ring. FIG. 5 shows only 24 nodes for the sake of simplicity.

FIG. 5 illustrates nodes 501 to 524. Eighteen nodes including a subgroup of the nodes 501 to 506, a subgroup of the nodes 513 to 518, and a subgroup of nodes 525 to 530 (not shown) constitute a first node group. Other nodes constitute a second node group and similarly forms subgroups. Each node accesses two assigned channels indicated by marks ○ in FIG. 5, i.e., performs transmission/reception using two wavelengths. The internal arrangement of each of these nodes will be described later. Eight channels 537 to 544 are formed in a single-core optical fiber ring 557 using different wavelengths $\lambda_1, \lambda_2, \lambda_3, \lambda_4, \lambda_5, \lambda_6, \lambda_7$, and $\lambda_8$. In this case, as the wavelengths, $\lambda_1=1.50$ µm, $\lambda_2=1.51$ 82 m, $\lambda_3=1.52$ µm, $\lambda_4=1.53$ µm, $\lambda_5=1.54$ µm, $\lambda_6=1.55$ µm, $\lambda_7=1.56$ µm, and $\lambda_8=1.57$ µm are used.

The channel 537 formed by the wavelength $\lambda_1$ corresponds to a first channel group (one channel in this embodiment), the channel 538 formed by the wavelength $\lambda_2$ corresponds to a second channel group (one channel in this embodiment), and the six channels 539 to 544 formed by the wavelengths $\lambda_3$ to $\lambda_8$ constitute a third channel group. Each channel in the third channel group can form a loop-shaped transmission route of itself. The transmission directions of the channels 539, 541, and 543 are the same as that of the first channel, and the transmission directions of the channels 540, 542, and 544 are the same as that of the second channel.

The nodes in the first node group access the first channel, and the nodes in the second node group access the second channel. The subgroups in the first and second node groups access the channels in the third channel group, so that channels to be accessed by the nodes in each subgroup do not overlap each other.

Furthermore, in FIG. 5, connection means 545 to 548 are used for connecting the first and second channels 537 and 538. Each of these connection means has a terminating function of receiving a transmission signal which is transmitted to the right (FIG. 5) at the wavelength $\lambda_1$, transmitting the received signal in the opposite direction (to the left in FIG. 5) at the wavelength $\lambda_2$, and preventing this optical signal from being transmitted to the right beyond the connection means, and also has a terminating function of receiving a transmission signal which is transmitted to the left at the wavelength $\lambda_2$, transmitting the received signal in the opposite direction (to the right) at the wavelength $\lambda_1$, and preventing this optical signal from being transmitted to the left beyond the connection means. These connection means are respectively arranged between the subgroups.

The internal arrangement of each of these connection means will be described later.

Figure 6:
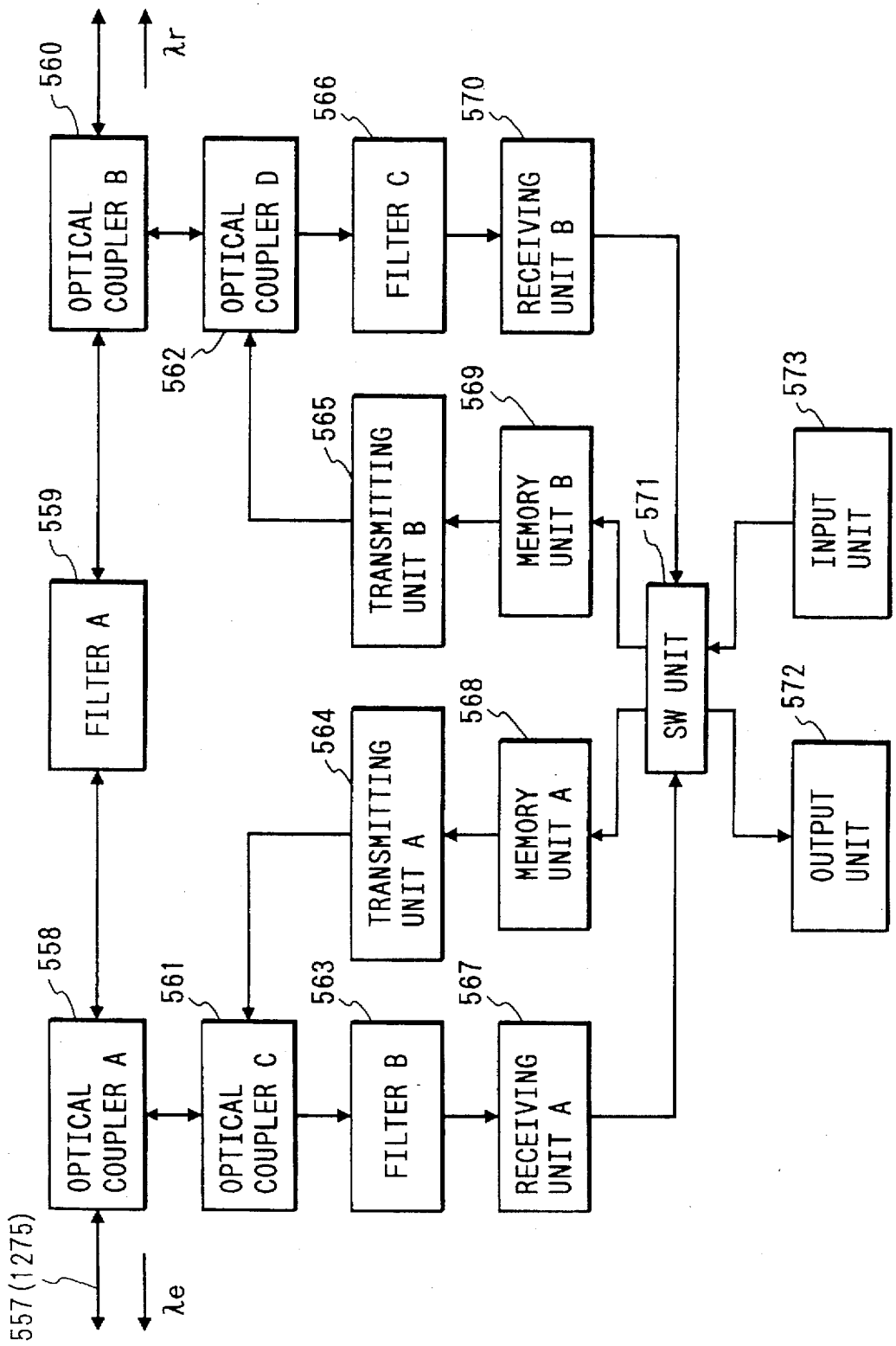
FIG. 6 is a block diagram showing the arrangement of a node used in the network of the present invention.

FIG. 6 shows the arrangement of a node such as the nodes 502, 504, 506, 507, 509, 511, 514, and the like according to the first embodiment of the present invention, each of which transmits/receives two wavelengths ($\lambda_r$ and $\lambda_e$) having different transmission directions.

Referring to FIG. 6, the single-core optical fiber 557 serves as a transmission medium of the channels having eight wavelengths shown in FIG. 5. In FIG. 6, a filter A 559 is used for cutting off $\lambda_r$ and $\lambda_e$ as the wavelengths used in transmission/reception of the node, and for passing wavelengths other than $\lambda_r$ and $\lambda_e$. The node comprises optical couplers A 558, B 560, C 561, and D 562. The optical coupler A 558 divides and outputs an optical signal input from the left (FIG. 6) to the coupler A 559 and the optical coupler C 561. Also, the optical filter 558 multiplexes output light from the optical coupler C 561 with output light from the filter A 559, and outputs the multiplexed optical signal to the left in FIG. 6. Similarly, the optical coupler B has a function of dividing and outputting an optical signal input from the right in FIG. 6 to the filter A 559 and the optical coupler D 562, and a function of multiplexing output light from the optical coupler 562 with output light from the filter A 559, and outputting the multiplexed optical signal to the right in FIG. 6. The optical coupler C 561 has a function of outputting output light from the optical coupler A 558 to a filter B 563, and outputting output light from a transmitting unit A 564 to the optical coupler A 558. Similarly, the optical coupler D 562 has a function of outputting output light from the optical coupler B 560 to a filter C 566, and outputting an output from a transmitting unit B 565 to the optical coupler B 560.

The filter B 563 has a function of passing only the wavelength $\lambda_r$ to be transmitted to the right of the transmitting/receiving wavelengths of the node indicated by marks ○ in FIG. 5, and cutting off all other wavelengths. Similarly, the filter C 566 has a function of passing only the wavelength $\lambda_e$ to be transmitted to the left, and cutting off all other wavelengths.

Each of the transmitting units A 564 and B 565 has a function of converting an electrical signal output from a memory unit A 568 or B 569 into an optical signal having a predetermined wavelength ($\lambda_e$ or $\lambda_r$), and outputting the converted optical signal. Each of receiving units A 567 and B 570 has a function of receiving an optical signal output from the filter B or C, converting the optical signal into an electrical signal, and outputting the converted electrical signal.

The memory units A 568 and B 569 are used for buffering an electrical signal output from an SW unit 571 as needed.

When an electrical signal received by the receiving unit A 567 or B 570 requires repeating, the SW unit 571 refers to a repeating route and outputs the electrical signal to the memory unit A 568 or B 569. When repeating is not required, i.e., when the received signal is addressed to the self node, the SW unit 571 outputs the signal to an output unit 572. Furthermore, for an electrical signal output from an input unit 573, the SW unit 571 refers to a repeating route on the basis of the node number of a transmission destination, and outputs the electrical signal to the memory unit A 568 or B 569.

The output unit 572 is used for connecting a signal transmitted to the self node to a required external device. The input unit 573 is used for inputting a signal output from the external device.

Figure 7:
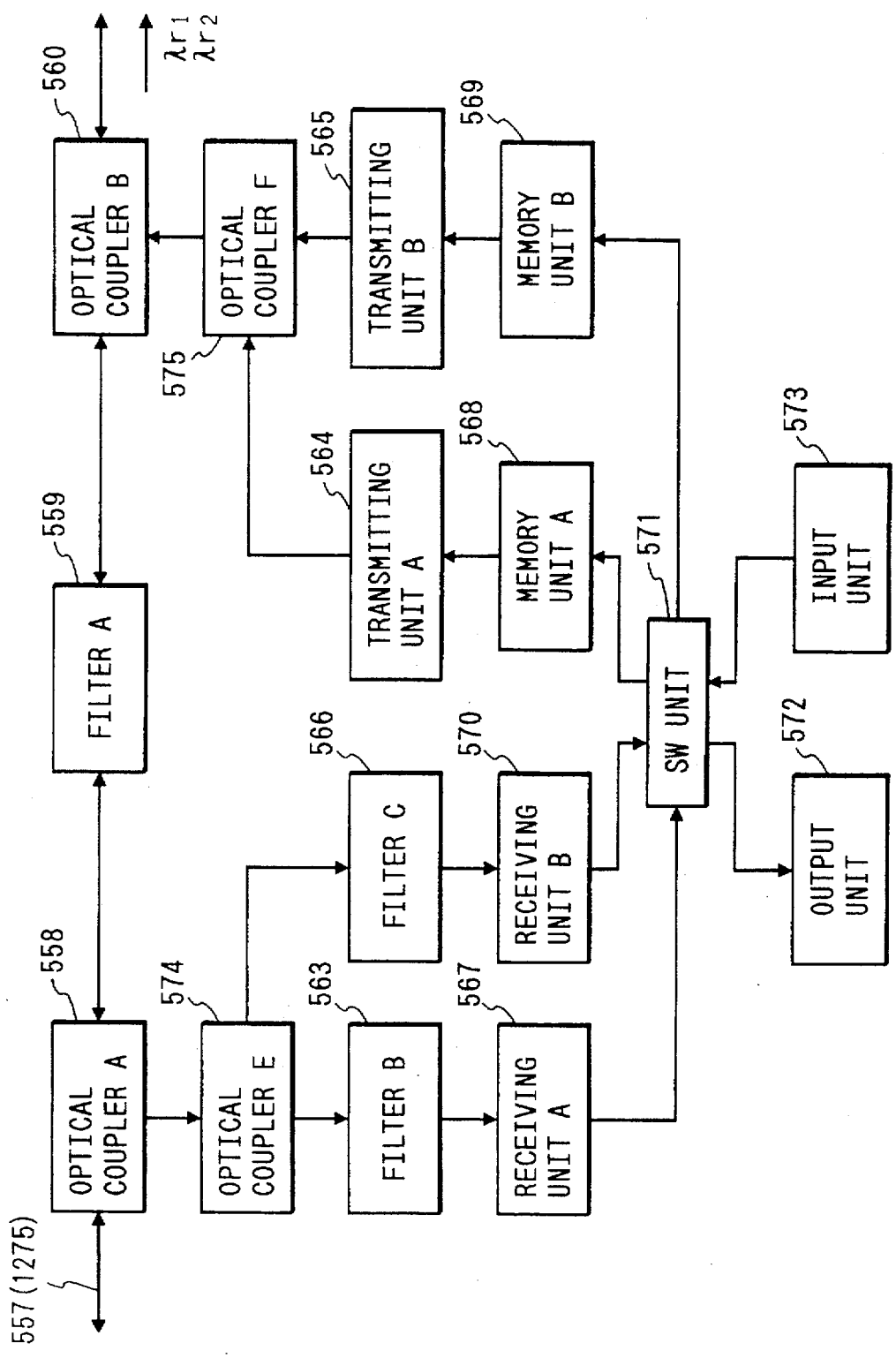
FIG. 7 is a block diagram showing another arrangement of the node used in the network of the present invention.

FIG. 7 shows the arrangement of a node such as the node 501, 503, 505, 513, 515, 517, and the like according to the first embodiment of the present invention, each of which transmits/receives two wavelengths to be transmitted to the right in FIG. 7. Referring to FIG. 7, blocks denoted by the same reference numerals as those of the blocks in FIG. 6 provide the same functions by replacing $\lambda_r$ and $\lambda_e$ in FIG. 6 by $\lambda_{r1}$ and $\lambda_{r2}$, respectively. In FIG. 7, an optical coupler E 574 divides light output from the optical coupler A 558, and outputs the divided optical signals to the filters B 563 and C 566. An optical coupler F 575 multiplexes optical signals output from the transmitting units A 564 and B 565, and outputs the multiplexed optical signal to the optical coupler B 560.

The nodes 505, 510, 512, 520, 522, 524, and the like shown in FIG. 5 according to the first embodiment of the present invention are those for transmitting/receiving two wavelengths $\lambda_{e1}$ and $\lambda_{e2}$ to be transmitted to the left. Each of these nodes has an arrangement obtained by reversing the arrangement shown in FIG. 7 in the right-and-left direction, and by replacing $\lambda_{r1}$ and $\lambda_{r2}$ by $\lambda_{e1}$ and $\lambda_{e2}$, respectively.

Figure 8:
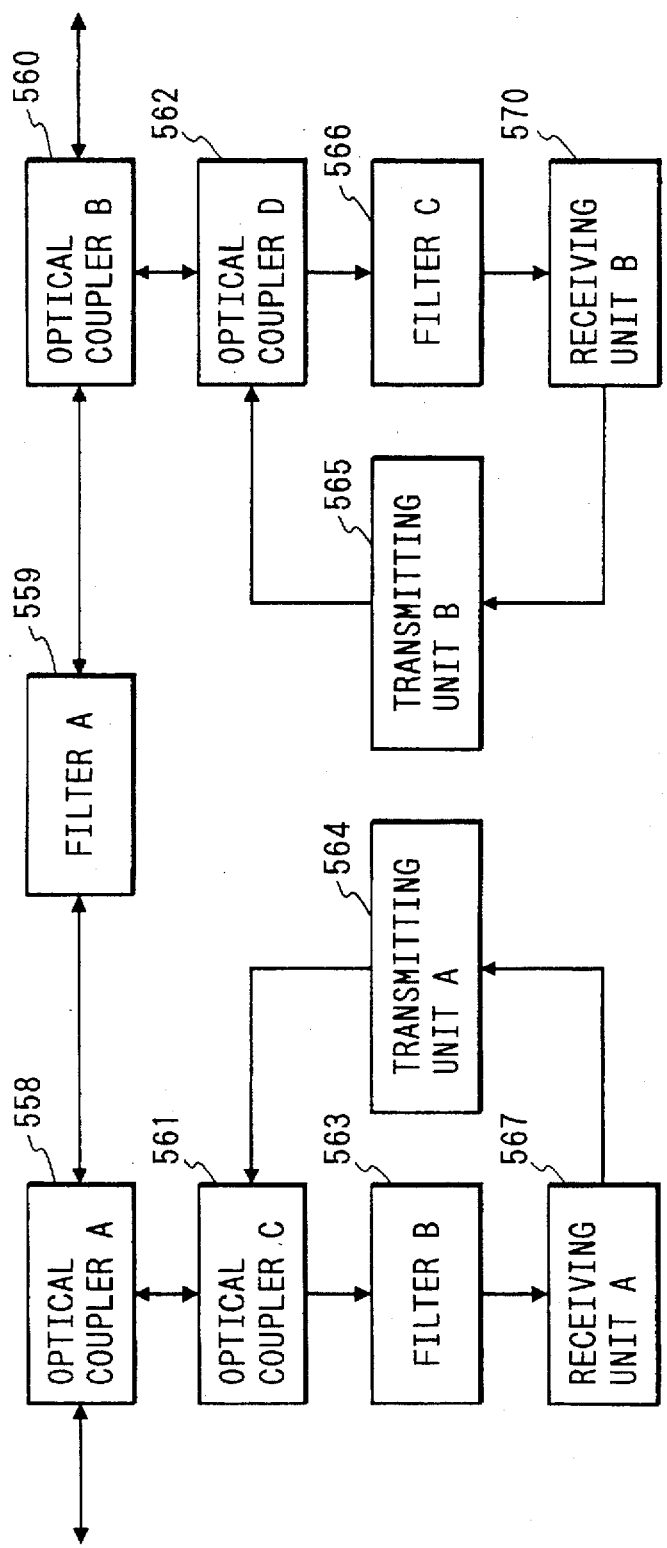
FIG. 8 is a block diagram showing the arrangement of a connection means used in the first embodiment.

FIG. 8 shows the arrangement of each of the connection means 545 and 547 according to the first embodiment of the present invention.

Referring to FIG. 8, blocks denoted by the same reference numerals as those of the blocks shown in FIG. 6 provide the same functions by replacing $\lambda_r$ by $\lambda_1$ as the first channel and $\lambda_e$ by $\lambda_2$ as the second channel.

In the connection means with the arrangement shown in FIG. 8, an optical signal which is transmitted at the wavelength $\lambda_1$ from the left to the right in FIG. 8 is converted into a signal of the wavelength $\lambda_2$, and the converted signal is transmitted to the left. On the other hand, an optical signal transmitted at the wavelength $\lambda_2$ from the right to the left is converted into a signal of the wavelength $\lambda_1$, and the converted signal is transmitted to the right. Note that the arrangement of each of connection means 546 and 548 is the same as that shown in FIG. 8, and $\lambda_1$ and $\lambda_2$ are respectively replaced by $\lambda_2$ and $\lambda_1$.

The operation according to the first embodiment will be described below with reference to FIGS. 5, 6, 7, and 8. In the following description, a case will be exemplified wherein a signal is to be transmitted from the node 507 to the node 524.

The node 507 as a transmitting node has the arrangement shown in FIG. 6. In this node, a wavelength corresponding to $\lambda_r$ is $\lambda_3$, and a wavelength corresponding to $\lambda_e$ is $\lambda_2$. In the node 507, when a signal to be transmitted, which is added with transmission destination information, is input from the input unit 573, the SW unit 571 examines which of $\lambda_2$ and $\lambda_3$ is used for transmitting the signal. As the examination algorithm of this embodiment, a technique described in NICHOLAS, F, MAXEMCHUK, "Routing in the Manhattan street Network", IEEE TRANSACTIONS on COMMUNICATIONS, Vol. 35, No. 5, MAY 1987, pp. 503–512 can be used. With this technique, $\lambda_3$ is determined as the transmission wavelength. The output signal from the input unit 573 is input to the memory unit B 569 and is sequentially stored at the end of a memory queue. The transmitting unit B 565 converts an electrical signal output from the memory unit B 569 into an optical signal of the wavelength $\lambda_3$, and sequentially outputs the converted signal to the optical coupler D 562. The optical signal of the wavelength $\lambda_3$ output to the optical coupler D 562 is output to the optical coupler B 560 to be multiplexed with optical signals of other wavelengths from the filter A 559, and is output onto the optical fiber 557 to propagate to the right in FIG. 6. The optical fiber 557 transmits optical signals of the wavelengths $\lambda_1$, $\lambda_3$, $\lambda_5$, and $\lambda_7$ from the left to the right, and transmits optical signals of the wavelengths $\lambda_2$, $\lambda_4$, $\lambda_6$, and $\lambda_8$ from the right to the left. These optical signals of different wavelengths are transmitted without disturbing other signals since they are not coherent with each other.

The optical signals of the wavelengths $\lambda_1$, $\lambda_3$, $\lambda_5$, and $\lambda_7$ output from the optical coupler B 560 of the node 507 are input to the neighboring node 508. The node 508 is a node for transmitting/receiving two wavelengths to be transmitted to the left, and has an arrangement horizontally symmetrical to that shown in FIG. 7.

The optical signals of the wavelengths $\lambda_1$, $\lambda_3$, $\lambda_5$, and $\lambda_7$ input from the right to the optical coupler B 560 of the node 508 are input to the filter A 539. In the node 508, as indicated by marks ○ in FIG. 5, $\lambda_{e1}$ and $\lambda_{e2}$ are respectively set to be $\lambda_2$ and $\lambda_4$, and the filter A 559 is a filter for cutting off $\lambda_2$ and $\lambda_4$. For this reason, the optical signals of $\lambda_1$, $\lambda_3$, $\lambda_5$, and $\lambda_7$ pass through the filter A 559, and are input to the optical coupler A 558. Then, these optical signals are output to the neighboring node 509.

The node 509 is a node for transmitting/receiving an optical signal of $\lambda_5$ to be transmitted to the right, and an optical signal of $\lambda_2$ to be transmitted to the left, and has an arrangement shown in FIG. 6. The optical signals of the wavelengths $\lambda_1$, $\lambda_3$, $\lambda_5$, and $\lambda_7$ input to the optical coupler A 558 of the node 509 are divided by the optical coupler A, and are output to the optical coupler C 561 and the filter A 559. The optical signals of the wavelengths $\lambda_2$, $\lambda_3$, $\lambda_5$, and $\lambda_7$ input to the optical coupler C 561 are output to the filter B 563. The filter B passes only the optical signal of the wavelength $\lambda_5$, and cuts off other optical signals. The optical signal of the wavelength $\lambda_5$ passing through the filter B 563 is received by the receiving unit A 567, and is converted into an electrical signal. Thereafter, when the transmission destination node is the self node, the electrical signal is output to the output unit 572 via the SW unit 571. On the other hand, when the transmission destination node is not the self node, according to a predetermined algorithm, the electrical signal is stored in the memory unit A 568 or B 569, the electrical signal is converted into an optical signal of the wavelength $\lambda_2$ by the transmitting unit A 564 or is converted into an optical signal of the wavelength $\lambda_5$ by the transmitting unit B 565, and the converted optical signal is output onto the optical fiber 557 via the optical couplers C and A or the optical couplers D and B.

The optical signals of the wavelengths $\lambda_1$, $\lambda_3$, $\lambda_5$, and $\lambda_7$, which signals propagate to the right, are input to the node 510. Since the node 510 is a node for transmitting/receiving two wavelengths ($\lambda_2$ and $\lambda_6$) to be transmitted to the left in the same manner as in the node 508, the optical signals of the wavelengths $\lambda_1$, $\lambda_3$, $\lambda_5$, and $\lambda_7$ are divided by the optical coupler A 558 of the node 510. The signals divided and output in one direction are cut off by the filters B 563 and C 566. On the other hand, the signals divided and output in the other direction pass through the filter A 559, and are input to the node 511.

The node 511 is a node for transmitting/receiving an optical signal of the wavelength $\lambda_7$ to be transmitted to the right, and an optical of the wavelength $\lambda_2$ to be transmitted to the left, and has an arrangement shown in FIG. 6. In the node 511, in the same manner as in the above-mentioned node 509, the optical signal of the wavelength $\lambda_7$ is converted into an electrical signal by the receiving unit 567, and thereafter, the electrical signal is transmitted from the transmitting unit A 564 as an optical signal of the wavelength $\lambda_2$, is transmitted from the transmitting unit B 565 as an optical signal of the wavelength $\lambda_7$, or is output from the output unit 572 depending on the transmission destination node information.

In this manner, the optical signals of the wavelengths $\lambda_1$, $\lambda_3$, $\lambda_5$, and $\lambda_7$, which have been transmitted to the right via the nodes 507, 508, 509, 510, 511, and 512, are input to the connection means 546. At this time, the wavelength $\lambda_3$ corresponds to an optical signal transmitted from the transmitting unit of the node 507, and the wavelengths $\lambda_5$ and $\lambda_7$ respectively correspond to optical signals transmitted from the transmitting units of the nodes 509 and 511. In addition, the wavelength $\lambda_1$ corresponds to an optical signal transmitted from the transmitting unit of the connection means 545.

The operation of the connection means 545 is the same as that of the connection means 547, as will be described later.

The connection means 546 has an arrangement shown in FIG. 8. The connection means 546 receives an optical signal of the wavelength $\lambda_1$ to be transmitted to the right, converts the received signal into an optical signal of the wavelength $\lambda_2$ to be transmitted to the left, and transmits the converted signal to the left. In addition, the connection means 546 converts an optical signal of the wavelength $\lambda_2$ to be transmitted to the left into an optical signal of the wavelength $\lambda_1$, and transmits the converted signal to the right.

Furthermore, the connection means 546 terminates optical signals of the wavelengths $\lambda_1$ and $\lambda_2$ by cutting them off using the filter A 559, so as to prevent these signals from being transmitted to the right beyond the connection means.

The optical signals of the wavelengths $\lambda_1$, $\lambda_3$, $\lambda_5$, and $\lambda_7$ which are input to the optical coupler A 558 of the connection means 546 are divided, and are output to the optical coupler C 561 and the filter A 559.

The optical signals of the wavelengths $\lambda_1$, $\lambda_3$, $\lambda_5$, and $\lambda_7$ input to the optical coupler C 561 are output to the filter B 563. The filter B 563 passes only the optical signal of the wavelength $\lambda_1$, and cuts off the remaining optical signals of the wavelengths $\lambda_3$, $\lambda_5$, and $\lambda_7$. The optical signal of the wavelength $\lambda_1$ passing through the filter B 563 is received by the receiving unit A 567, and is converted into an electrical signal. Thereafter, the electrical signal is converted into an optical signal of the wavelength $\lambda_2$ by the transmitting unit A 564, and the converted optical signal is sent onto the optical fiber 557 via the optical couplers C 561 and A 558 as an optical signal to be transmitted to the left. In this manner, the optical signal of the wavelength $\lambda_1$ is converted into an optical signal of the wavelength $\lambda_2$, and is transmitted in the opposite direction. On the other hand, of the optical signals of the wavelengths $\lambda_1$, $\lambda_3$, $\lambda_5$, and $\lambda_7$ output from the optical coupler A 558 to the filter A 559, the optical signal of the wavelength $\lambda_1$ is cut off by the filter A 559, and only the optical signals of the wavelengths $\lambda_3$, $\lambda_5$, and $\lambda_7$ are input to the optical coupler B 560.

The optical coupler B 560 receives optical signals of the wavelengths $\lambda_2$, $\lambda_4$, $\lambda_6$, and $\lambda_8$ to be transmitted to the left. And only the optical signal of the wavelength $\lambda_2$ is converted into an electrical signal by the receiving unit B 570, and the converted electrical signal is input from the transmitting unit B 565 to the optical coupler B 560 as an optical signal of the wavelength $\lambda_1$ via the optical coupler D 562, in the same manner as the optical signal to be transmitted to the left, which signal is input to the above-mentioned optical coupler A 558. In the optical coupler B 560, the optical signals of the wavelengths $\lambda_3$, $\lambda_5$, and $\lambda_7$ passing through the filter A 559 are multiplexed with the optical signal of the wavelength $\lambda_1$ output from the optical coupler D 562, and the multiplexed signals are output to the right.

Similarly, of the optical signals of the wavelengths $\lambda_2$, $\lambda_4$, $\lambda_6$, and $\lambda_8$ to be transmitted from the right to the left, which signals are input to the filter A 559, the optical signal of the wavelength $\lambda_2$ is cut off, and only the optical signals of the wavelengths $\lambda_4$, $\lambda_6$, and $\lambda_8$ pass through the filter A 559. These optical signals are multiplexed by the optical coupler A 558 with an optical signal of the wavelength $\lambda_2$ output from the optical coupler C 561, and the multiplexed signals are sent from the optical coupler 558 onto the optical fiber as optical signals to be transmitted to the left.

The optical signals of the wavelengths $\lambda_1$, $\lambda_3$, $\lambda_5$, and $\lambda_7$ to be transmitted to the right, which signals are output from the connection means 546, are input to the node 513. The node 513 is a node for transmitting/receiving optical signals of the wavelengths $\lambda_1$ and $\lambda_3$ to be transmitted to the right, and has an arrangement shown in FIG. 7. The optical signal of the wavelength $\lambda_3$, which is sent from the node 507 and is addressed to the node 524, is regenerated by the node 513.

The optical signals of the wavelengths $\lambda_1$, $\lambda_3$, $\lambda_5$, and $\lambda_7$ input to the optical coupler A 558 of the node 513 are input to the optical coupler E 574, and are divided and output to the filters B 563 and C 566. The filter B 563 passes only the wavelength $\lambda_1$, and cuts off the wavelengths $\lambda_3$, $\lambda_5$, and $\lambda_7$. The optical signal of the wavelength $\lambda_1$ output from the filter B 563 is converted into an electrical signal by the receiving unit A 567, and thereafter, the electrical signal is processed by the SW unit 571 depending on the transmission destination node information, as described above. The filter C 566 passes only the optical signal of the wavelength $\lambda_3$. This optical signal is converted into an electrical signal by the receiving unit B 570, and the electrical signal is output to the SW unit 571. In the description of this embodiment, since the optical signal of the wavelength $\lambda_3$ is sent toward the node 524, the SW unit selects $\lambda_3$ as the transmission wavelength, and writes the signal in the memory unit B.

The signal addressed to the node 524 and written in the memory unit B is sequentially read out, and the readout signal is output from the transmitting unit B 565 tO the optical coupler F 575 as an optical signal of the wavelength $\lambda_3$. The optical coupler F 575 multiplexes the optical signal of the wavelength $\lambda_3$ with the optical signal of the wavelength $\lambda_1$ output from the transmitting unit A 564, and the multiplexed signals are output to the optical coupler B 560.

Of the optical signals of the wavelengths $\lambda_1$, $\lambda_3$, $\lambda_5$, and $\lambda_7$ to be transmitted to the right, which are output from the optical coupler A 558 to the filter A 559, the wavelengths $\lambda_1$ and $\lambda_3$ are cut off by the filter A 559, and only the wavelengths $\lambda_5$ and $\lambda_7$ pass through the filter A. The optical signals of the wavelengths $\lambda_5$ and $\lambda_7$ are multiplexed by the optical coupler B 560 with the optical signals of the wavelengths $\lambda_1$ and $\lambda_3$ output from the optical coupler F 575, and the multiplexed signals are sent onto the optical fiber 557 as optical signals to be transmitted to the right.

The optical signals of the wavelengths $\lambda_1$, $\lambda_3$, $\lambda_5$, and $\lambda_7$ to be transmitted to the right, which are output from the node 513 are input to the connection means 547 via the nodes 514, 515, 516, 517, and 518, as described above. In the connection means 547, an optical signal of the wavelength $\lambda_1$ to be transmitted to the right, which is output from the node 518, is transmitted as an optical signal of the wavelength $\lambda_2$ to be transmitted to the left, in the same manner as in the above-mentioned connection means 546. The optical signal of the wavelength $\lambda_2$ is converted again into an optical signal of the wavelength $\lambda_1$ to be transmitted to the right in the connection means 546, and the converted optical signal is received by the node 513. In this manner, a loop-shaped transmission route connecting the nodes 513, 514, 515, 516, 517, and 518 as a subgroup is formed. On the other hand, an optical signal, which is transmitted to the left from the node 519 to the connection means 547 at the wavelength $\lambda_2$, is converted into an optical signal of the wavelength $\lambda_1$ to be transmitted to the right, and the converted signal is output. The optical signal of the wavelength $\lambda_1$ is transmitted from the connection means 548 as an optical signal of the wavelength $\lambda_2$ to be transmitted to the left, and is received by the node 524. In this manner, a loop-shaped transmission route connecting the nodes 524, 523, 522, 521, 520, and 519 is formed. Each of these loop-shaped transmission routes is formed by the two connection means and the first and second channels in all the subgroups.

The optical signals of the wavelengths $\lambda_1$, $\lambda_3$, $\lambda_5$, and $\lambda_7$ to be transmitted to the right, which are output from the connection means 547, are input to the node 519. The node 519 has the same node arrangement as that of the node 507, i.e., has an arrangement shown in FIG. 6. In the node 519, the optical signal of the wavelength $\lambda_3$ addressed to the node 524 is converted into an electrical signal by the receiving unit A 567, and the electrical signal is input to the SW unit 571. Since the destination node of the input signal is the node 524, the SW unit 571 selects $\lambda_2$ as the transmission wavelength, and writes the signal in the memory unit A 568. The signal addressed to the node 524 and written in the memory unit A 568 is converted into an optical signal of the wavelength $\lambda_2$ by the transmitting unit A 564, and thereafter, the converted optical signal is sent from the optical coupler A 558 onto the optical fiber 557 via the optical coupler C 561 as a signal to be transmitted to the left. The optical signal of the wavelength $\lambda_2$, which is transmitted to the left from the optical coupler A 558, is multiplexed as an optical signal of the wavelength $\lambda_1$ to be transmitted to the right with the optical signals of the wavelengths $\lambda_3$, $\lambda_5$, and $\lambda_7$ in the connection means 547, as described above, and the multiplexed signals are sent into the optical fiber 557. The optical signals of the wavelengths $\lambda_1$, $\lambda_3$, $\lambda_5$, and $\lambda_7$ to be transmitted to the right, which are sent into the optical fiber, are input to the connection means 548 via the nodes 519, 520, 521, 522, 523, and 524 in the same manner as in the operations in the above-mentioned nodes 507, 508, 509, 510, 511, and 512.

The connection means 548 has an arrangement shown in FIG. 8. The connection means 548 receives only the optical signal of the wavelength $\lambda_1$ of the optical signals of the wavelengths $\lambda_1$, $\lambda_3$, $\lambda_5$, and $\lambda_7$ to be transmitted to the right, and outputs the received signal as an optical signal of the wavelength $\lambda_2$ to be transmitted to the left in the same manner as in the connection means 547. In addition, the connection means 548 outputs the optical signals of the wavelengths $\lambda_3$, $\lambda_5$, and $\lambda_7$ to the right. At this time, the wavelength $\lambda_1$ corresponds to the signal addressed to the node 524, which signal is repeated by the node 519, and this signal is transmitted to the left at the wavelength $\lambda_2$. The optical signal of the wavelength $\lambda_2$ is input to the left neighboring node 524 of the connection means 548. The node 524 is a node for transmitting two wavelengths $\lambda_2$ and $\lambda_8$ to be transmitted to the left, and its arrangement corresponds to one obtained by reversing the arrangement shown in FIG. 7 in the right-and-left direction. Of optical signals of the wavelengths $\lambda_2$, $\lambda_4$, $\lambda_6$, and $\lambda_8$ to be transmitted to the left, which are input to the optical coupler A 558 of the node 524, the optical signals of the wavelengths $\lambda_2$ and $\lambda_8$ are converted into electrical signals by the corresponding receiving units, i.e., the optical signal of the wavelength $\lambda_2$ is converted by the receiving unit A 567, and the optical signal of the wavelength $\lambda_8$ is converted by the receiving unit B 570 in the same manner as in the node 508. These electrical signals are input to the SW unit 571.

The electrical signal output from the receiving unit A 567 is the signal addressed to the node 524, which is transmitted from the node 507 at the wavelength $\lambda_3$, is repeated by the node 513, is converted into an optical signal of the wavelength $\lambda_2$ by the node 519, is converted into an optical signal of the wavelength $\lambda_1$ by the connection means 547, is converted again into an optical signal of the wavelength $\lambda_2$ by the connection means 548, and is received by the node 524.

In this manner, transmission from the node 507 to the node 524 is realized.

Conversely, upon transmission from the node 524 to the node 507, various routes are available. For example, in one route, a signal is transmitted from the node 524 at the wavelength $\lambda_8$, and is regenerated by the node 518. Thereafter, the wavelength is converted from $\lambda_8$ into $\lambda_2$ by the node 512, and the signal then reaches the node 507 via the nodes 511, 510, 509, and 508.

As described above, in each subgroup, a loop-shaped transmission route can be formed. For this reason, the transmission route length between adjacent nodes is shortened.

In this embodiment, each connection means has the terminating function. However, the connection means need not always have the terminating function. In this case, each node examines a destination node in units of data, and data of the first and second channel groups, which are input via the connection means, can be ignored.

As described above, a Manhattan street network consisting of 36 nodes can be constituted using eight channels.

In this embodiments, each of the first and second node groups are divided into subgroups which access a plurality of channels in the third channel group so as not to overlap each other, and the subgroups are connected via the connection means, so that the algorithm of the Manhattan street network can be used as a communication algorithm. However, the present invention is not limited to this.

For example, a plurality of nodes each having a small transmission capacity may share a single channel in the subgroup, and a node having a large transmission capacity may access two or more channels in the third channel group. The connection means need not always be arranged in units of subgroups, but may be arranged in every other subgroups. Alternatively, if at least one connection means is arranged in the network, a loop-shaped transmission route can be formed by the first and second channel groups and the connection means in addition to that defined by the third channel group.

(Second Embodiment)

Figure 9:
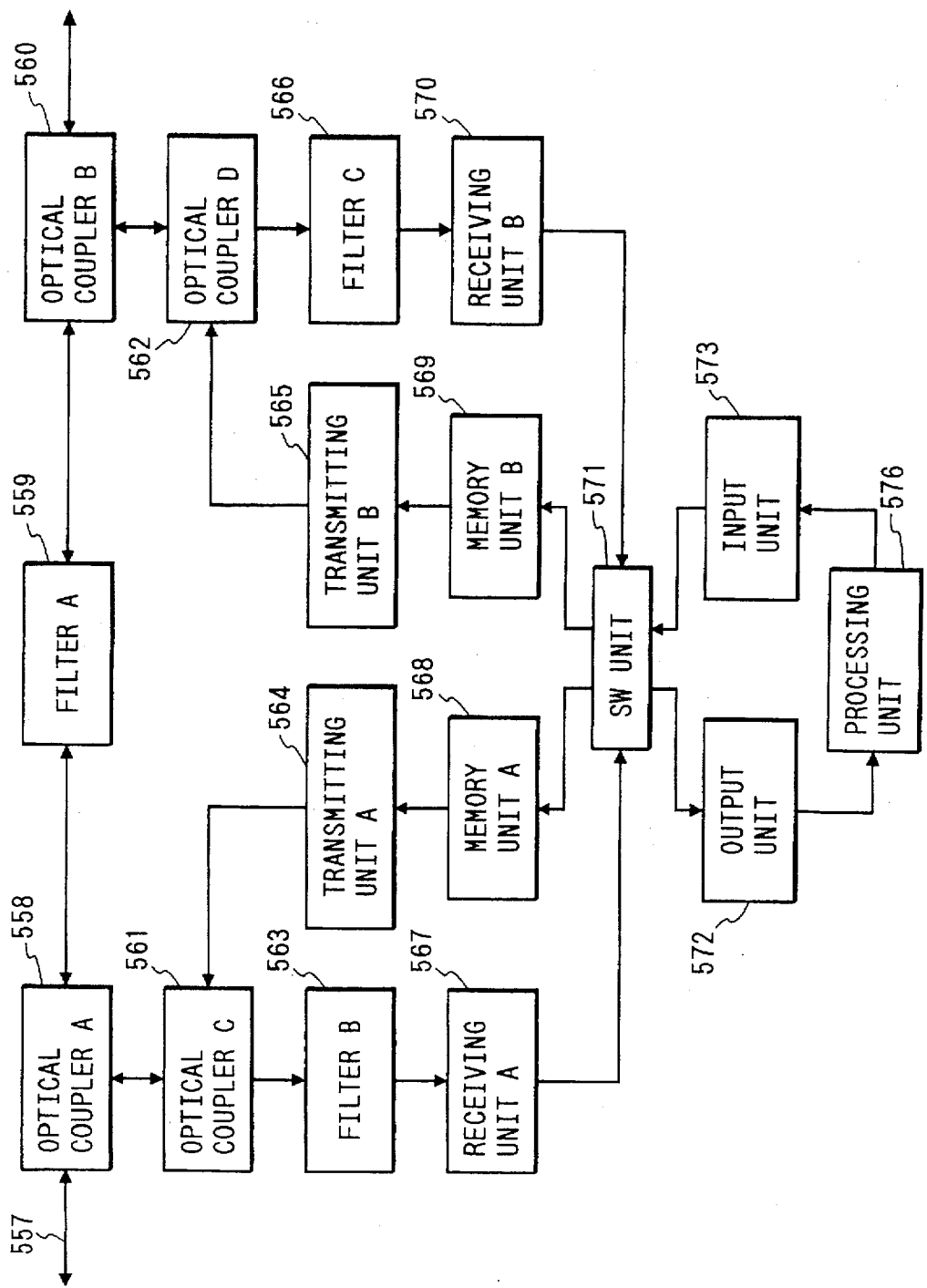
FIG. 9 is a block diagram showing the arrangement of a connection means used in the second embodiment.

FIG. 9 shows the second arrangement of the connection means according to the present invention, i.e., the arrangement which facilitates acquisition of traffic information of the network as a whole and information associated with failures.

In the arrangement of the connection means shown in FIG. 9, the SW unit 571, the memories units A 568 and B 569, the output unit 572, the input unit 573, which are the same as those in the node shown in FIG. 6, and a processing unit 576 for executing data processing are added to the arrangement shown in FIG. 8.

In this arrangement, the nodes 501, 502, 503, 504, 505, and 506 transmit traffic information associated with themselves and information associated with failures toward the connection means 545 using the wavelength $\lambda_1$, and the connection means 545 acquires these pieces of information. The acquired information is processed and summarized by the processing unit 576. The summarized information associated with the nodes 501, 502, 503, 504, 505, and 506 is transmitted toward the connection means 546 using the wavelength $\lambda_1$ again. In the connection means 546, information associated with the nodes 507, 508, 509, 510, 511, and 512 has already been summarized, and this information is processed together with the information from the nodes 501, 502, 503, 504, 505, and 506. In this manner, since each connection means acquires traffic information and failure information in units of nodes, which are sent from other connection means, the connection means can send an instruction for changing, e.g., the routing scheme in correspondence with these pieces of information to the respective nodes.

(Third Embodiment)

Figure 10:
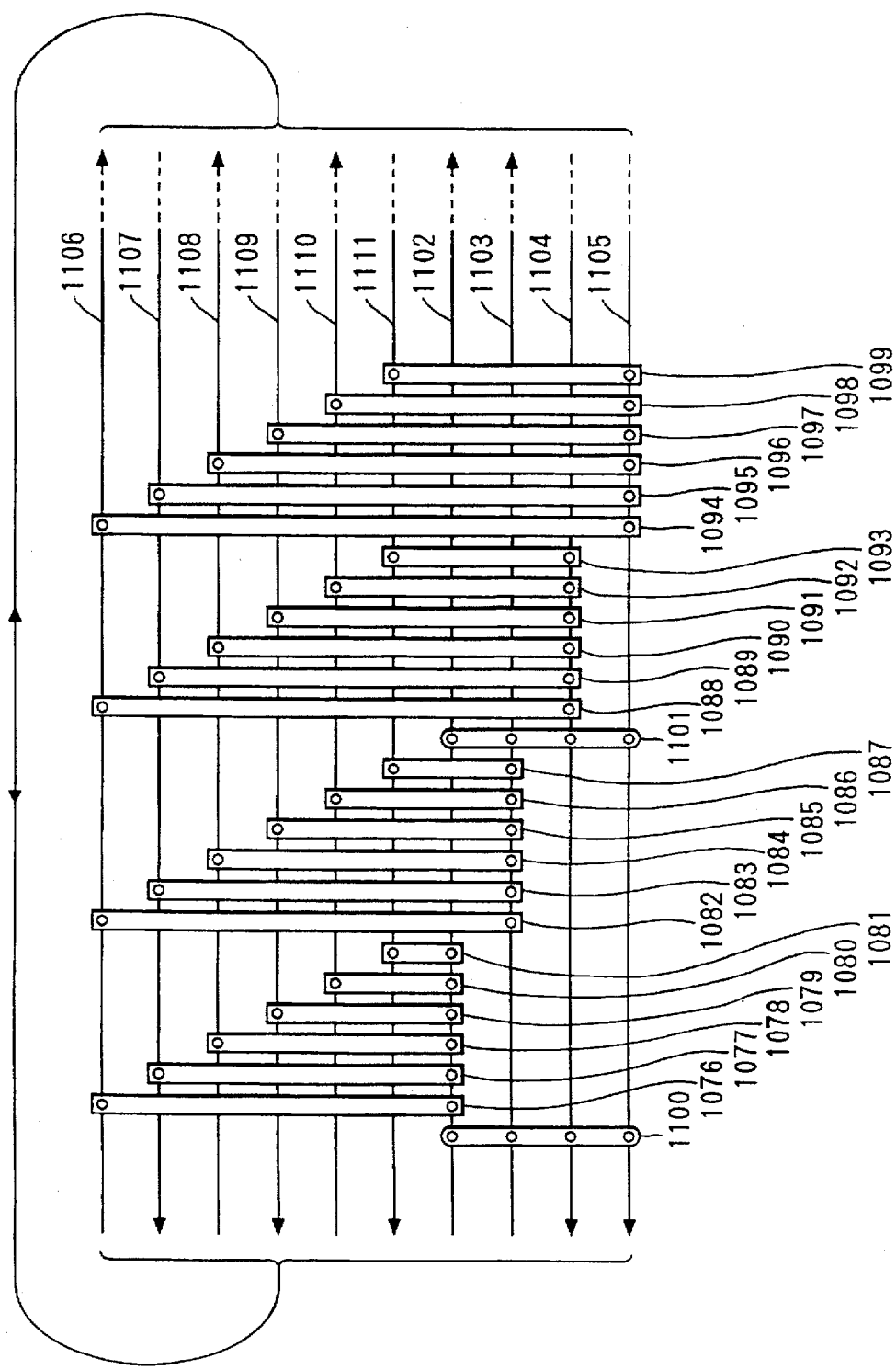
FIG. 10 is a schematic view showing the arrangement of a network according to the third embodiment of the present invention.

FIG. 10 shows the arrangement according to the third embodiment of the present invention. This arrangement is suited for a network which connects a large number of nodes by arranging a large number of sets of 24 nodes and two connection means in a loop pattern. FIG. 10 illustrates only one set for the sake of simplicity.

Referring to FIG. 10, nodes 1076 to 1099 are arranged. Of these nodes, the nodes 1076 to 1087 constitute a first node group. In this group, the nodes 1076 to 1081 and the nodes 1082 to 1087 respectively constitute subgroups. Also, the nodes 1088 to 1099 constitute a second node group. In this group, the nodes 1088 to 1093 and the nodes 1094 to 1099 respectively constitute subgroups. The arrangement of each node corresponds to one of the arrangements shown FIGS. 6 and 7, and the arrangement is horizontally symmetrical to that shown in FIG. 7 in correspondence with the transmission direction of a wavelength to be received.

Each of connection means 1100 and 1101 has an internal arrangement shown in FIG. 11 (to be described in detail later).

Channels 1102 and 1103 respectively formed by optical signals of wavelengths $\lambda_9$ and $\lambda_{10}$ constitute a first channel group. Channels 1104 and 1105 respectively formed by optical signals of wavelengths $\lambda_{11}$ and $\lambda_{12}$ constitute a second channel group. Channels 1106, 1107, 1108, 1109, 1110, and 1111 respectively formed by optical signals of wavelengths $\lambda_{13}$, $\lambda_{14}$, $\lambda_{15}$, $\lambda_{16}$, $\lambda_{17}$, and $\lambda_{18}$ constitute a third channel group.

Figure 11:
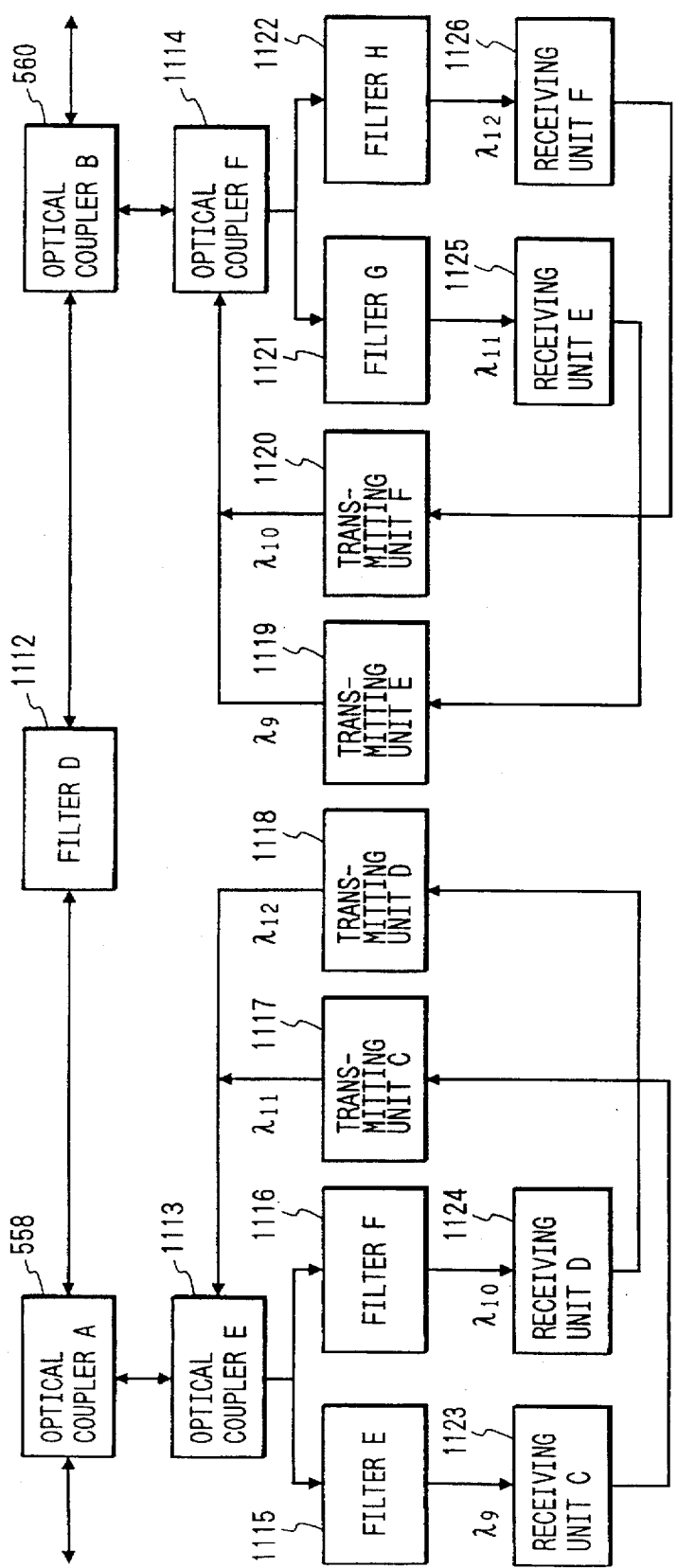
FIG. 11 is a block diagram showing the arrangement of a connection means of the third embodiment.

FIG. 11 shows the internal arrangement of each of the connection means 1100 and 1101 used in the third embodiment of the present invention. Optical couplers A 558 and B 560 have the same functions as in FIG. 8.

A filter D 1112 is a filter for cutting off and terminating optical signals of the wavelengths $\lambda_9$, $\lambda_{10}$, $\lambda_{11}$, and $\lambda_{12}$. An optical coupler E 1113 divides and outputs an optical signal output from the optical coupler A to filters E 1115 and F 1116. In addition, the optical coupler E 1113 multiplexes optical signals output from transmitting units C 1117 and D 1118, and outputs the multiplexed signals to the optical coupler A. An optical coupler F 1114 divides and outputs an optical signal output from the optical coupler B 560 to filters G 1121 and H 1122. In addition, the optical coupler F 1114 multiplexes optical signals output from transmitting units E 1119 and F 1120, and outputs the multiplexed signals to the optical coupler B 560.

The filters E 1115, F 1116, G 1121, and H 1122 respectively pass optical signals of the wavelengths $\lambda_9$, $\lambda_{10}$, $\lambda_{11}$, and $\lambda_{12}$, and cut off other optical signals. The transmitting units C 1117, D 1118, E 1119, and F 1120 respectively convert electrical signals output from receiving units C 1123, D 1124, E 1125, and F 1126 into optical signals of the wavelengths $\lambda_{11}$, $\lambda_{12}$, $\lambda_9$, and $\lambda_{10}$, and output the converted signals. The receiving units C 1123, D 1124, E 1125, and F 1126 convert input optical signals into electrical signals.

More specifically, wavelength conversion is attained by temporarily converting optical signals of $\lambda_9$, $\lambda_{10}$, $\lambda_{11}$, and $\lambda_{12}$ input to the receiving units C, D, E, and F into electrical signals, and transmitting these electrical signals from the transmitting units C, D, E, and F as optical signals of $\lambda_{11}$, $\lambda_{12}$, $\lambda_9$, and $\lambda_{10}$. With this arrangement, this connection means serves as that for subgroups belonging to different node groups.

In this embodiment, an optical signal of the wavelength $\lambda_9$, which is output from the node 1081 to the right, and an optical signal of the wavelength $\lambda_{10}$, which is output from the node 1087 to the right, are divided by the optical coupler A 558 in the connection means 1101, and are output to the filter D 1112 and the optical coupler E 1113. The optical signals of the wavelengths $\lambda_9$ and $\lambda_{10}$ divided and output to the filter D 1112 are cut off and terminated by the filter D 1112, and are never transmitted to the right beyond the connection means 1101. On the other hand, the optical signals divided and output to the optical coupler E 1113 by the optical coupler A 558 are output from the optical coupler E 1113 to the filters E 1115 and F 1116. The filter E 1115 passes only the optical signal of the wavelength $\lambda_9$, and the filter F 1116 passes only the optical signal of the wavelength $\lambda_{10}$. These optical signals are respectively converted into electrical signals by the receiving units C 1123 and D 1124, and the electrical signals are output from the transmitting units C 1117 and D 1118 as optical signals of the wavelengths $\lambda_{11}$ and $\lambda_{12}$.

The optical signals of the wavelengths $\lambda_{11}$ and $\lambda_{12}$ output from the transmitting units C 1117 and D 1118 are input to the optical coupler A 558 via the optical coupler E 1113 and are multiplexed with optical signals of other wavelengths from the filter D 1112. Thus, the multiplexed signals are output to the left.

In this manner, optical signals, which are input to the connection means 1101 as optical signals to be transmitted to the right at the wavelengths $\lambda_9$ and $\lambda_{10}$, are converted into the wavelengths $\lambda_{11}$ and $\lambda_{12}$, and the converted signals are transmitted to the left. Thereafter, the optical signals are converted into optical signals of the wavelengths $\lambda_9$ and $\lambda_{10}$ in the connection means 1100 in the same manner as described above, and are output from the connection means 1100 as optical signal to be transmitted to the right again.

In this manner, loop-shaped transmission routes are respectively formed by the nodes 1076, 1077, 1078, 1079, 1080, and 1081, and the nodes 1082, 1083, 1084, 1085, 1086, and 1087. At this time, a loop-shaped transmission route is formed by the channels using the wavelengths $\lambda_9$ and $\lambda_{11}$ and the connection means 1100 and 1101 in the subgroup of the nodes 1076 to 1081. A loop-shaped transmission route is formed by the channels using the wavelengths $\lambda_{10}$ and $\lambda_{12}$ and the connection means 1100 and 1101 in the subgroup of the nodes 1082 to 1087. These loop-shaped transmission routes are formed in all the subgroups.

In this embodiment, since the number of channels in each of the first and second channel groups is two, and the channels in the first and second channel groups are respectively connected by the connection means, even if the number of connection means is decreased when the number of nodes is large, the algorithm of the Manhattan street network can be used. Since the number of channels in each of the first and second channel groups increases, the communication capacity can be increased particularly in the subgroup.

In this embodiment, the number of channels in each of the first and second channel groups is two, but the number thereof is not limited to this. The number of channels in each of the first and second channel groups may be M (=integer), M connection means for connecting a single channel in the first channel group and a single channel in the second channel group to be 1:1 may be arranged in units of M subgroups, and each of the M subgroups may access the M channels in the first or second channel group. With this arrangement, a loop-shaped transmission route can be formed in units of the subgroups without being regenerated by another subgroup. The M subgroups between the two connection means may access one of the first and second channel groups as in this embodiment, or some of subgroups in the M subgroups between the two connection means may access the first channel groups and remaining subgroups may access the second channel group. At this time, if each subgroup alternately accesses the first or second channel group, the algorithm of the Manhattan street network can be used as in the first embodiment.

(Fourth Embodiment)

Figure 12:
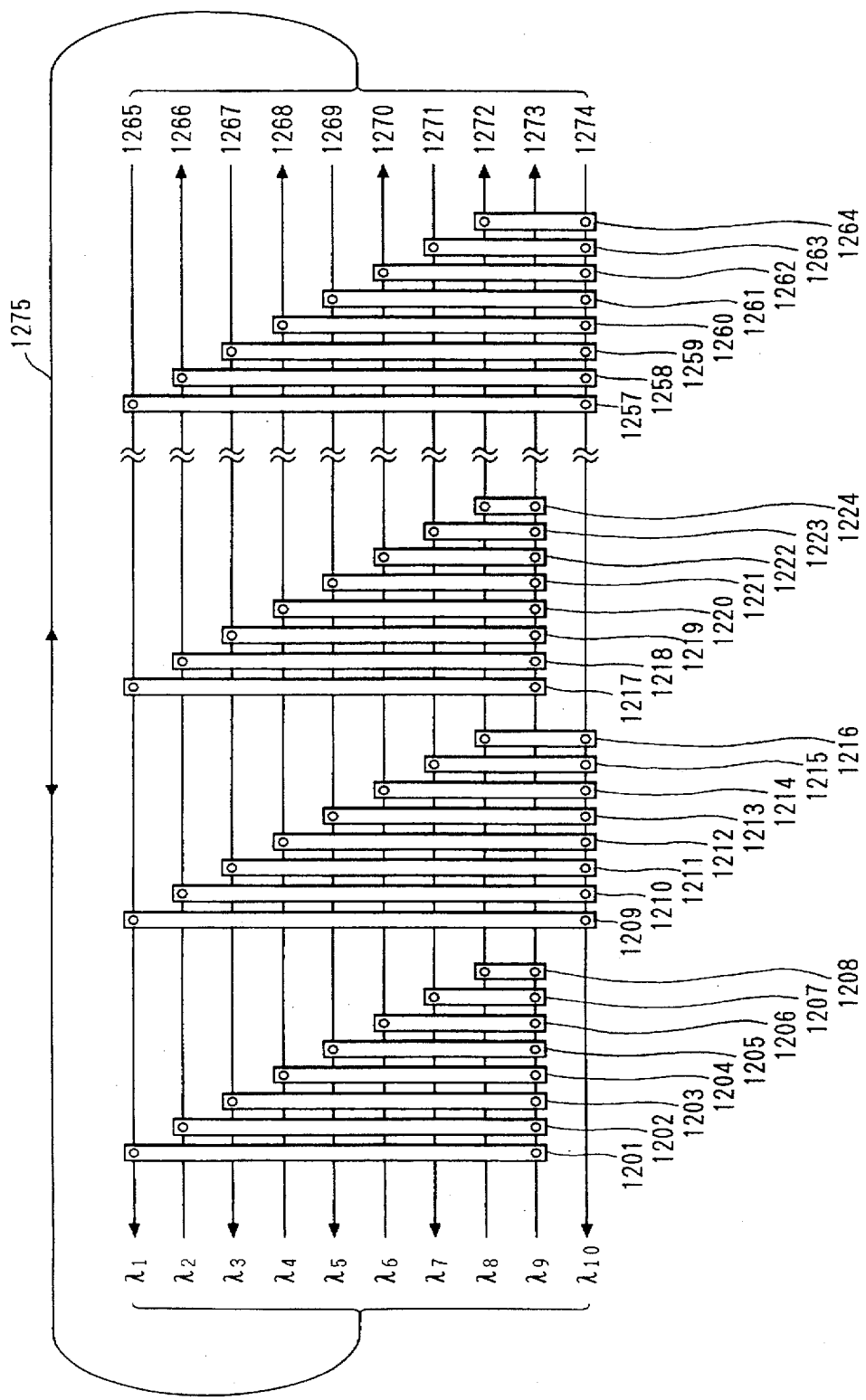
FIG. 12 is a schematic view showing the arrangement of a network according to the fourth embodiment of the present invention.

FIG. 12 shows the fourth embodiment of the present invention, and illustrates a connection example wherein 64 nodes are one-dimensionally connected using wavelength multiplexing of 10 wavelengths in a single-core optical fiber ring as a physically single transmission medium. FIG. 12 illustrates only 32 nodes for the sake of simplicity.

Referring to FIG. 12, nodes 1201 to 1264 are arranged. The nodes 1225 to 1256 are not illustrated for the sake of simplicity. Four subgroups respectively including the nodes 1201 to 1208, the nodes 1217 to 1224, the nodes 1233 to 1240, and the nodes 1249 to 1256 constitute a first node group, and four subgroups respectively including the nodes 1209 to 1216, the nodes 1225 to 1232, the nodes 1241 to 1248, and the nodes 1257 to 1264 constitute a second node group. Each of these nodes transmits/receives two assigned wavelengths indicated by marks ○ in FIG. 12. The internal arrangements of these nodes will be described later. Ten channels 1265 to 1274 are formed in a single-core optical fiber ring 1275 using different wavelengths $\lambda_1$, $\lambda_2$, $\lambda_3$, $\lambda_4$, $\lambda_5$, $\lambda_6$, $\lambda_7$, $\lambda_8$, $\lambda_9$, and $\lambda_{10}$. In this case, as the wavelengths, $\lambda_1$=1.50 μm, $\lambda_2$=1.51 μm, $\lambda_3$=1.52 μm, $\lambda_4$=1.53 μm, $\lambda_5$=1.54 μm, $\lambda_6$=1.55 μm, $\lambda_7$=1.56 μm, $\lambda_8$=1.57 μm, $\lambda_9$=1.58 μm, and $\lambda_{10}$=1.59 μm are used.

The channel 1273 corresponds to a first channel group, and the channel 1274 corresponds to the second channel group. The channels 1265 to 1272 correspond to a third channel group.

The channels 1265, 1267, 1269, and 1271 in the third channel group and the second channel 1274 have a leftward transmission direction, and the channels 1266, 1268, 1270, and 1272 in the third channel group and the first channel 1273 have a rightward transmission direction.

Referring to FIG. 12, the leftmost nodes 1201, 1217, 1233, and 1249 of the subgroups in the first node group, which share the first channel 1273 for rightward transmission, share the channel 1265 in the third channel group, which channel has a leftward transmission direction. The rightmost nodes 1216, 1232, 1248, and 1254 of the subgroups in the second node group, which share the second channel 1274 for leftward transmission, share the channel 1272 in the third channel group, which channel has a rightward transmission direction.

Each of the fourth and fifth embodiments adopts an arrangement from which the connection means are omitted from the network arrangement according to each of the first to third embodiments.

Figure 13:
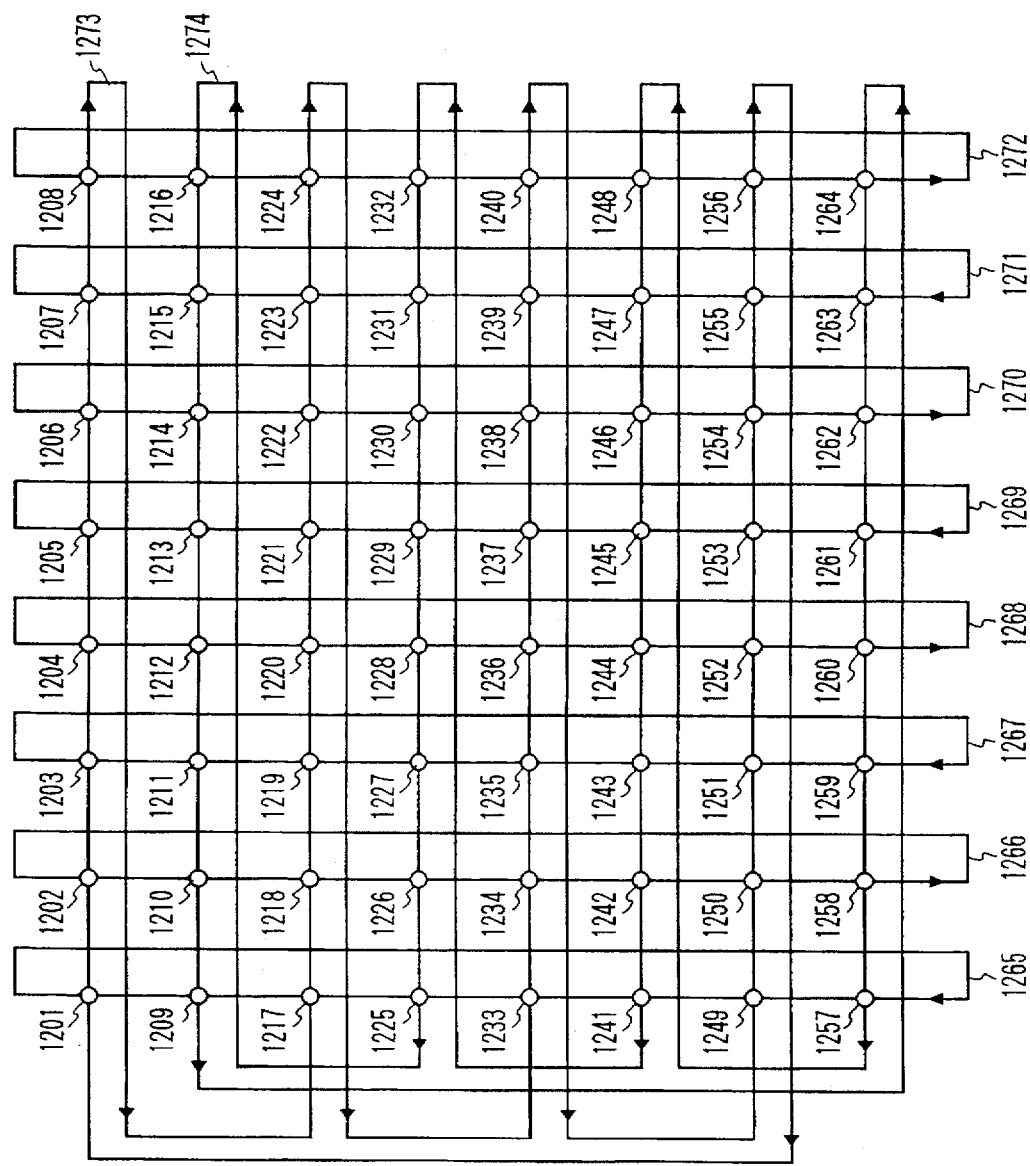
FIG. 13 is a view logically showing the connection relationship of the network of the fourth embodiment on a two-dimensional coordinate system.

FIG. 13 shows the connection relationship among the nodes shown in FIG. 12 by arranging the nodes on a matrix on a logical two-dimensional coordinate system. In FIG. 13, marks ○ represent the nodes. The first and second channels 1273 and 1274 are respectively shared by four subgroups, and each form a transmission channel loop to be accessed by 32 nodes. In FIG. 13, a transmission channel constituted by a portion of the first channel 1273 shared by the nodes 1201 to 1208, and a portion of the channel 1265 in the third channel group shared by the nodes 1201, 1209, and 1217 forms a logical loop-shaped transmission route. Similarly, the nodes 1209 to 1216 and the nodes 1264, 1208, and 1216 form a single logical loop-shaped transmission route; the nodes 1217 to 1224 and the nodes 1233, 1225, and 1217 form a single logical loop-shaped transmission route; the nodes 1225 to 1232 and the nodes 1216, 1224, and 1232 form a single logical loop-shaped transmission route; the nodes 1233 to 1240 and the nodes 1249, 1241, and 1233 form a single logical loop-shaped transmission route; the nodes 1241 to 1248 and the nodes 1232, 1240, and 1248 form a single logical loop-shaped transmission route; the nodes 1249 to 1256 and the nodes 1201, 1257, and 1249 form a single logical loop-shaped transmission route; and the nodes 1257 to 1264 and the nodes 1248, 1256, and 1264 form a single logical loop-shaped transmission route.

In the fourth embodiment of the present invention, the nodes which transmit/receive two wavelengths ($\lambda_r$ and $\lambda_e$) having different transmission directions, such as the nodes 1201, 1203, 1205, 1207, 1210, 1212, 1214, 1216, 1217, 1219, 1221, 1223, . . . each have the same arrangement as that of the node shown in FIG. 6 used in the first embodiment.

Also, in the fourth embodiment of the present invention, the nodes which transmit/receive two wavelengths to be transmitted to the right, such as the nodes 1202, 1204, 1206, 1208, 1218, 1220, 1222, 1224, . . . each have the same arrangement as that of the node shown in FIG. 7 used in the first embodiment.

The nodes 1209, 1211, 1213, 1215, and the like in FIG. 12 according to the fourth embodiment of the present invention are those for transmitting/receiving two wavelengths $\lambda_{e1}$ and $\lambda_{e2}$ to be transmitted to the left, and each have an arrangement obtained by reversing the arrangement shown in FIG. 7 in the right-and-left direction, and by replacing $\lambda_{r1}$ by $\lambda_{e1}$ and $\lambda_{r2}$ by $\lambda_{e2}$.

The operation according to the fourth embodiment of the present invention will be described below with reference to FIGS. 12, 13, 6, and 7. In the following description, a case will be exemplified wherein a signal is to be transmitted from the node 1207 to the node 1202.

The node 1207 as the transmitting node has the arrangement shown in FIG. 6. In this node, the wavelength corresponding to $\lambda_r$ is $\lambda_9$, and the wavelength corresponding to $\lambda_e$ is $\lambda_7$. In the node 1207, when a signal to be transmitted, which is added with reception destination information, is input from the input unit 573, the SW unit 571 examines which of $\lambda_7$ and $\lambda_9$ is used for transmitting the signal. As the examination algorithm of this embodiment, a correction technique, which is described in NICHOLAS, F, MAXEMCHUK, "Routing in the Manhattan street Network", IEEE TRANSACTIONS on COMMUNICATIONS, Vol. 35, No. 5, MAY 1987, pp. 503–512, and which takes into consideration that the number of horizontal nodes is set to be larger by 2 than the actual number of nodes, and that transmission between nodes located at the right and left ends in the horizontal direction includes movement by two nodes in the vertical direction, can be used. With this correction technique, a loop-shaped transmission route for transmitting a signal via the nodes 1208, 1217, 1209, and 1201 using the wavelength $\lambda_9$ as the first channel and the wavelength $\lambda_1$ in the third channel group as a repeating route is determined. Subsequently, $\lambda_9$ is determined as the transmission wavelength. The output signal from the input unit 573 is input to the memory unit B 569 and is sequentially stored at the end of a memory queue. The transmitting unit B 565 converts an electrical signal output from the memory unit B 569 into an optical signal of the wavelength $\lambda_9$, and sequentially outputs the converted signal to the optical coupler D 562. The optical signal of the wavelength $\lambda_9$ output to the optical coupler D 562 is output to the optical coupler B 560 to be multiplexed with optical signals of other wavelengths from the filter A 559, and is output onto the optical fiber 1275 to propagate to the right. The optical fiber 1275 transmits optical signals of the wavelengths $\lambda_2$, $\lambda_4$, $\lambda_6$, $\lambda_8$, and $\lambda_9$ from the left to the right, and transmits optical signals of the wavelengths $\lambda_1$, $\lambda_3$, $\lambda_5$, $\lambda_7$, and $\lambda_{10}$ from the right to the left. These optical signals of different wavelengths are transmitted without disturbing other signals since they are not coherent with each other.

The optical signals of the wavelengths $\lambda_2$, $\lambda_4$, $\lambda_6$, $\lambda_8$, and $\lambda_9$ output from the optical coupler B 560 of the node 1207 are input to the neighboring node 1208. The node 1208 is a node for transmitting/receiving two wavelengths to be transmitted to the left, and has an arrangement shown in FIG. 7. The optical signal of the wavelength $\lambda_9$ which is output from the node 1207 to be addressed to the node 1202 is repeated by the node 1208. The optical signals of the wavelengths $\lambda_2$, $\lambda_4$, $\lambda_6$, $\lambda_8$, and $\lambda_9$ input to the optical coupler A 558 of the node 1208 are input to the optical coupler E 574, and are divided and output to the filters B 563 and C 566. The filter B 563 passes only the wavelength $\lambda_8$, and cuts of the wavelengths $\lambda_2$, $\lambda_4$, $\lambda_6$, and $\lambda_9$. The optical signal of the wavelength $\lambda_8$ output from the filter B 563 is converted into an electrical signal by the receiving unit A 567, and thereafter, the electrical signal is processed by the SW unit 571 in correspondence with its reception destination node information. The filter C 566 passes only the optical signal of the wavelength $\lambda_9$. The optical signal of the wavelength $\lambda_9$ is converted into an electrical signal by the receiving unit B 570, and the electrical signal is then output to the SW unit 571. In the description of this embodiment, since the optical signal of the wavelength $\lambda_9$ is output to be addressed to the node 1202, the SW unit selects $\lambda_9$ as the transmission wavelength, and writes the signal in the memory unit B.

The signal addressed to the node 1202 and written in the memory unit B is sequentially read out, and is output from the transmitting unit B 565 as an optical signal of the wavelength $\lambda_9$ to the optical coupler F 575. The optical signal of the wavelength $\lambda_9$ is multiplexed with the optical signal of the wavelength $\lambda_8$ output from the transmitting unit A 564 by the optical coupler F 575, and the multiplexed signals are output to the optical coupler B 560.

Of the optical signals of the wavelengths $\lambda_2$, $\lambda_4$, $\lambda_6$, $\lambda_8$, and $\lambda_9$ to be transmitted to the right, which are output from the optical coupler A 558 to the filter A 559, the filter A 559 cuts off the wavelengths $\lambda_8$ and $\lambda_9$, and passes only the wavelengths $\lambda_2$, $\lambda_4$, and $\lambda_6$. The optical signals of the wavelengths $\lambda_2$, $\lambda_4$, and $\lambda_6$ are multiplexed with the optical signals of the wavelengths $\lambda_8$ and $\lambda_9$ output from the optical coupler F 575 by the optical coupler B 560, and the multiplexed signals are sent onto the optical fiber 1275 as optical signals to be transmitted to the right.

The optical signals of the wavelengths $\lambda_2$, $\lambda_4$, $\lambda_6$, $\lambda_8$, and $\lambda_9$ which are output from the optical coupler B 560 of the node 1208 are input to the neighboring node 1209. The node 1209 is a node for transmitting/receiving two wavelengths ($\lambda_1$ and $\lambda_{10}$) to be transmitted to the left, and has an arrangement horizontally symmetrical to that shown in FIG. 7. In this case, a description will be given with reference to an arrangement obtained by reversing the arrangement in FIG. 7 in the right-and-left direction.

The optical signals of the wavelengths $\lambda_2$, $\lambda_4$, $\lambda_6$, $\lambda_8$, and $\lambda_9$ which are input from the left to the optical coupler B 560 of the node 1209 are input to the filter A 559. In the node 1209, since $\lambda_{e1}$ and $\lambda_{e2}$ are respectively set to be $\lambda_1$ and $\lambda_{10}$, as indicated by marks ○ in FIG. 12, the filter A 559 is a cut-off filter for $\lambda_1$ and $\lambda_{10}$, and the optical signals of $\lambda_2$, $\lambda_4$, $\lambda_6$, $\lambda_8$, and $\lambda_9$ pass through this filter. These optical signals output from the filter A 559 are input to the optical coupler A 558, and are then output to the neighboring node 1210.

The node 1210 is a node for transmitting/receiving an optical signal of the wavelength $\lambda_2$ to be transmitted to the right and an optical signal of the wavelength $\lambda_{10}$ to be transmitted to the left, and has an arrangement shown in FIG. 6. The optical signals of the wavelengths $\lambda_2$, $\lambda_4$, $\lambda_6$, $\lambda_8$, and $\lambda_9$ input to the optical coupler A 558 of the node 1210 are divided by the optical coupler A and are output to the optical coupler C 561 and the filter A 559. The optical signals of the wavelengths $\lambda_2$, $\lambda_4$, $\lambda_6$, $\lambda_8$, and $\lambda_9$ input to the optical coupler C 561 are output to the filter B 563. The filter B 563 passes only the optical signal of the wavelength $\lambda_2$, and cuts off other optical signals. The optical signal of the wavelength $\lambda_2$ passing through the filter B 563 is received by the receiving unit A 567, and is converted into an electrical signal. Thereafter, if the reception destination node of this signal is the self node, the electrical signal is output to the output unit 572 via the SW unit 571. If the reception destination node is not the self node, in accordance with a predetermined algorithm, the electrical signal is stored in the memory unit A 568 or B 569, the electrical signal is converted into an optical signal of the wavelength $\lambda_{10}$ by the transmitting unit A 569 or is converted into an optical signal of the wavelength $\lambda_2$ by the transmitting unit B 565, and the converted optical signal is sent onto the optical fiber 1275 via the optical couplers C and A or the optical couplers D and B.

The optical signals of the wavelengths $\lambda_2$, $\lambda_4$, $\lambda_6$, $\lambda_8$, and $\lambda_9$ to be transmitted to the right are transmitted via the nodes 1211, 1212, 1213, 1214, 1215, and 1216 in the same manner as in the nodes 1209 and 210. During this interval, the optical signal of the wavelength $\lambda_9$ passes through all the nodes, and is not repeated.

Subsequently, the optical signals of the wavelengths $\lambda_2$, $\lambda_4$, $\lambda_6$, $\lambda_8$, and $\lambda_9$ to be transmitted to the right are input to the optical coupler A 558 of the node 1217.

The node 1217 is a node for transmitting/receiving optical signal of the wavelength $\lambda_9$ to be transmitted to the right and an optical signal of the wavelength $\lambda_1$ to be transmitted to the left, and has an arrangement shown in FIG. 6. In the node 1217, the optical signal of the wavelength $\lambda_9$ output from the node 1208 is converted into an electrical signal by the receiving unit A 567, and the electrical signal is input to the SW unit 571. Since the reception destination node of this signal is the node 1202, the SW unit 571 selects $\lambda_1$ as the transmission wavelength, and writes the signal in the memory unit A 568. The signal addressed to the node 1202 and written in the memory unit A 568 is converted into an optical signal of the wavelength $\lambda_1$ by the transmitting unit A 564, and the optical signal of the wavelength $\lambda_1$ is multiplexed with optical signals of the wavelengths $\lambda_3$, $\lambda_5$, $\lambda_7$, and $\lambda_{10}$ to be transmitted to the left by the optical coupler A 558 via the optical coupler C 561. Thereafter, the multiplexed signals are output onto the optical fiber 1275.

The optical signal of the wavelength $\lambda_1$ which is output to the left from the optical coupler A 558 of the node 1217 is transmitted via the nodes 1216, 1215, 1214, 1213, 1212, 1211, and 1210 without being repeated in the same manner as the above-mentioned optical signal of the wavelength $\lambda_9$, and is input to the optical coupler A 558 of the node 1209.

The node 1209 is a node for transmitting two wavelengths ($\lambda_1$ and $\lambda_{10}$) to be transmitted to the left, as described above. Therefore, the optical signal of the wavelength $\lambda_1$ which is output from the node 1217 and is transmitted to the left is repeated by this node 1209. The optical signal of the wavelength $\lambda_1$ input to the optical coupler A 558 passes through the optical coupler E 574 and the filter B 563, and is converted into an electrical signal by the receiving unit A 567. The electrical signal is input to the SW unit 571. Since the reception destination node of this signal is the node 1202, the SW unit 571 selects $\lambda_1$ as the transmission wavelength, and writes the signal in the memory unit A 568. The signal addressed to the node 1202 and written in the memory unit A 568 is converted into an optical signal of the wavelength $\lambda_1$ by the transmission unit A 564, and the optical signal of the wavelength $\lambda_1$ is multiplexed with optical signals of the wavelengths $\lambda_3$, $\lambda_5$, $\lambda_7$, and $\lambda_{10}$ to be transmitted to the left by the optical coupler B 560 via the optical coupler F 575. Thereafter, the multiplexed signals are output onto the optical fiber 1275.

The optical signals of the wavelengths $\lambda_1$, $\lambda_3$, $\lambda_5$, $\lambda_7$, and $\lambda_{10}$ to be transmitted to the left, which are output from the node 1209, are transmitted via the nodes 1208, 1207, 1206, 1205, 1204, 1203, and 1202. In this case, the optical signal of the wavelength $\lambda_1$ passes through these nodes without being repeated, and is input to the optical coupler B 560 of the node 1201.

The node 1201 is a node for transmitting/receiving an optical signal of the wavelength $\lambda_9$ to be transmitted to the right and an optical signal of the wavelength $\lambda_1$ to be transmitted to the left in the same manner as in the node 1217, and has an arrangement shown in FIG. 6. In the node 1201, the optical signal of the wavelength $\lambda_1$ output from the node 1209 is converted into an electrical signal by the receiving unit B 570, and the electrical signal is input to the SW unit 571. Since the reception destination node of this signal is the node 1202, the SW unit 571 selects $\lambda_9$ as the transmission wavelength, and writes the signal in the memory unit B 569. The signal addressed to the node 1202 and written in the memory unit B 569 is converted into an optical signal of the wavelength $\lambda_9$ by the transmitting unit B 565, and the optical signal of the wavelength $\lambda_9$ is multiplexed with optical signals of the wavelengths $\lambda_2$, $\lambda_4$, $\lambda_6$, and $\lambda_8$ to be transmitted to the right by the optical coupler B 560 via the optical coupler D 562. Thereafter, the multiplexed signals are output onto the optical fiber 1275.

In this manner, the optical signal addressed to the node 1202, which is output from the node 1201 as an optical signal of $\lambda_9$ to be transmitted to the right, is input to the optical coupler A 558 of the node 1202. The node 1202 is the reception destination node of the signal sent from the node 1207. The arrangement of the node 1202 is as shown in FIG. 7. The optical signal of the wavelength $\lambda_9$ input to the optical coupler A 558 passes through the optical coupler E 574 and the filter C 566, and is converted into an electrical signal by the receiving unit B 570. The electrical signal is input to the SW unit 571. Since the reception destination node of this signal is the self node, the SW unit 571 outputs the electrical signal output from the receiving unit B 570 to the output unit 572. The output unit 572 deletes the reception destination node information and the like from the transmitted signal.

In this embodiment, transmission information, which is output from the node 1207 to be addressed to the node 1202, is transmitted to the node 1202 via a total of four times of repeating in the four nodes 1208, 1217, 1209, and 1201. In this manner, a logical loop-shaped transmission route connecting the nodes 1201, 1202, 1203, 1204, 1205, 1206, 1207, and 1208 is formed via the nodes 1217 and 1209. This logical loop-shaped transmission route serves as a horizontal loop-shaped transmission channel in the Manhattan street network.

As described above in the fourth embodiment, a network which is constituted by 64 nodes and similar to the Manhattan street network can be constituted using, e.g., 10 wavelengths without using any connection means in the first embodiment.

In this embodiment as well, the communication control algorithm is not limited to that of the Manhattan street network. In the arrangement of this embodiment, a node, located at the most upstream side in the transmission direction of the first or second channel (group), of a given subgroup in a given node group temporarily receives a signal which is transmitted from a subgroup at the upstream side of the given subgroup via the first or second channel (group), and transmits the received signal toward the most upstream node in the subgroup at the upstream side of the given subgroup via a channel in the third channel group, so that this signal can be received by the most upstream node in the subgroup at the upstream side of the given subgroup. In this manner, a loop-shaped transmission route can be formed by a given subgroup and the most upstream node in a subgroup at the downstream side of the given subgroup in addition to a loop-shaped transmission route formed by each channel in the third channel group.

(Fifth Embodiment)

Figure 14:
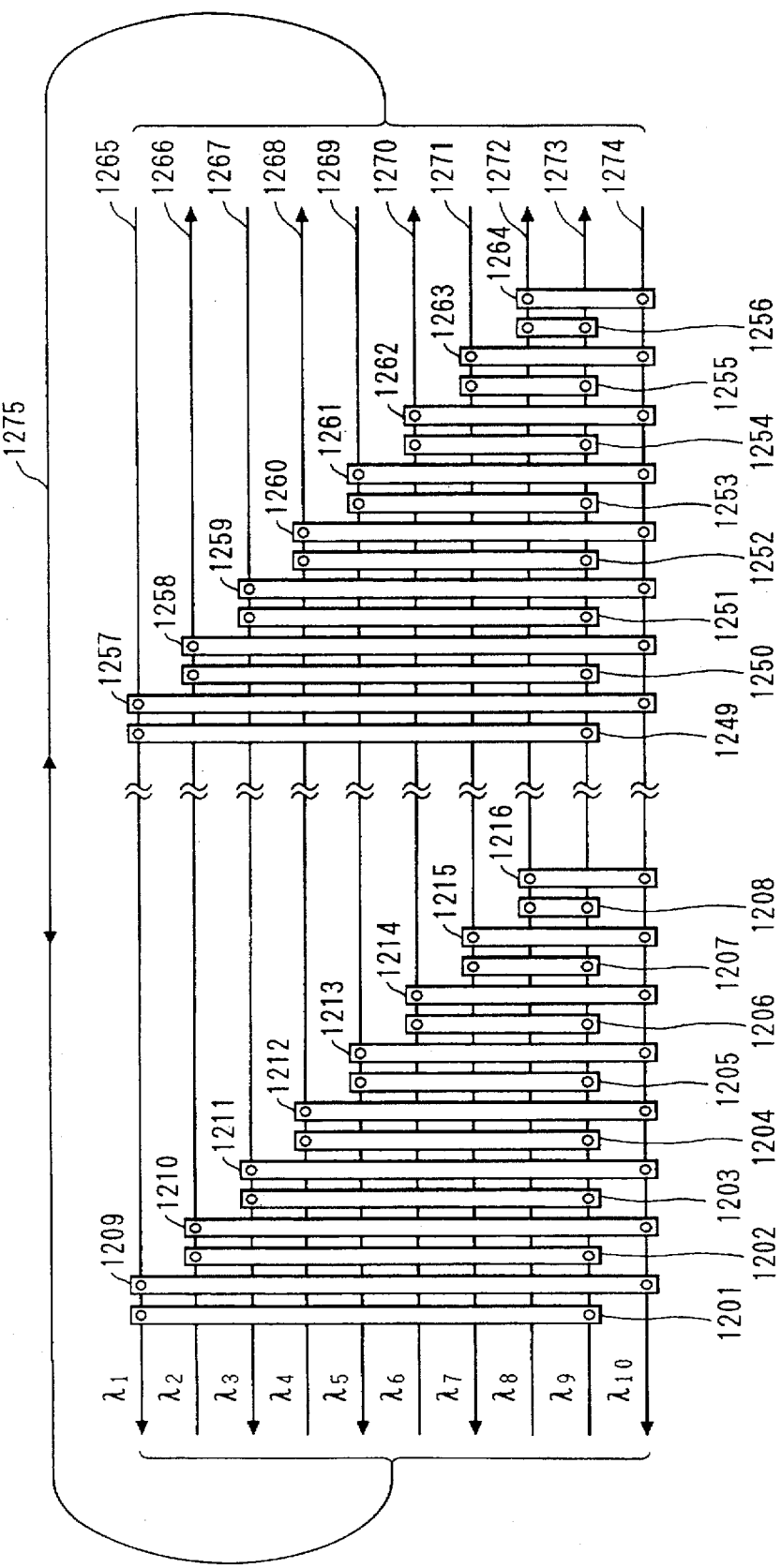
FIG. 14 is a schematic view showing the arrangement of a network according to the fifth embodiment of the present invention.

FIG. 14 shows the fifth embodiment of the present invention. In this embodiment, nodes belonging to different node groups are alternately arranged by overlapping subgroups in the fourth embodiment in units of nodes in the single-core optical fiber ring 1275. In this embodiment as well, the node arrangement on a matrix of a two-dimensional coordinate system is the same as that shown in FIG. 13 of the fourth embodiment.

In FIG. 14 as well, the leftmost nodes 1201, 1217, 1233, and 1249 of the subgroups in the first node group, which share the first channel 1273 for rightward transmission, share the channel 1265 in the third channel group, which channel has a leftward transmission direction. Also, the rightmost nodes 1216, 1232, 1248, and 1254 of the subgroups in the second node group, which share the second channel 1274 for leftward transmission, share the channel 1272 in the third channel group, which channel has a rightward transmission direction.

In this embodiment, the arrangements of the nodes are the same as those in the fourth embodiment. Also, the operation of the nodes in transmission is the same as that in the fourth embodiment.

As described in this embodiment, as long as the positional relationship between nodes which transmit and receive a signal using channels accessed by the self node, i.e., the wavelengths to be transmitted/received by the self node, is left unchanged, the logical connection relationship shown in FIG. 13 can be realized by modifying the fourth and fifth embodiments.

In each of the above embodiments, a loop-shaped transmission route is formed within a subgroup in each of the first to third embodiments, and is formed by a subgroup and a node relatively adjacent to this subgroup in each of the fourth and fifth embodiments. With these arrangements, a communication can be performed between nodes relatively adjacent to each other without increasing a transmission distance.

Figure 27:
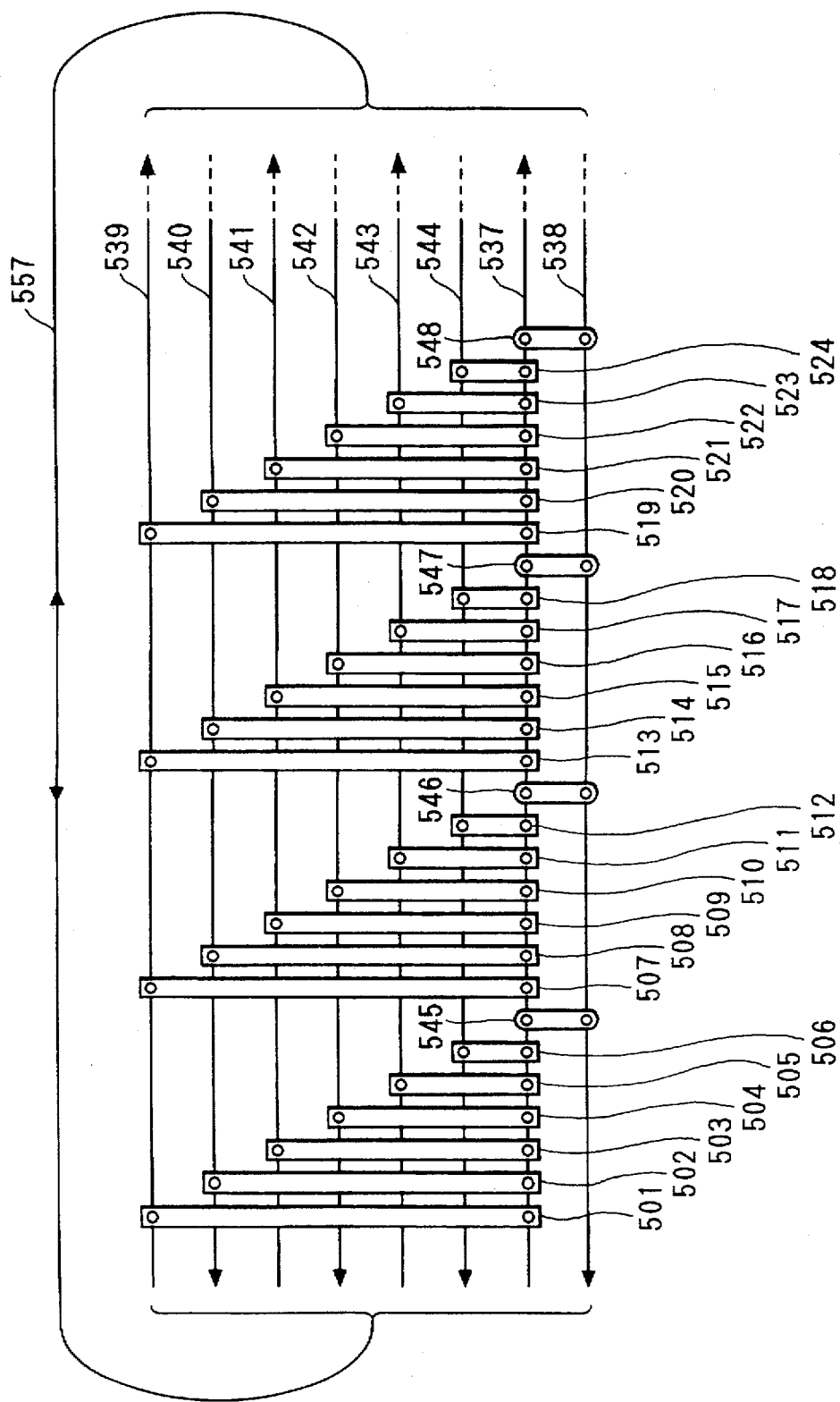
FIG. 27 is a schematic view showing another arrangement of a network of the first embodiment.
Figure 28:
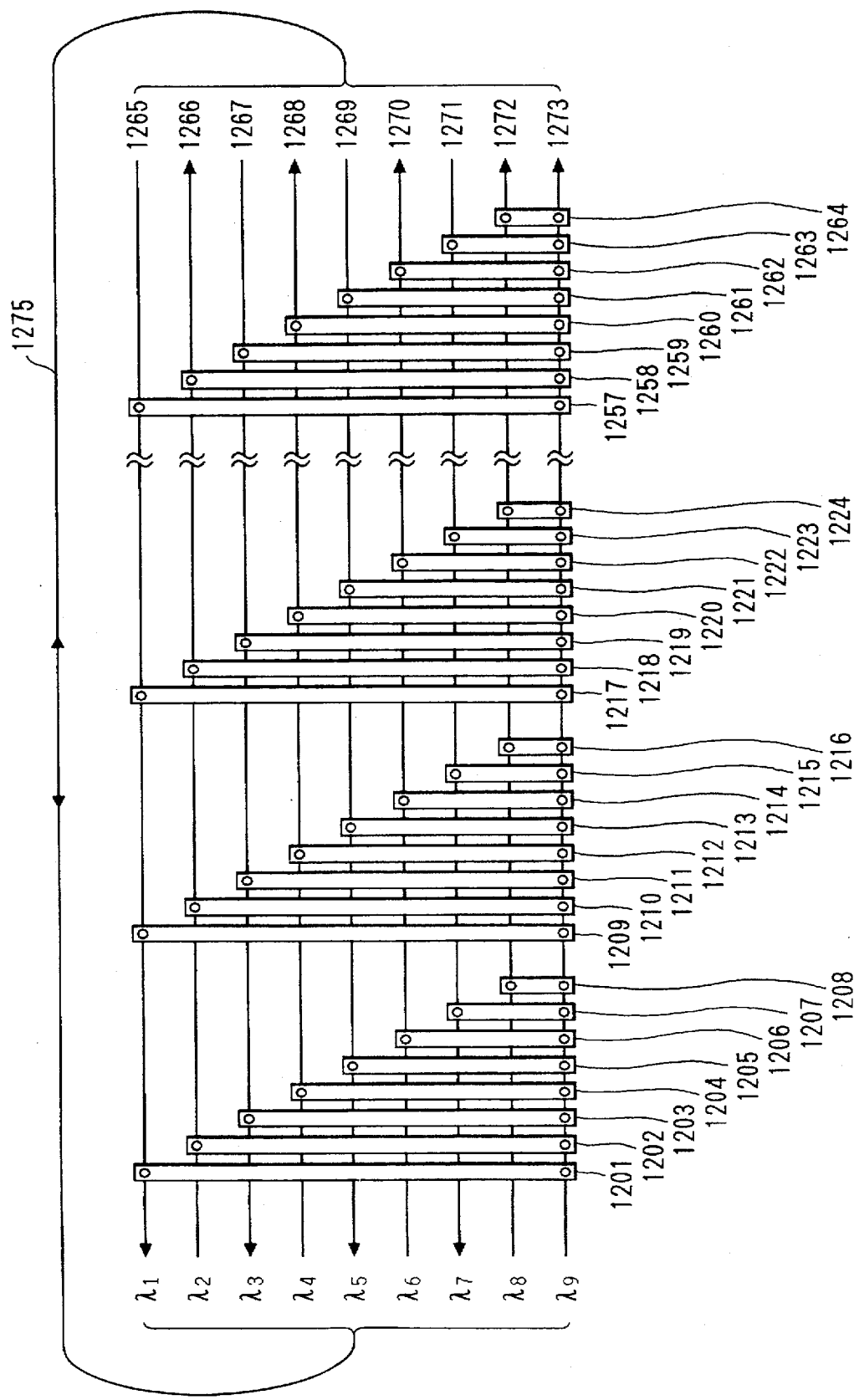
FIG. 28 is a schematic view showing another arrangement of a network of the fourth embodiment.

In each of the first to fifth embodiments, subgroups are divided to belong to first and second node groups. The first and second node groups respectively access first and second channels which have transmission directions opposite to each other. The loop-shaped transmission route in the subgroups belonging to the first node group and that in the subgroups belonging to the second node group have transmission directions opposite to each other. However, the present invention is not limited to this. For example, in the first embodiment, subgroups need not be divided into first and second node groups, and all nodes may access the first channel. FIG. 27 shows this arrangement. At this time, the algorithm of the Manhattan street network may be used as a communication algorithm modified in the transmission direction of a horizontal transmitting path, or another communication algorithm may be used. Similarly, in the fourth embodiment, all nodes may access a first channel. FIG. 28 shows this arrangement. At this time, a loop-shaped transmission route is formed by one subgroup and the node closest to this subgroup in the downstream side of the transmission direction of the first channel in the subgroup, e.g., the node 1217 in the subgroup of the nodes 1209 to 1216.

When nodes overlap to access a channel in a third channel group in each subgroup, the nodes may examine each signal destination address. In addition, a node having many signals to be transmitted/received may access a plurality of channels in the third channel group. Furthermore, the respective subgroups access the third channel group in the same pattern. That is, nodes at the same positions in different subgroups (e.g., positioning at the second node from the right) access the same channel in the third channel group. However, the present invention is not limited to this. A transmission route is easily set with nodes accessing in the same pattern regardless of using the algorithm of the Manhattan street network or not.

(Sixth Embodiment)

Figure 15:
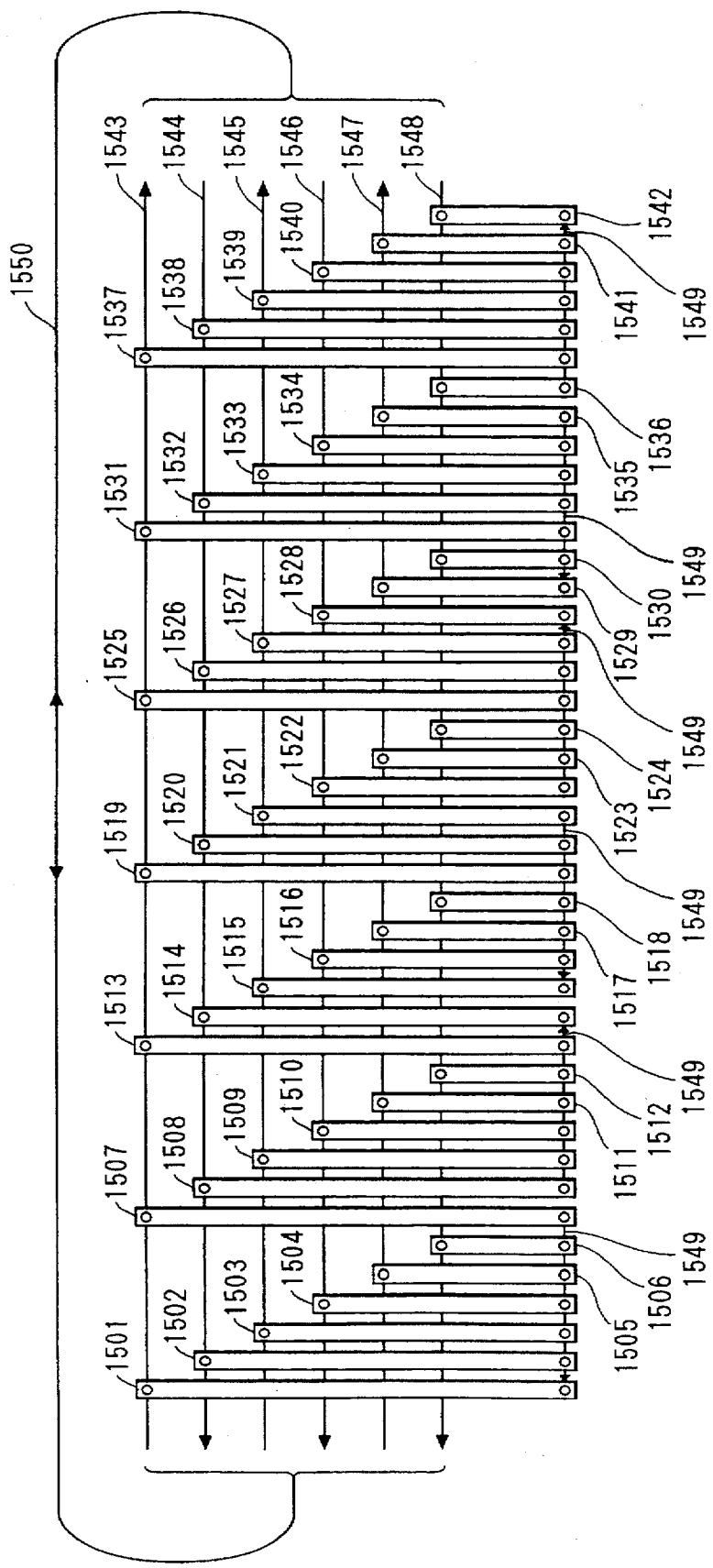
FIG. 15 is a schematic view showing the arrangement of a network according to the sixth embodiment of the present invention.

FIG. 15 shows the arrangement according to the sixth embodiment of the present invention, which uses the algorithm of the Manhattan street network as in the above-mentioned prior art. FIG. 15 illustrates a connection example for connecting 42 nodes by forming seven channels using wavelength multiplexing of seven wavelengths in a single-core optical fiber ring. In this embodiment, unlike in the above embodiments, channels are divided into first and second channel groups. Also, nodes are divided into node groups in units of seven neighboring nodes. Referring to FIG. 15, nodes 1501 to 1542 are arranged. Of these nodes, the seven nodes 1501 to 1507 constitute a first node group, and the seven nodes 1508 to 1514 constitute a second node group. Similarly, the nodes 1515 to 1521, 1522 to 1528, 1529 to 1535, and 1536 to 1542 respectively constitute third, fourth, fifth, and sixth node groups. Each node accesses two assigned channels indicated by marks ○ in FIG. 15, i.e., performs transmission/reception using the two assigned wavelengths. The internal arrangements of these nodes will be described later. Seven channels 1543 to 1549 are formed in a single-core optical fiber ring 1550 using different wavelengths $\lambda_1$, $\lambda_2$, $\lambda_3$, $\lambda_4$, $\lambda_5$, $\lambda_6$, and $\lambda_7$. The channel 1549 formed by the wavelength $\lambda_7$ corresponds to a first channel (group) to be accessed by all the nodes. The six channels 1543 to 1548 formed by the wavelengths $\lambda_1$ to $\lambda_6$ constitute a second channel group. In this group, the channels 1543, 1545, and 1547 have a rightward transmission direction, and the channels 1544, 1546, and 1548 have a leftward transmission direction.

The first channel has different transmission directions in units of node groups, and a signal transmitted through this channel is not transmitted beyond the corresponding node group. The first channel has different transmission directions in units of node groups, the first, third, and fifth node groups have a leftward transmission direction, and the second, fourth, and sixth node groups have a rightward transmission direction. The number of nodes in each node group is N+1 if the number of channels in the second channel group is N.

In this embodiment, as the wavelengths, $\lambda_1=1.50$ μm, $\lambda_2=1.51$ μm, $\lambda_3=1.52$ μm, $\lambda_4=1.53$ μm, $\lambda_5=1.54$ μm, $\lambda_6=1.55$ μm, and $\lambda_7=1.56$ μm are used.

Figure 16:
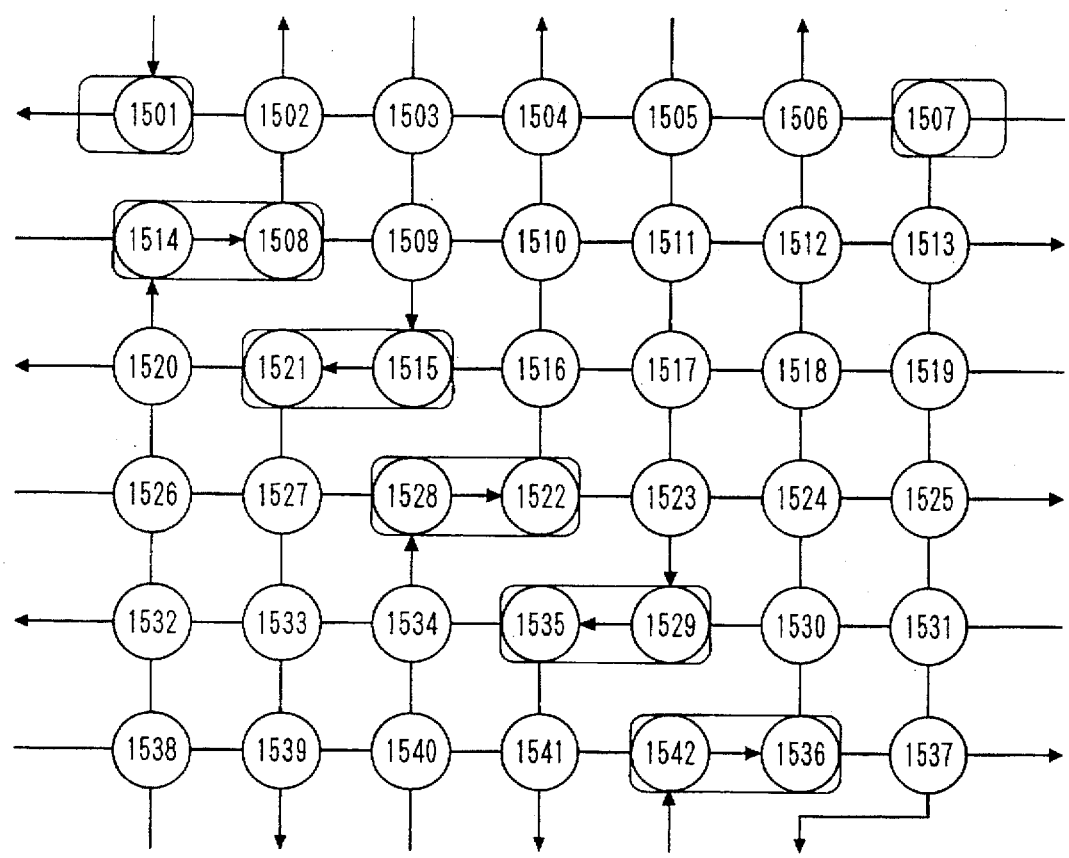
FIG. 16 is a view logically showing the connection relationship of the network of the sixth embodiment on a two-dimensional coordinate system.
Figure 17:
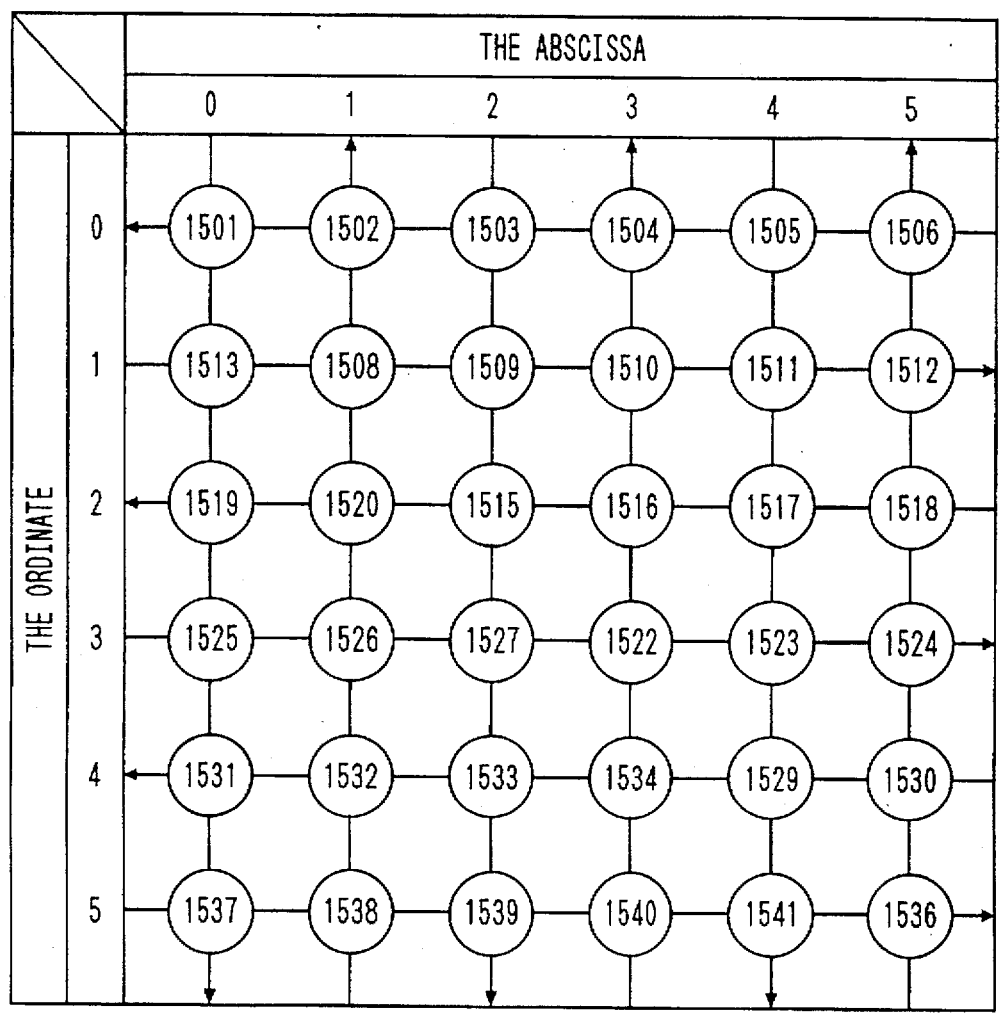
FIG. 17 is a view logically showing the connection relationship of the network of the sixth embodiment on a two-dimensional coordinate system.

FIG. 16 shows the connection relationship among the nodes on a two-dimensional matrix in the sixth embodiment of the present invention shown in FIG. 15. Numbers in circles in FIG. 16 indicate those of the nodes in FIG. 15. Transmission routes, indicated by rectangles, from the node 1501 to 1507, from the node 1514 to the node 1508, from the node 1515 to the node 1521, from the node 1528 to the node 1522, from the node 1529 to the node 1535, and from the node 1542 to the node 1536 are used as both the vertical and horizontal transmission routes. More specifically, both vertical transmission from the node 1507 to the node 1527 and horizontal transmission from the node 1516 to the node 1520 are realized via the transmission route from the node 1515 to the node 1521. The above-mentioned pairs of nodes corresponding to the common transmission routes will be referred to as degenerated nodes hereinafter. FIG. 17 shows the connection relationship obtained when each pair of degenerated nodes is represented by a node with a smaller node number. In FIG. 17, the pairs of degenerated nodes 1501 and 1507, 1508 and 1514, 1515 and 1521, 1522 and 1528, 1529 and 1535, and 1536 and 1542 are respectively indicated by 1501, 1508, 1515, 1522, 1529, and 1516. More specifically, the seventh, 14th, 21st, 28th, 35th, and 42nd nodes corresponding to multiples of 7 as a value obtained by adding 1 to the number of channels in the second channel group are omitted. FIG. 17 shows the horizontal and vertical coordinates of the nodes to have the node 1501 as an origin. The horizontal coordinate of the Y-th node is equal to the remainder obtained when the value obtained by subtracting 1 from Y is divided by 6 as the number of channels in the second channel group. Similarly, the vertical coordinate of the Y-th node is the integral part of a value obtained by dividing Y by 7 as a value obtained by adding 1 to the number of channels in the second channel group. In this manner, upon introduction of the concept of degenerated nodes, the network system of the present invention shown in FIG. 15 has the same network topology as that of the conventional Manhattan street network, as shown in FIG. 17. Therefore, in route selection (routing) in transmission of this embodiment, various existing algorithms examined for the Manhattan street network can be used. Upon routing using these existing algorithms, if the reception destination is a degenerated node, a node which represents the two degenerated nodes determines the reception destination, and determines whether or not a signal is to be transferred to the other degenerated node. As the routing algorithm of this embodiment, a technique described in NICHOLAS, F., MAXEMCHUK, "Routing in the Manhattan street Network", IEEE TRANSACTIONS on COMMUNICATIONS, Vol. 35, No. 5, MAY 1987, pp. 503-512, can be used.

The arrangement of each of the nodes such as the nodes 1503, 1505, 1510, 1512, . . . in the sixth embodiment of the present invention, which are located at the third and fifth positions in the respective node groups and transmit/receive two wavelengths ($\lambda_r$ and $\lambda_e$) having different transmission directions is the same as that shown in FIG. 6 of the nodes used in the first embodiment.

The arrangement of each of the nodes such as the nodes 1509, 1511, 1513, 1523, 1525, 1527, . . . in the sixth embodiment of the present invention, which are located at the second, fourth, and sixth positions in the even-numbered node groups and transmit/receive two wavelengths to be transmitted to the right is the same as that shown in FIG. 7 of the nodes.

The nodes 1502, 1504, 1506, 1516, 1518, 1520, and the like in FIG. 15 of the sixth embodiment of the present invention are nodes which are located at the second, fourth, and sixth positions in the odd-numbered node groups and transmit/receive two wavelengths $\lambda_{e1}$ and $\lambda_{e2}$ to be transmitted to the left. Each of these nodes has an arrangement obtained by reversing the arrangement shown in FIG. 7 in the right-and-left direction, and replacing $\lambda_{r1}$ by $\lambda_{e1}$ and $\lambda_{r2}$ by $\lambda_{e2}$.

Figure 18:
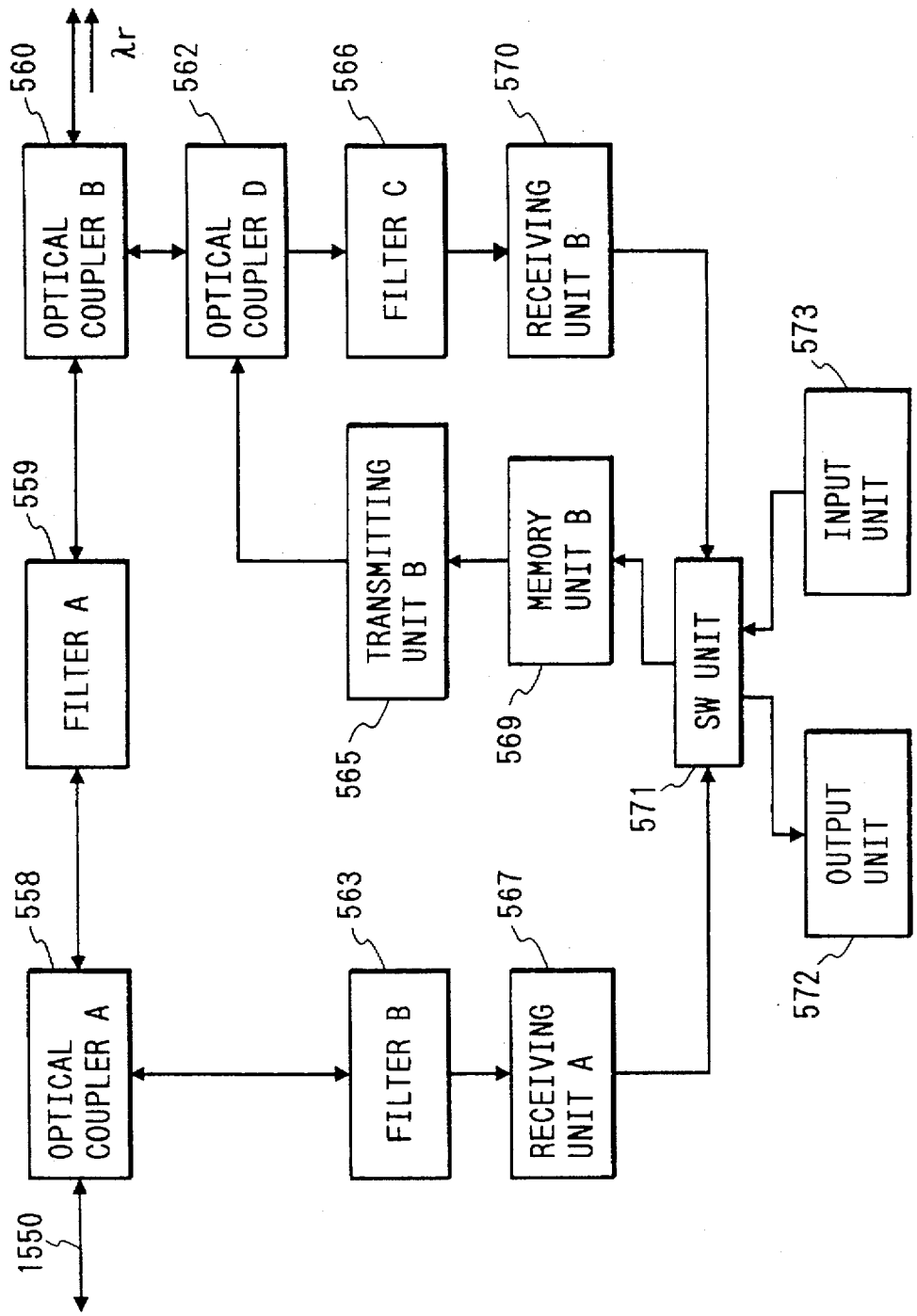
FIG. 18 is a block diagram showing the arrangement of a node used in the sixth embodiment.

FIG. 18 shows the arrangement of each of the nodes such as the nodes 1501, 1515, 1529, and the like in the sixth embodiment of the present invention, which are located at the first positions in the odd-numbered node groups, and which transmit/receive one wavelength to be transmitted to the right and receive one wavelength to be transmitted to the left. The arrangement shown in FIG. 18 is obtained by omitting the optical coupler C 561, the transmitting unit A 564, and the memory unit A 568 from the arrangement shown in FIG. 6, and blocks denoted by the same reference numerals as in FIG. 6 provide the same functions. The nodes 1514, 1528, and 1542 in FIG. 15 in the sixth embodiment of the present invention are nodes which are located at the seventh positions in the even-numbered node groups, and which transmit/receive one wavelength $\lambda_e$ to be transmitted to the left and receive one wavelength $\lambda_r$ to be transmitted to the right. Each of these nodes has an arrangement obtained by reversing the arrangement shown in FIG. 18 in the right-and-left direction, and replacing $\lambda_r$ by $\lambda_e$ and $\lambda_e$ by $\lambda_r$.

Figure 19:
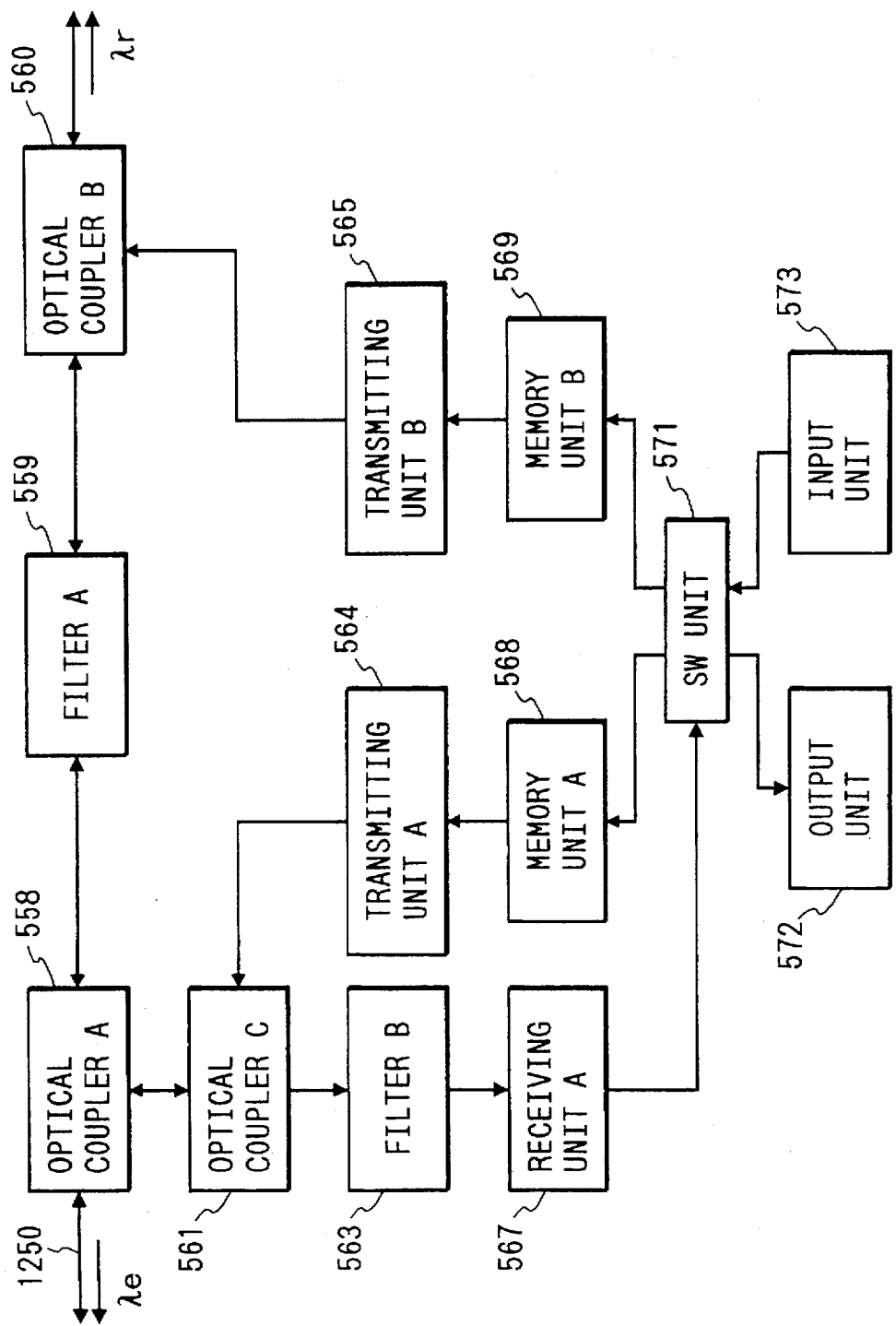
FIG. 19 is a block diagram showing another arrangement of the node used in the sixth embodiment.

FIG. 19 shows the arrangement of each of the nodes such as the nodes 1507, 1521, 1535, and the like in the sixth embodiment of the present invention, which are located at the seventh positions in the odd-numbered node groups, and which transmit/receive one wavelength to be transmitted to the right and transmit one wavelength to be transmitted to the left. The arrangement shown in FIG. 19 is obtained by omitting the optical coupler D 562, the filter C 566, and the receiving unit B 570 from the arrangement shown in FIG. 6, and the same blocks denoted by the same reference numerals as in FIG. 6 provide the same functions. The nodes 1508, 1522, and 1536 in FIG. 15 of the sixth embodiment of the present invention are nodes which are located at the first positions in the even-numbered node groups, and which transmit/receive one wavelength $\lambda_e$ to be transmitted to the left and transmit one wavelength $\lambda_r$ to be transmitted to the right. Each of these nodes has an arrangement obtained by reversing the arrangement shown in FIG. 19 in the right-and-left direction, and replacing $\lambda_r$ by $\lambda_e$ and $\lambda_e$ by $\lambda_r$.

The operation of the sixth embodiment of the present invention will be described below with reference to FIGS. 15, 16, 17, 18, 19, 6, and 7. In the following description, a case will be exemplified wherein a signal is to be transmitted from the node 1511 to the node 1527.

The node 1511 as a transmission source node has an arrangement shown in FIG. 7. In this node, a wavelength corresponding to $\lambda_{r1}$ is $\lambda_5$, and a wavelength corresponding to $\lambda_{r2}$ is $\lambda_7$, as indicated by marks ○ in FIG. 15. In the node 1511, when a signal to be transmitted to the node 1527, which is added with reception destination information, is input from the input unit 573, the SW unit 571 examines which $\lambda_5$ and $\lambda_7$ is used for transmitting the signal. As the examination algorithm of this embodiment, the above-mentioned technique can be used. With this technique, $\lambda_5$ is determined as the transmission wavelength. The output signal from the input unit 573 is input to the memory unit B 569 and is sequentially stored at the end of a memory queue. The transmitting unit B 565 converts an electrical signal output from the memory unit B 569 into an optical signal of the wavelength $\lambda_5$, and sequentially outputs the converted signal to the optical coupler F 575. The transmitting unit A 564 converts an electrical signal output from the memory unit A 568 into an optical signal of the wavelength $\lambda_7$, and sequentially outputs the converted signal to the optical coupler F 575. This signal is a signal to be, e.g., repeated by the node 1511. The optical signals of the wavelengths $\lambda_5$ and $\lambda_7$ output to the optical coupler F 575 are output to the optical coupler B 560, and are multiplexed with optical signals of other wavelengths ($\lambda_1$ and $\lambda_3$) passing through the filter A 559 by the optical coupler B 560, and the multiplexed signals are output onto the optical fiber 1550 to propagate to the right. In this manner, the optical fiber 1550 transmits optical signals of the wavelengths $\lambda_1$, $\lambda_3$, $\lambda_5$, and $\lambda_7$ from the left to the right, and transmits optical signals of the wavelengths $\lambda_2$, $\lambda_4$, and $\lambda_6$ from the right to the left. These optical signals of different wavelengths are transmitted without disturbing other signals since they do not interfere with each other.

The optical signals of the wavelengths $\lambda_1$, $\lambda_3$, $\lambda_5$, and $\lambda_7$ output from the optical coupler B 560 of the node 1511 are input to the neighboring node 1512. The node 1512 is a node for transmitting/receiving an optical signal of the wavelength $\lambda_7$ to be transmitted to the right and an optical signal of the wavelength $\lambda_6$ to be transmitted to the left, and has an arrangement shown in FIG. 6. The optical signals of the wavelengths $\lambda_1$, $\lambda_3$, $\lambda_5$, and $\lambda_7$ input to the optical coupler A 558 of the node 1512 are divided by the optical coupler A and output to the optical coupler C 561 and the filter A 559. The optical signals of the wavelengths $\lambda_1$, $\lambda_3$, $\lambda_5$, and $\lambda_7$ input to the optical coupler C 561 are output to the filter B 563. The filter B 563 passes only the optical signal of the wavelength $\lambda_7$, and cuts off other optical signals. The optical signal of the wavelength $\lambda_7$ passing through the filter B 563 is received by the receiving unit A 567, and is converted into an electrical signal. When the reception destination node is the self node, the converted electrical signal is output to the output unit 572 via the SW unit 571. However, when the reception destination node is not the self node, in accordance with a predetermined algorithm, the electrical signal is stored in the memory unit A 568 or B 569, the electrical signal is converted into an optical signal of the wavelength $\lambda_6$ by the transmitting unit A 564 or is converted into an optical signal of the wavelength $\lambda_7$ by the transmitting unit B 565, and the converted optical signal is then output to the optical coupler C 561 or D 562.

On the other hand, of the optical signals of the wavelengths $\lambda_1$, $\lambda_3$, $\lambda_5$, and $\lambda_7$ divided by the optical coupler A of the node 1512 and input to the filter A 559, the optical signal of the wavelength $\lambda_7$ is cut off by the filter A 559 and only the optical signals of the wavelengths $\lambda_1$, $\lambda_3$, and $\lambda_5$ pass through the filter A 559 since the filter A 559 is a cut-off filter for the wavelengths $\lambda_6$ and $\lambda_7$. The optical signals of the wavelengths $\lambda_1$, $\lambda_3$, and $\lambda_5$ are output to the optical coupler B 560. In the optical coupler B 560, the optical signals of the wavelengths $\lambda_1$, $\lambda_3$, and $\lambda_5$ are multiplexed with the optical signal of the wavelength $\lambda_7$ output from the optical coupler D 562, and the multiplexed signals are output onto the optical fiber 1550.

The optical coupler B 560 of the node 1512 receives optical signals of the wavelengths $\lambda_2$, $\lambda_4$, and $\lambda_6$ transmitted from the node 1513 to the left. Of these signals, only the optical signal of the wavelength $\lambda_6$ is converted into an electrical signal by the receiving unit B 570, and the electrical signal is output to the SW unit 571. The SW unit 571 processes this electrical signal in the same manner as that output from the receiving unit A 567. On the other hand, the optical signals of the wavelengths $\lambda_2$ and $\lambda_4$ pass through the filter A 559, and are multiplexed with the optical signal of the wavelength $\lambda_6$ output from the transmitting unit A 564 by the optical coupler A 558. The multiplexed signals are output onto the optical fiber 1550 as optical signals to be transmitted to the left.

The optical signals of the wavelengths $\lambda_1$, $\lambda_3$, $\lambda_5$, and $\lambda_7$ to be transmitted to the right, which are output from the optical coupler B 560 of the node 1512, are input to the node 1513. The node 1513 is a node for transmitting/receiving two wavelengths ($\lambda_1$ and $\lambda_7$) to be transmitted to the right, and has an arrangement shown in FIG. 7. The optical signals of the wavelengths $\lambda_1$, $\lambda_3$, $\lambda_5$, and $\lambda_7$ input to the optical coupler A 558 of the node 1513 are divided by the optical coupler A and the divided signals are output to the optical coupler E 574 and the filter A 559. The optical signals of the wavelengths $\lambda_1$, $\lambda_3$, $\lambda_5$, and $\lambda_7$ input to the optical coupler E 574 are further divided and output to the filters B 563 and C 566. In the node 1513, since $\lambda_{r1}$ and $\lambda_{r2}$ are respectively set to be $\lambda_1$ and $\lambda_7$, as indicated by marks ○ in FIG. 15, the filter B 563 is a cut-off filter for $\lambda_3$, $\lambda_5$, and $\lambda_7$, and passes only the optical signal of $\lambda_1$. The optical signal of $\lambda_1$ is received by the receiving unit A 567, and is converted into an electrical signal. The electrical signal is output to the SW unit 571. Similarly, the filter C 566 passes only the optical signal of the wavelength $\lambda_7$, and cuts off other optical signals. The optical signal of the wavelength $\lambda_7$ passing through the filter C 566 is received by the receiving unit B 570, and is converted into an electrical signal. Thereafter, the electrical signal is output to the SW unit 571. The electrical signals output from the receiving units A 567 and B 570 and input to the SW unit 571 are processed according to the reception destination node information. That is, when the reception destination node is not the self node, in accordance with a predetermined algorithm, the electrical signals are stored in the memory unit A 568 or B 569, the electrical signals are converted into optical signals of the wavelength $\lambda_7$ by the transmitting unit A 564 or are converted into optical signals of the wavelength $\lambda_1$ by the transmitting unit B 565, and these optical signals are sent to the optical coupler B 560 via the optical coupler F 575. On the other hand, when the reception destination node is the self node, the electrical signals are output to the output unit 572.

On the other hand, of the optical signals of the wavelengths $\lambda_1$, $\lambda_3$, $\lambda_5$, and $\lambda_7$ divided by the optical coupler A of the node 1513 and input to the filter A 559, the optical signals of the wavelengths $\lambda_1$ and $\lambda_7$ are cut off by the filter A 559 and only the optical signals of the wavelengths $\lambda_3$ and $\lambda_5$ pass through the filter A 559 since the filter A 559 is a cut-off filter for the wavelengths $\lambda_1$ and $\lambda_7$. The optical signals of the wavelengths $\lambda_3$ and $\lambda_5$ are output to the optical coupler B 560. In the optical coupler B 560, the optical signals of the wavelengths $\lambda_3$ and $\lambda_5$ are multiplexed with the optical signals of the wavelengths $\lambda_1$ and $\lambda_5$ output from the optical coupler F 575, and the multiplexed signals are output onto the optical fiber 1550.

On the other hand, the optical coupler B 560 of the node 1513 receives optical signals of the wavelengths $\lambda_2$, $\lambda_4$, and $\lambda_6$ to be transmitted to the left, which are output from the right neighboring node 1514. These optical signals pass through the filter A 559 and the optical coupler A 558, and are output onto the optical fiber 1550.

In this manner, the optical signals of the wavelengths $\lambda_1$, $\lambda_3$, $\lambda_5$, and $\lambda_7$ to be transmitted to the right, which are output from the optical coupler B 560 of the node 1513 onto the optical fiber 1550, are input to the optical coupler A 558 of the node 1514. The node 1514 is a node for receiving an optical signal of $\lambda_7$ to be transmitted to the right, and transmitting/receiving an optical signal of $\lambda_2$ to be transmitted to the left, and has an arrangement horizontally symmetrical to that shown in FIG. 18. The description of the operation of the node 1514 will be given with reference to an arrangement obtained by reversing the arrangement in FIG. 18 in the right-and-left direction. The optical signals of the wavelengths $\lambda_1$, $\lambda_3$, $\lambda_5$, and $\lambda_7$ input to the optical coupler B 560 of the node 1514 are divided by the optical coupler B 560 and the divided signals are output to the optical coupler D 562 and the filter A 559. The optical signals of the wavelengths $\lambda_1$, $\lambda_3$, $\lambda_5$, and $\lambda_7$ input to the optical coupler D 562 are output to the filter C 566. The filter C 566 passes only the optical signal of the wavelength $\lambda_7$, and cuts off other optical signals. The optical signal of the wavelength $\lambda_7$ passing through the filter C 566 is received by the receiving unit B 570, and is converted into an electrical signal. Thereafter, when the reception destination node is the self node, the electrical signal is output to the output unit 572 via the SW unit 571. On the other hand, when the reception destination node is not the self node, in accordance with a predetermined algorithm, the electrical signal is stored in the memory unit B 569, the electrical signal is then converted into an optical signal of the wavelength $\lambda_2$ by the transmitting unit 565, and the optical signal is output onto the optical fiber 1550 as an optical signal to be transmitted to the left via the optical couplers D 562 and B 560. On the other hand, of the optical signals of the wavelengths $\lambda_1$, $\lambda_3$, $\lambda_5$, and $\lambda_7$, which are divided by the optical coupler B 560 of the node 1514 and input to the filter A 559, the optical signal of the wavelength $\lambda_7$ is cut off by the filter A 559 and only the optical signals of the wavelengths $\lambda_1$, $\lambda_3$, and $\lambda_5$ pass through the filter A 559 since the filter A 559 is a cut-off filter for the wavelengths $\lambda_2$ and $\lambda_7$. The optical signals of the wavelengths $\lambda_1$, $\lambda_3$, and $\lambda_5$ are output onto the optical fiber 1550 via the optical coupler A 559. Since the node 1514 does not have a transmission function of the wavelength $\lambda_7$, signals to be transmitted to the right from the node 1514 are only the optical signals of the wavelengths $\lambda_1$, $\lambda_3$, and $\lambda_5$.

On the other hand, the optical coupler A 558 of the node 1514 receives optical signals of the wavelengths $\lambda_2$, $\lambda_4$, and $\lambda_6$ to be transmitted to the left, which are output from the right neighboring node 1515. Of these signals, only the optical signal of the wavelength $\lambda_2$ is received by the receiving unit A 567, and is processed in the same manner as the optical signal of $\lambda_6$ in the node 1512.

Subsequently, the optical signals of the wavelengths $\lambda_1$, $\lambda_3$, and $\lambda_5$ to be transmitted to the right are input to the optical coupler A 558 of the node 1515. The node 1515 is a node for transmitting/receiving an optical signal of $\lambda_3$ to be transmitted to the right, and receiving an optical signal of $\lambda_7$ to be transmitted to the left, and has an arrangement shown in FIG. 18. The operation of the node 1515 is the same as that of the node 1514, and of the optical signals of the wavelengths $\lambda_1$, $\lambda_3$, and $\lambda_5$ to be transmitted to the right, only the optical signal of the wavelength $\lambda_3$ is received and processed. In the node group consisting of the nodes 1515, 1516, 1517, 1518, 1519, 1520, and 1521, the optical signal of the wavelength $\lambda_7$ is set to be transmitted to the left. For this reason, the optical coupler B 560 of the node 1515 receives optical signals of the wavelengths $\lambda_2$, $\lambda_4$, $\lambda_6$, and $\lambda_7$ to be transmitted to the left, which are output from the right neighboring node 1516. Of these signals, only the optical signal of the wavelength $\lambda_7$ is received by the receiving unit B 570, and is processed in the same manner as the optical signal of $\lambda_6$ in the node 1512. Since the node 1515 does not have a transmission function of the wavelength $\lambda_7$, optical signals to be transmitted to the left from the node 1515 are only the optical signals of the wavelengths $\lambda_2$, $\lambda_4$, and $\lambda_6$.

Subsequently, the optical signals of the wavelengths $\lambda_1$, $\lambda_3$, and $\lambda_5$ to be transmitted to the right are input to the node 1516. Since the node 1516 is a node for transmitting/receiving two wavelengths ($\lambda_4$ and $\lambda_7$) to be transmitted to the left, the optical signals of the wavelengths $\lambda_1$, $\lambda_3$, and $\lambda_5$ pass through the node 1516. In the node 1516, only optical signals of the wavelengths $\lambda_4$ and $\lambda_7$ to be transmitted to the left are processed.

The optical signals of the wavelengths $\lambda_1$, $\lambda_3$, and $\lambda_5$ to be transmitted to the right are then input to the node 1517. The node 1517 is a node for transmitting/receiving an optical signal of $\lambda_5$ to be transmitted to the right and an optical signal of $\lambda_7$ to be transmitted to the left, and has an arrangement shown in FIG. 6. The optical signal of the wavelength $\lambda_5$, which is sent from the node 1511 and addressed to the node 1527 is regenerated by this node 1517. The optical signals of the wavelengths $\lambda_1$, $\lambda_3$, and $\lambda_5$ input to the optical coupler A 558 of the node 1517 are input to the optical coupler C 561 and divided and output to the filter B 563. The filter B 563 passes only the wavelength $\lambda_5$, and cuts off the wavelengths $\lambda_1$ and $\lambda_3$. The optical signal of the wavelength $\lambda_5$ output from the filter B 563 is converted into an electrical signal by the receiving unit A 567, and is processed by the SW unit 571 in correspondence with the reception destination node information, as described above. In the description of this embodiment, since the optical signal of the wavelength $\lambda_5$ is a signal addressed to the node 1527, the SW unit selects $\lambda_7$ as the transmission wavelength, and writes this signal in the memory unit A 568.

The signal addressed to the node 1527 and written in the memory unit A 568 is sequentially read out, and is converted into an optical signal of the wavelength $\lambda_7$ by the transmitting unit A 564. The converted optical signal is output to the optical coupler A 558 via the optical coupler C 561. Optical signals of the wavelengths $\lambda_2$, $\lambda_4$, $\lambda_6$, and $\lambda_7$ to be transmitted to the left, which are divided by the optical coupler B 560 are input to the filter A 559. The filter A 559 cuts off the optical signal of the wavelength $\lambda_7$, and passes the optical signals of the wavelengths $\lambda_2$, $\lambda_4$, and $\lambda_6$. The optical signals of the wavelengths $\lambda_2$, $\lambda_4$, and $\lambda_6$ are multiplexed with the optical signal of the wavelength $\lambda_7$ output from the optical coupler C 561, and the multiplexed signals are output onto the optical fiber 1550 as optical signals to be transmitted to the left. Of the optical signals of the wavelengths $\lambda_2$, $\lambda_4$, $\lambda_6$, and $\lambda_7$ divided by the optical coupler B 560 and output to the optical coupler D 562, only the optical signal of the wavelength $\lambda_7$ passes through the filter C 566, and is converted into an electrical signal by the receiving unit B 570. Thereafter, the electrical signal is processed in the same manner in the above-mentioned corresponding node.

The optical signals of the wavelengths $\lambda_2$, $\lambda_4$, $\lambda_6$, and $\lambda_7$ to be transmitted to the left, which are output from the optical coupler A 558 of the node 1517, are input to the node 1516. The node 1516 is a node for transmitting/receiving two wavelengths ($\lambda_4$ and $\lambda_7$) to be transmitted to the left, and has an arrangement horizontally symmetrical to that shown in FIG. 7. In the node 1516, the optical signals of the wavelengths $\lambda_4$ and $\lambda_7$ are received, and are processed in the same manner as in the above-mentioned corresponding node, thus transmitting optical signals of the wavelengths $\lambda_4$ and $\lambda_7$. At this time, the optical signal of the wavelength $\lambda_7$ corresponds to a signal obtained by regeneration, at the wavelength $\lambda_7$, the optical signal of the wavelength $\lambda_5$, which is sent from the node 1511 to be addressed to the node 1527, in the node 1517. The transmission wavelength of the optical signal of the wavelength $\lambda_7$ is determined to be $\lambda_7$ using the above-mentioned repeating algorithm, and this signal is transmitted toward the node 1515 as an optical signal to be transmitted to the left.

The optical signals of the wavelengths $\lambda_2$, $\lambda_4$, $\lambda_6$, and $\lambda_7$ to be transmitted to the left, which are output from the node 1516, are input to the optical coupler B 560 of the node 1515. The node 1515 is a node for transmitting/receiving an optical signal of $\lambda_3$ to be transmitted to the right, and receiving an optical signal of $\lambda_7$ to be transmitted to the left, as described above, and has an arrangement shown in FIG. 18. Furthermore, the node 1515 is a degenerated node together with the node 1521. For this reason, of the optical signals of the wavelengths $\lambda_3$ and $\lambda_5$ received by the node 1515, a signal, which is not addressed to the self node, is output from the transmitting unit B 563 as an optical signal of the wavelength $\lambda_3$, and is multiplexed with the optical signals of the wavelengths $\lambda_1$ and $\lambda_5$ passing through the filter A 559 in the optical coupler B 560. The multiplexed signals are sent onto the optical fiber 1550 as optical signals to be transmitted to the right.

The optical signals of the wavelengths $\lambda_1$, $\lambda_3$, and $\lambda_5$ to be transmitted to the right, which are output from the node 1515, are transmitted via the nodes 1516, 1517, 1518, 1519, and 1520, as described above. During this interval, the optical signal of the wavelength $\lambda_3$ passes through all the nodes without being received, and is input to the node 1521. The optical signal which is sent from the node 1511 to be addressed to the node 1527, and is regenerated at the wavelength $\lambda_3$ by the node 1515, is regenerated again in the node 1521. The node 1521 is a node for transmitting/ receiving an optical signal of $\lambda_3$ to be transmitted to the right, and transmitting an optical signal of $\lambda_7$ to be transmitted to the left, and has an arrangement shown in FIG. 19. The transmission wavelength of the optical signal, addressed to the node 1527, of the wavelength $\lambda_3$, which is received by the receiving unit A 567 and is converted into an electrical signal, is determined to be the wavelength $\lambda_3$ using the above-mentioned repeating algorithm, and this signal is transmitted from the transmitting unit B 565. The optical signal of the wavelength $\lambda_3$ is multiplexed with the optical signals of the wavelengths $\lambda_1$ and $\lambda_5$ passing through the filter A 559 in the optical coupler B 560, and the multiplexed signals are output onto the optical fiber 1550 as optical signals to be transmitted to the right.

The optical signals of the wavelengths $\lambda_1$, $\lambda_3$, and $\lambda_5$ to be transmitted to the right, which are output from the node 1521, are transmitted via the nodes 1522, 1523, 1524, 1525, and 1526, as described above. During this interval, the optical signal of the wavelength $\lambda_3$ passes through all the nodes without being received, and is input to the node 1527. The node 1527 is a node for transmitting/receiving two wavelengths ($\lambda_3$ and $\lambda_7$) to be transmitted to the right as in the above-mentioned node 1513, and has an arrangement shown in FIG. 7. The receiving unit A 567 receives the optical signal of the wavelength $\lambda_3$. Since this optical signal is sent from the node 1511 to be addressed to the node 1527, and the SW unit 571 confirms that the reception destination node of this signal is the self node, the optical signal is output to the output unit 572.

In this manner, a signal is transmitted from the node 1511 to the node 1527.

At this time, conversely, when a signal is transmitted from the node 1527 to the node 1511, various routes are available. For example, in one route, a signal is transmitted from the node 1527 to the node 1528 at the wavelength $\lambda_7$, is transmitted at the wavelength $\lambda_4$ from the node 1528 to the node 1510 via the nodes 1522 and 1516, and then reaches the node 1511 at the wavelength $\lambda_7$ again.

In this embodiment, transmission between the nodes 1511 and 1527 has been exemplified. In this embodiment, since the nodes at the two ends of a node group consisting of a plurality of neighboring nodes access channels in the second channel group, which have a transmission direction opposite to that of the first channel, a loop-shaped transmission route can be formed in the node group, thus facilitating transmission in each node group.

In this embodiment, assuming that an M-th node in an L-th node group accesses a p-th channel of those in the second channel group, integers L, M, and p are determined to satisfy the following relation:

p is the remainder obtained when the sum of M and the product of L−1 and N+1 is divided by N. However, when the remainder is 0, p=N is set.

In this manner, a plurality of nodes in each node group are prevented from accessing an identical channel in the second channel group. However, when the algorithm of the Manhattan street network is not used, such a relation need not always be satisfied.

That is, assuming that nodes at the two ends of a k-th node group access an s-th channel of those in the second channel group, integers k and s need only be determined to satisfy the following relation:

s is the remainder obtained when k is divided by N. However, when the remainder is 0, s=N is set.

Note that N is the number of channels in the second channel group, and the number of nodes in each node group is N+1.

In this embodiment, the communication control algorithm is not limited to that of the Manhattan street network. As for the node arrangement, at least the nodes at the two ends of each node group need only access channels having a transmission direction opposite to the transmission direction of the first channel (group) accessed by the node group.

In each node group, a plurality of nodes may access an identical channel in the second channel group. Also, a node in each node group may access a plurality of channels in the second channel group.

(Seventh Embodiment)

Figure 20:
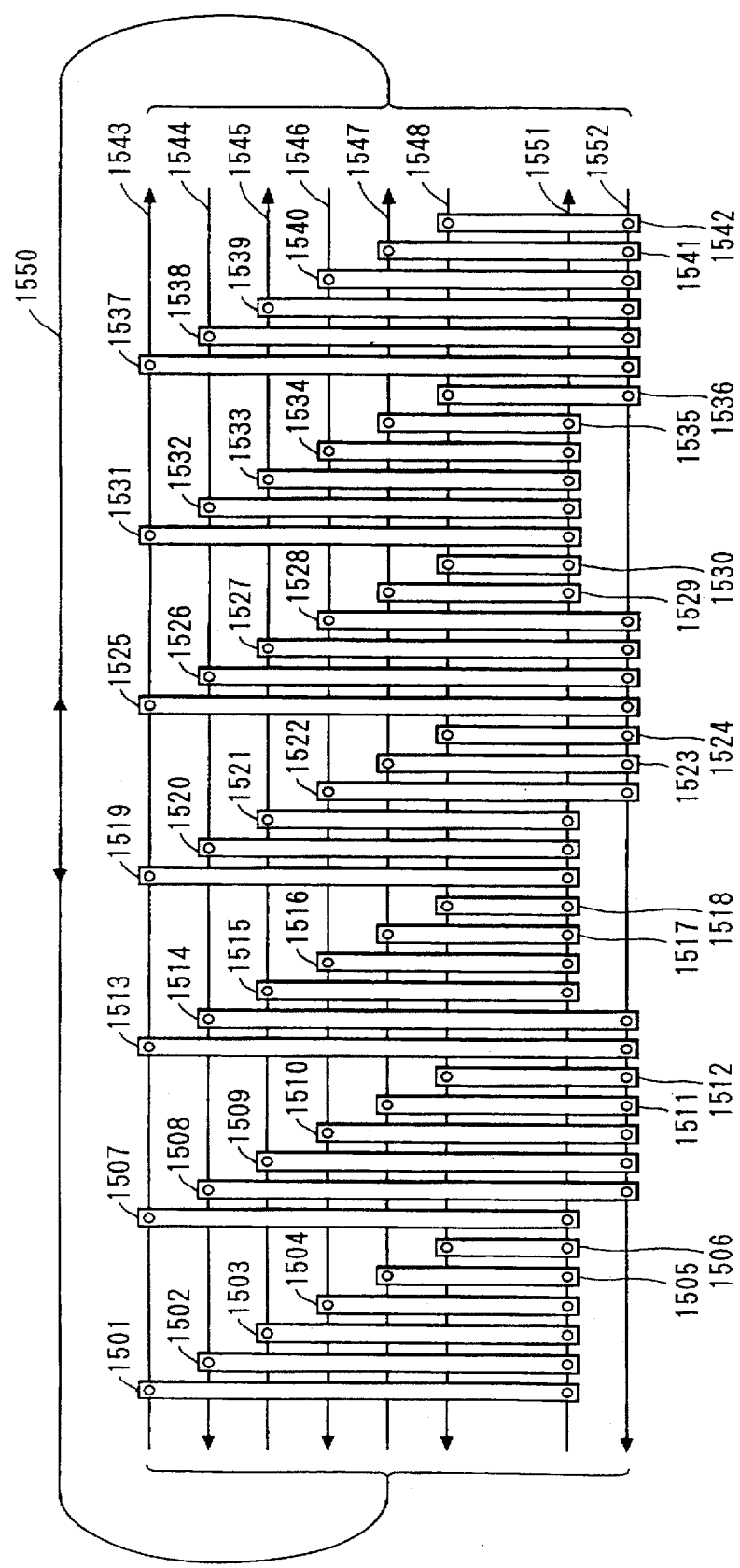
FIG. 20 is a schematic view showing the arrangement of a network according to the seventh embodiment of the present invention.

FIG. 20 shows the seventh embodiment of the present invention, and exemplifies a case wherein a channel 1551 of a wavelength $\lambda_7$ transmitted to the right and a channel 1552 of a wavelength $\lambda_8$ transmitted to the left are used as the first channel group in place of the first channel in the sixth embodiment. In this embodiment, the odd-numbered node groups are connected to the channel 1551 of the wavelength $\lambda_7$, and the even-numbered node groups are connected to the channel 1552 of the wavelength $\lambda_8$.

In this embodiment, since the wavelength $\lambda_7$ need not be used as channels having different directions in units of node groups unlike in the channel 1549 in the sixth embodiment, an erroneous operation of the receiving unit caused by scattering of optical signals having the same wavelength but different directions, which signals are generated when the filter A 559 insufficiently cuts off the wavelength $\lambda_7$, can be prevented.

In each of the above embodiments, at least a single channel in each of the first and second channels (groups) is set in each of subgroups to be a shared channel which is accessed by all nodes in the subgroup in each of the first to fifth embodiments, and at least one single channel in the first channel (group) is set in each of node groups to be a shared channel which is accessed by all the nodes in the node group in each of the sixth and seventh embodiments. With such arrangements, a loop-shaped transmission route which contains all the nodes in the subgroup is formed using at least some of the shared channels in each of the first to fifth embodiments, and a loop-shaped transmission route which contains at least all the nodes in the node group is formed in the sixth embodiment.

(Eighth Embodiment)

Figure 21:
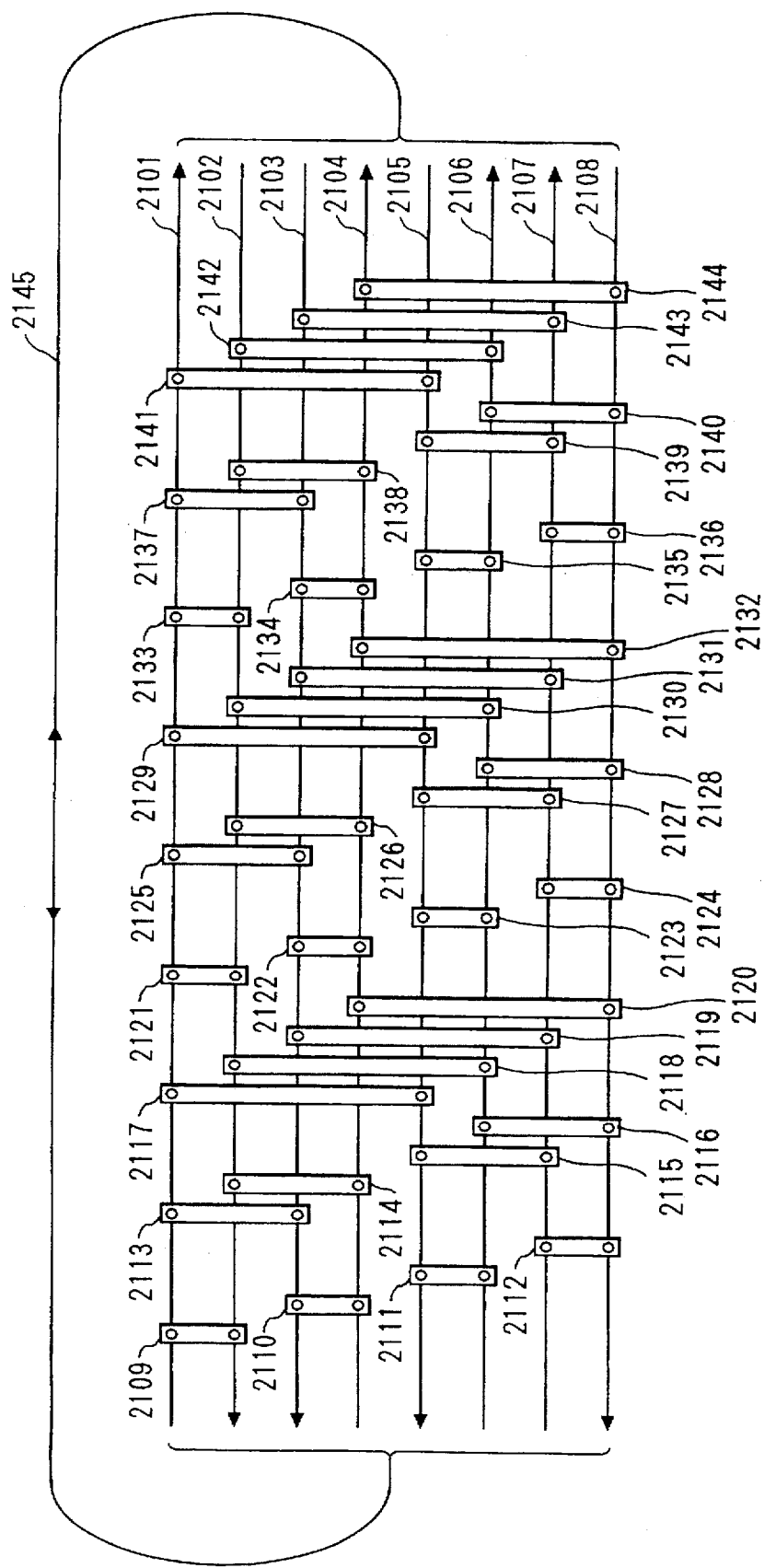
FIG. 21 is a schematic view showing the arrangement of a network according to the eighth embodiment of the present invention.

FIG. 21 shows the eighth embodiment of the present invention. In this embodiment, the total number of channels is eight, and these channels are divided into first and second channel groups depending on the transmission directions. The number of channels to be accessed by each node is two, and each node must access both the first and second channel groups. FIG. 21 shows only 36 nodes for the sake of simplicity. However, as will be described later, the number of nodes can be further increased.

Referring to FIG. 21, eight channels 2101 to 2108 are formed by wavelength multiplexing of eight wavelengths ($\lambda_1$ to $\lambda_8$) using a single-core optical fiber ring 2145 as a transmission medium. Of these channels, the channels 2101, 2104, 2106, and 2107 respectively use the wavelengths $\lambda_1$, $\lambda_4$, $\lambda_6$, and $\lambda_7$, and have a transmission direction from the left to the right, as indicated by an arrow in FIG. 21. These channels constitute the first channel group. On the other hand, the channels 2102, 2103, 2105, and 2108 respectively use the wavelengths $\lambda_2$, $\lambda_3$, $\lambda_5$, and $\lambda_8$, and have a transmission direction from the right to the left in FIG. 21. These channels constitute the second channel group.

Nodes 2109 to 2144 access channels indicated by marks ○ in FIG. 21 to perform transmission/reception. Each node accesses one channel each in the first and second channel groups.

The access relationship between the nodes and channels depends on the network arrangement known as a shuffle network as in the above-mentioned prior art (Japanese Laid-Open Patent Application No. 64-24539). More specifically, when channel numbers 000 to 111 (binary notation) are assigned in turn to the channels 2101 to 2108, a pair of channels in which only one bit of each channel number is different from each other are selected, and nodes which access the selected channels are set. In this embodiment, the nodes 2109 to 2112 access channels having different values at only units digit places, the nodes 2113 to 2116 access channels having different values at the 2's digit places, and the nodes 2117 to 2120 access channels having different values at only the $2^2$'s digit places. The nodes 2121 to 2144 are set by repeating the same procedure another two times. In this embodiment, the number of nodes is 36. However, the above-mentioned procedure may be repeated an arbitrary number of times to increase the number of nodes.

The transmission directions of the channels in this embodiment are determined on the basis of the above-mentioned binary channel numbers. More specifically, the number of "0"s or "1"s in the channel number is counted, and different transmission directions are set depending on whether the channel numbers have an odd or even number (including zero) of "0"s or "1"s. Since channel numbers 000, 011, 101, and 110 have zero or two "1"s, channels with these channel numbers are determined to be a first channel group. On the other hand, since channel numbers 001, 010, 100, and 111 have one or three "1"s, channels with these channel numbers are determined to be a second channel group. Different transmission directions are set in correspondence with these channel groups.

When the transmission directions of the channels are determined in this manner, and channels to be accessed by each node are determined as described above, an inter-node loop-shaped transmission route can be formed within only one cycle of channel access assignment, i.e., the nodes 2109 to 2120, or within the nodes 2121 to 2132 and the nodes 2133 to 2144 as repetitions of the cycle. Since the cycle is repeated, a loop-shaped transmission route can be formed between corresponding nodes in different cycles, e.g., between the nodes 2110 and 2122.

Figure 22:
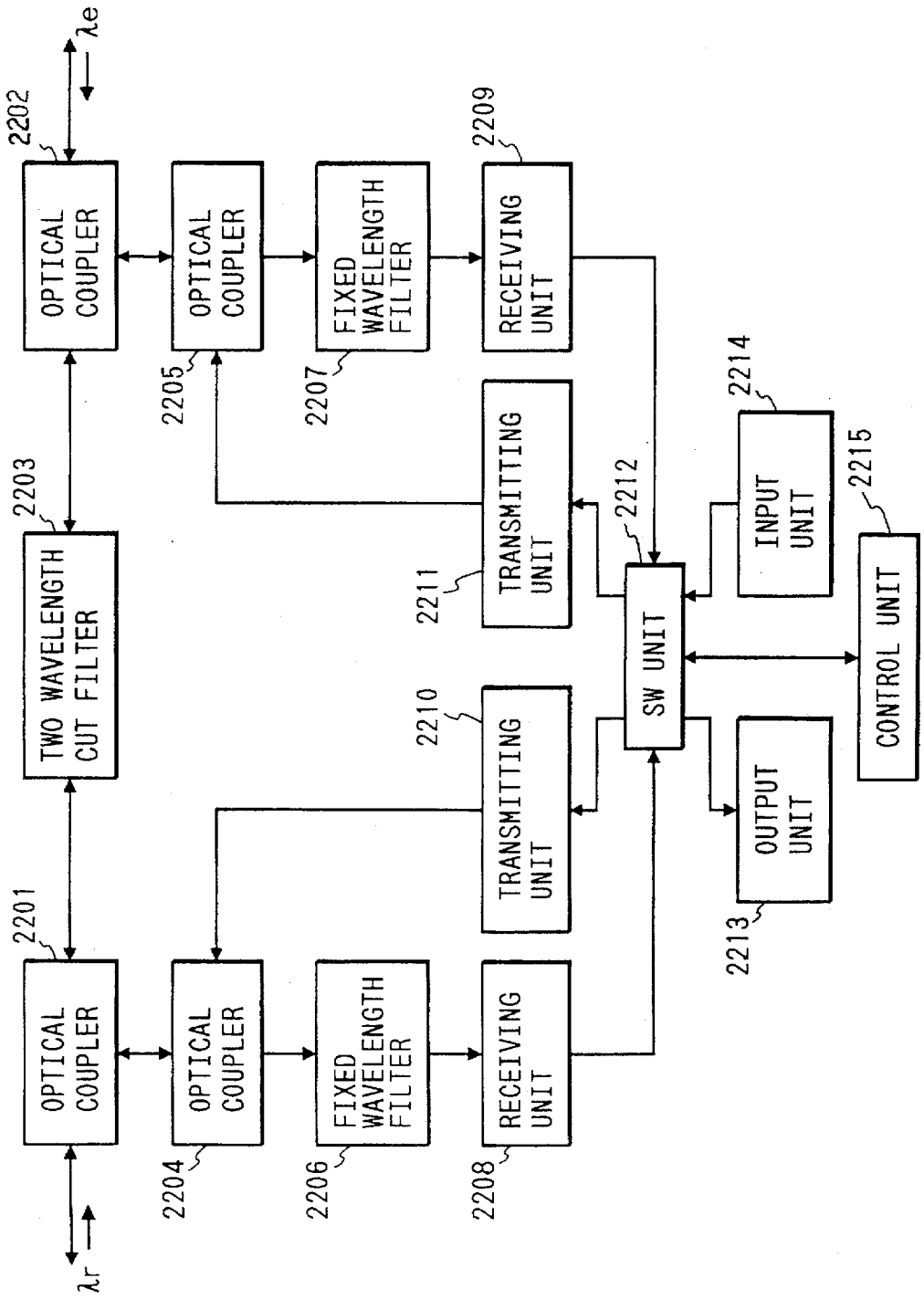
FIG. 22 is a block diagram showing the arrangement of a node used in the eighth embodiment.

FIG. 22 shows the arrangement of each node in this embodiment shown in FIG. 21, which arrangement is the same as that of the node shown in FIG. 6. In FIG. 22, a single-core optical fiber 2145 corresponds to that shown in FIG. 21.

An optical coupler 2201 divides an optical signal from the left and outputs the divided signal to a two-wavelength cut filter 2203 and an optical coupler 2204. Also, the optical coupler 2201 multiplexes optical signals from the two-wavelength cut filter 2203 and the optical coupler 2204 and outputs the multiplexed signals to the left. Similarly, an optical coupler 2202 divides an optical signal from the right and outputs the divided signal to the two-wavelength cut filter 2203 and an optical coupler 2205. Also, the optical coupler 2202 multiplexes optical signals from the two-wavelength cut filter 2203 and the optical coupler 2205, and outputs the multiplexed signals to the right.

The two-wavelength cut filter 2203 cuts off $\lambda_r$ and $\lambda_e$, as the wavelengths to be transmitted/received by the self node, of optical signals from the right and left, and passes other wavelengths. Note that r is one of 1, 4, 6, and 7, and e is one of 2, 3, 5, and 8.

The optical coupler 2204 outputs an optical signal from the optical coupler 2201 to a fixed wavelength filter 2206, and outputs an optical signal output from a transmitting unit 2210 to the optical coupler 2201. Similarly, the optical coupler 2205 outputs an optical signal from the optical coupler 2202 to a fixed wavelength filter 2207, and outputs an optical signal output from a transmitting unit 2211 to the optical coupler 2202.

The fixed wavelength filter 2206 passes only the wavelength $\lambda_r$ to be transmitted to the right of the transmission/reception wavelengths of the self node, and cuts off other wavelengths. Similarly, the fixed wavelength filter 2207 passes only the wavelength $\lambda_e$ to be transmitted to the left of the transmission/reception wavelengths of the self node, and cuts off other wavelengths.

Receiving units 2208 and 2209 respectively receive optical signals from the fixed wavelength filters 2206 and 2207, convert the received signals into electrical signals, and output the electrical signals.

The transmitting units 2210 and 2211 respectively convert electrical signals output from a switch unit 2212 into optical signals of predetermined wavelengths $\lambda_e$ and $\lambda_r$, and output the converted optical signals.

The switch unit 2212 outputs electrical signals from the receiving units 2208 and 2209 and an input unit 2214 to the transmitting unit 2210, the transmitting unit 2211 or an output unit 2213 in accordance with an instruction from a control unit 2215.

The output unit 2213 sends a packet addressed to the self node and output from the switch unit 2212 to an external device (not shown) such as a terminal connected to the node. The input unit 2214 sends a packet to be transmitted from an external device to the switch unit 2212.

The operation of this embodiment will be described below with reference to the accompanying drawings.

Figure 1:
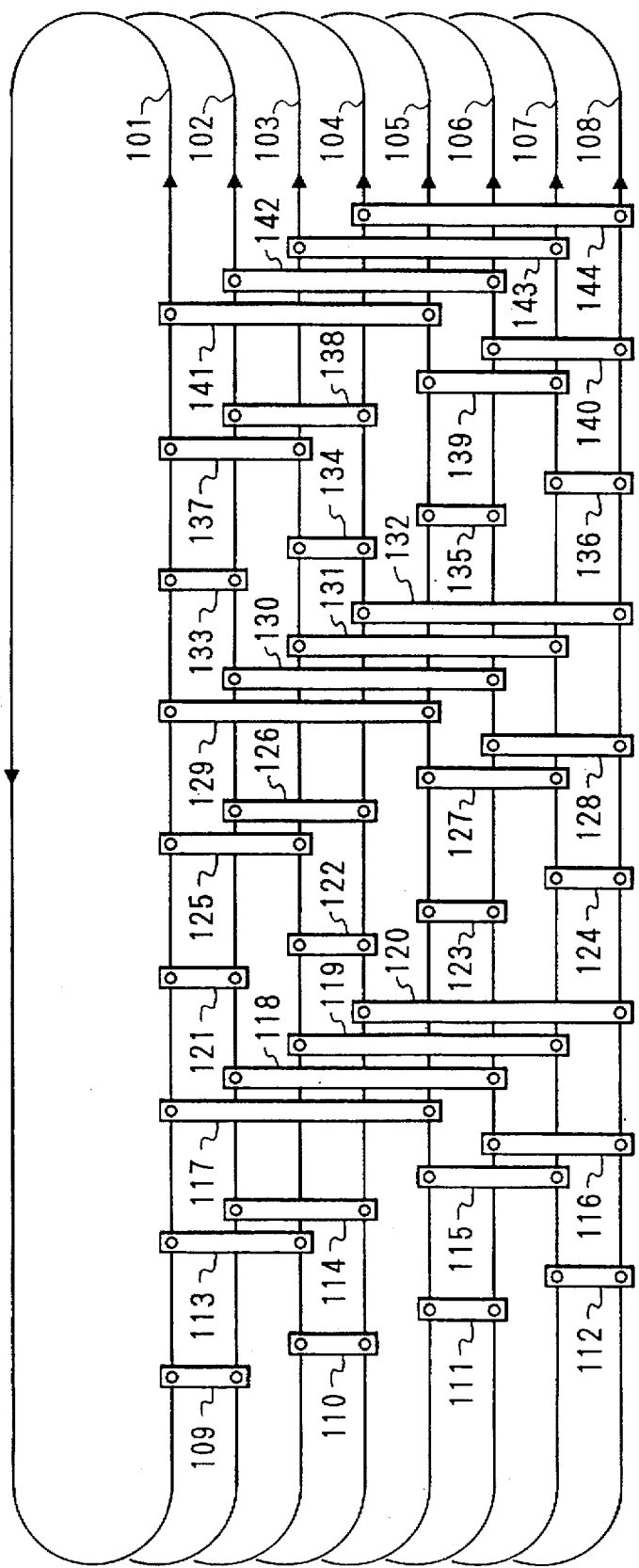
FIG. 1 is a schematic view showing the arrangement of a network of the first prior art.
Figure 2:
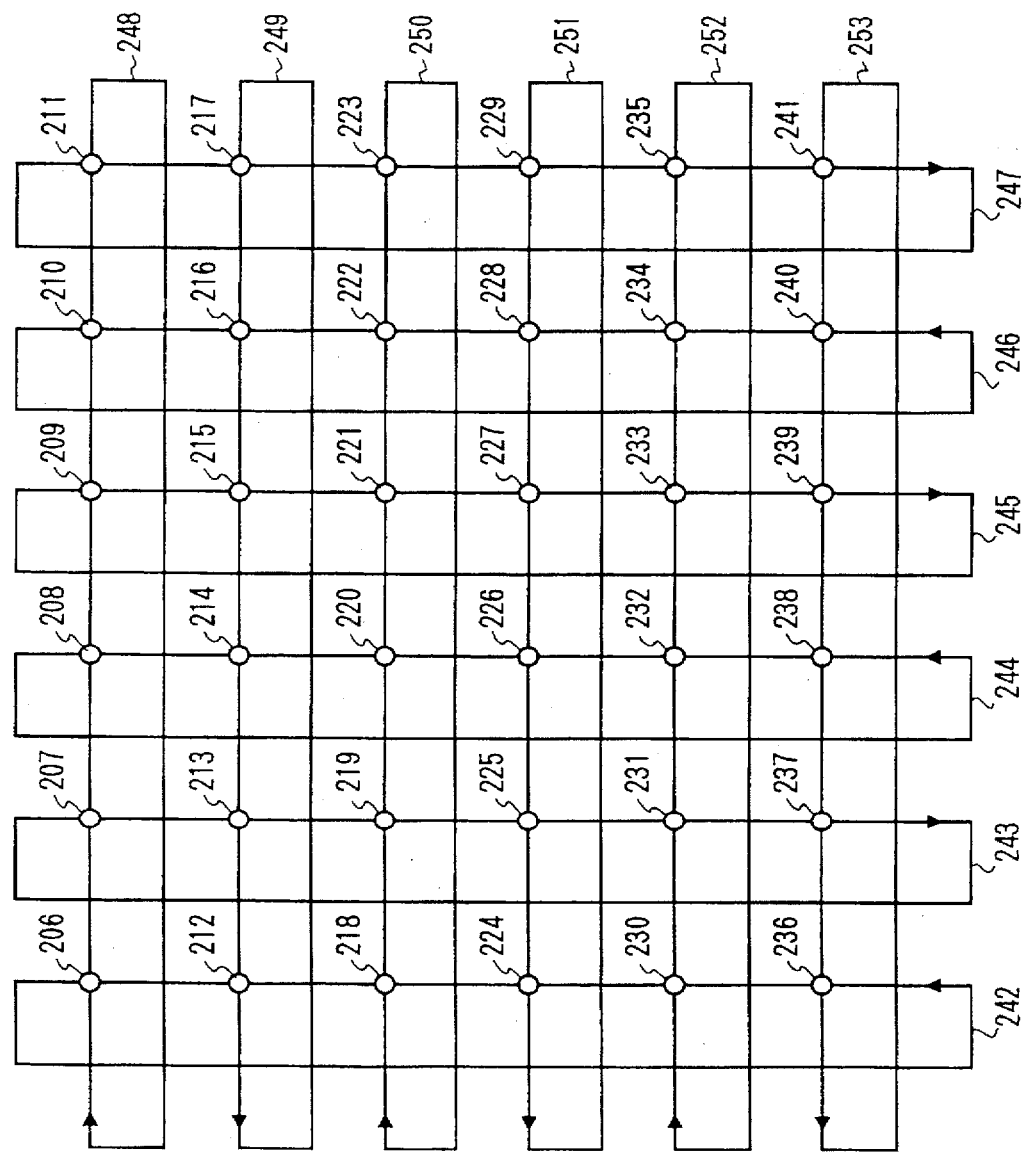
FIG. 2 is a schematic view showing the arrangement of a network of the second prior art.
Figure 3:
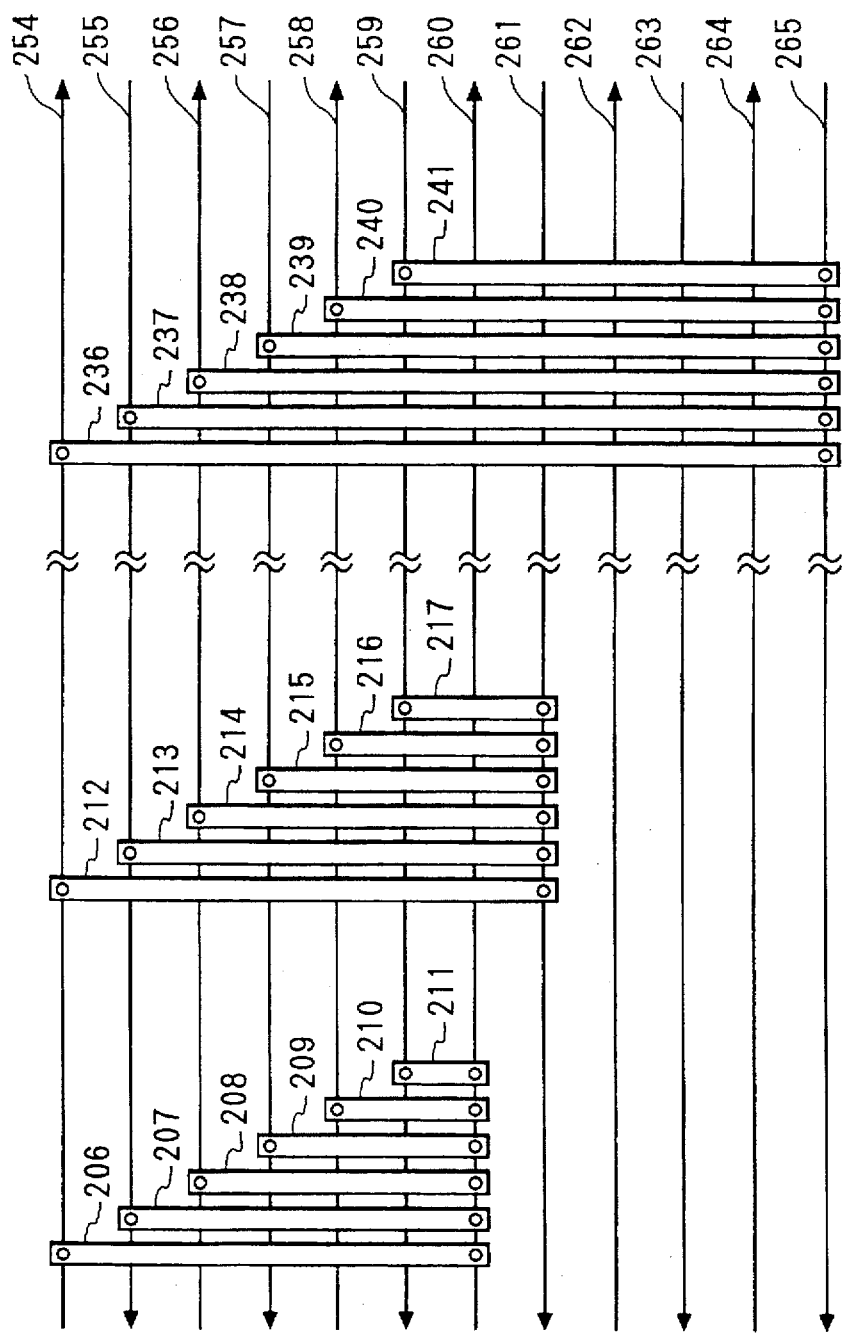
FIG. 3 is a schematic view showing the arrangement of a network of the third prior art.
Figure 4:
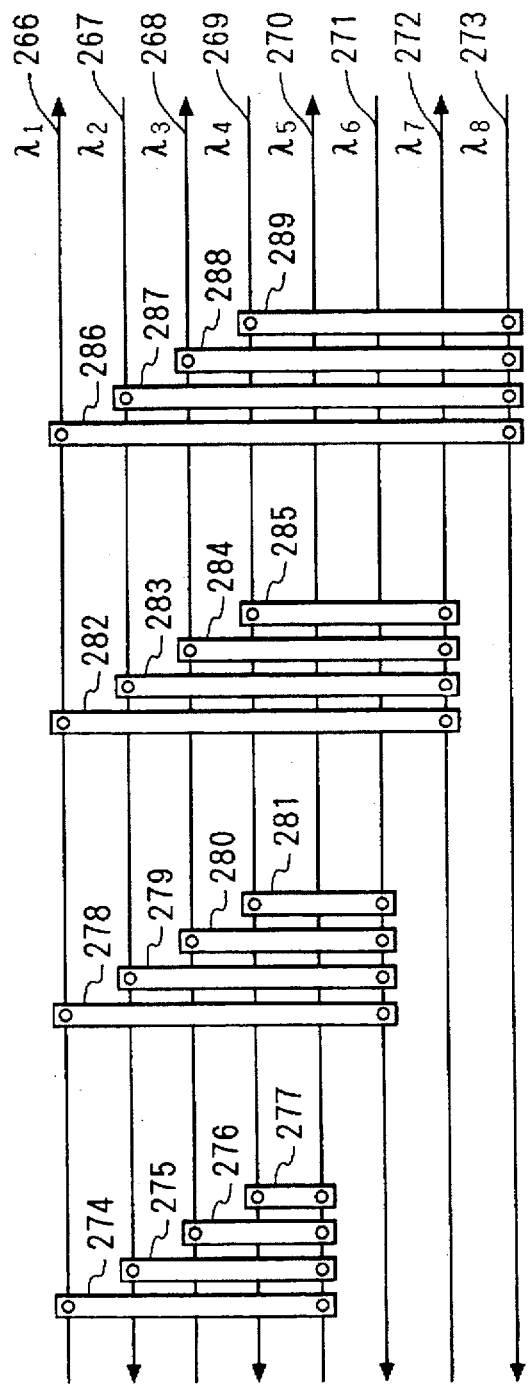
FIG. 4 is a schematic view showing the arrangement obtained when a wavelength-multiplexed system is adopted in the third prior art.

A case will be exemplified below in correspondence with an example presented in the description of the prior art shown in FIG. 1, wherein the transmitting node is the node 2109 in FIG. 21, and the receiving node is the node 2110 adjacent to the node 2109.

The transmitting node 2109 has an arrangement shown in FIG. 22. In this node, a wavelength corresponding to $\lambda_r$ is $\lambda_1$, and a wavelength corresponding to $\lambda_e$ is $\lambda_2$. When data to be transmitted is input from the input unit 2214, the control unit 2215 determines a transmission route on the basis of the addresses of the self node and the destination node, and determines a wavelength to be transmitted from the self node ($\lambda_1$ in this case). In addition, the control unit 2215 adds a destination address 2301 and routing (routine) information 2302 to the head portion of a packet, as shown in FIG. 23A. In the case of this example, the destination address is a unique address in the network, which address represents the receiving node 2110. The routing information is information for designating a channel to be selected so as to send a packet upon regeneration in each intermediate node. In the case of this example, the routing information is information for selecting a leftward channel in the first (and only) intermediate node. As a routing algorithm for determining a transmission route, a relatively simple one can be adopted since the access pattern of nodes is regular, as described above. An electrical signal, which is input to the transmitting unit 2211 via the switch unit 2212 according to an instruction from the control unit 2215, is converted into an optical signal of the wavelength $\lambda_1$, and is sequentially output to the right onto the optical fiber 2145 via the optical couplers 2205 and 2202.

The optical signal of the wavelength $\lambda_1$ output from the node 2109 in this manner reaches the node 2110 together with optical signals of other wavelengths. However, since the node 2110 is not connected to the channel 2101 which uses the wavelength $\lambda_1$, the optical signal of the wavelength $\lambda_1$ passes through the node 2110 (such a node will be referred to as a through node hereinafter). More specifically, the optical signal of the wavelength $\lambda_1$ passes through the optical coupler 2201, the two-wavelength cut filter 2203, and the optical coupler 2202 in turn, and is then sent to the next node. The next nodes 2111 and 2212 are similarly through nodes.

The next node 2113 is an intermediate node which accesses the channel 2101 and performs regeneration. The optical signals input from the left to the node 2113 are divided by the optical coupler 2201 and the divided signals are output to the two-wavelength cut filter 2203 and the optical coupler 2204. In this case, of the optical signals input to the two-wavelength cut filter 2203, the optical signal of the wavelength $\lambda_1$ is cut off by the filter 2203. On the other hand, of the optical signals input to the optical coupler 2204, only the optical signal of the wavelength $\lambda_1$ passes through the fixed wavelength filter 2206 and is input to the receiving unit 2208. The control unit 2215 analyzes the destination address and routing information of the packet, which is converted into an electrical signal by the receiving unit 2208, and determines that the packet is to be sent onto a leftward transmission path. Therefore, the packet is sent from the switch unit 2212 to the transmitting unit 2210, and is converted into an optical signal of the wavelength $\lambda_3$. The converted optical signal is then output to the left neighboring node via the optical couplers 2204 and 2201.

The next nodes 2112 and 2111 are through nodes, and the optical signal of the wavelength $\lambda_3$ passing through these nodes reaches the node 2110 as the receiving node. The optical signal is input to the receiving unit 2209 via the optical couplers 2202 and 2205 and the fixed wavelength filter 2207, and is converted into an electrical signal. It is then determined by analyzing the destination address of the packet that the packet is addressed to the self node. Therefore, the packet is output from the switch unit 2212 to the output unit 2213, thus ending a series of communication processing.

In this embodiment and the above-mentioned embodiments, the transmission route is determined by the transmitting node. Alternatively, the transmitting node may add only a destination address to a packet, as shown in FIG. 23B, and an intermediate node may determine a transmission channel upon regeneration on the basis of the self node address and the destination address.

As described above, transmission from the node 2109 to the node 2110 can be realized by only regeneration in the single intermediate node 2113, and the transmission route length can be greatly shortened as compared to the above-mentioned prior art. Depending on a combination of transmitting and receiving nodes, the transmission distance in the network of the present invention may become larger than that in the prior art. However, the transmission distance never exceeds one round of the transmission path, and the effect of this embodiment becomes larger in a larger-scale network with a larger number of nodes.

In this embodiment as well, since each node regularly accesses the first and second channel groups having opposite transmission directions, it can form a very short loop-shaped transmission route via a plurality of channels. For example, as for the node 2121, a loop-shaped transmission route in which a signal propagates to the node 2133 via the channel 2101, changes the channel to the channel 2102 in the node 2133, and returns to the node 2121, a loop-shaped transmission route in which a signal propagates to the node 2125 via the channel 2101, switches the channel to the channel 2103 in the node 2125, switches the channel to the channel 2104 in the node 2122, switches the channel to the channel 2102 in the node 2126, and returns to the node 2121, and the like are available. Since these loop-shaped transmission routes can be set to be very short, the throughput can be improved, and the transmission capacity can be increased.

(Ninth Embodiment)

Figure 24:
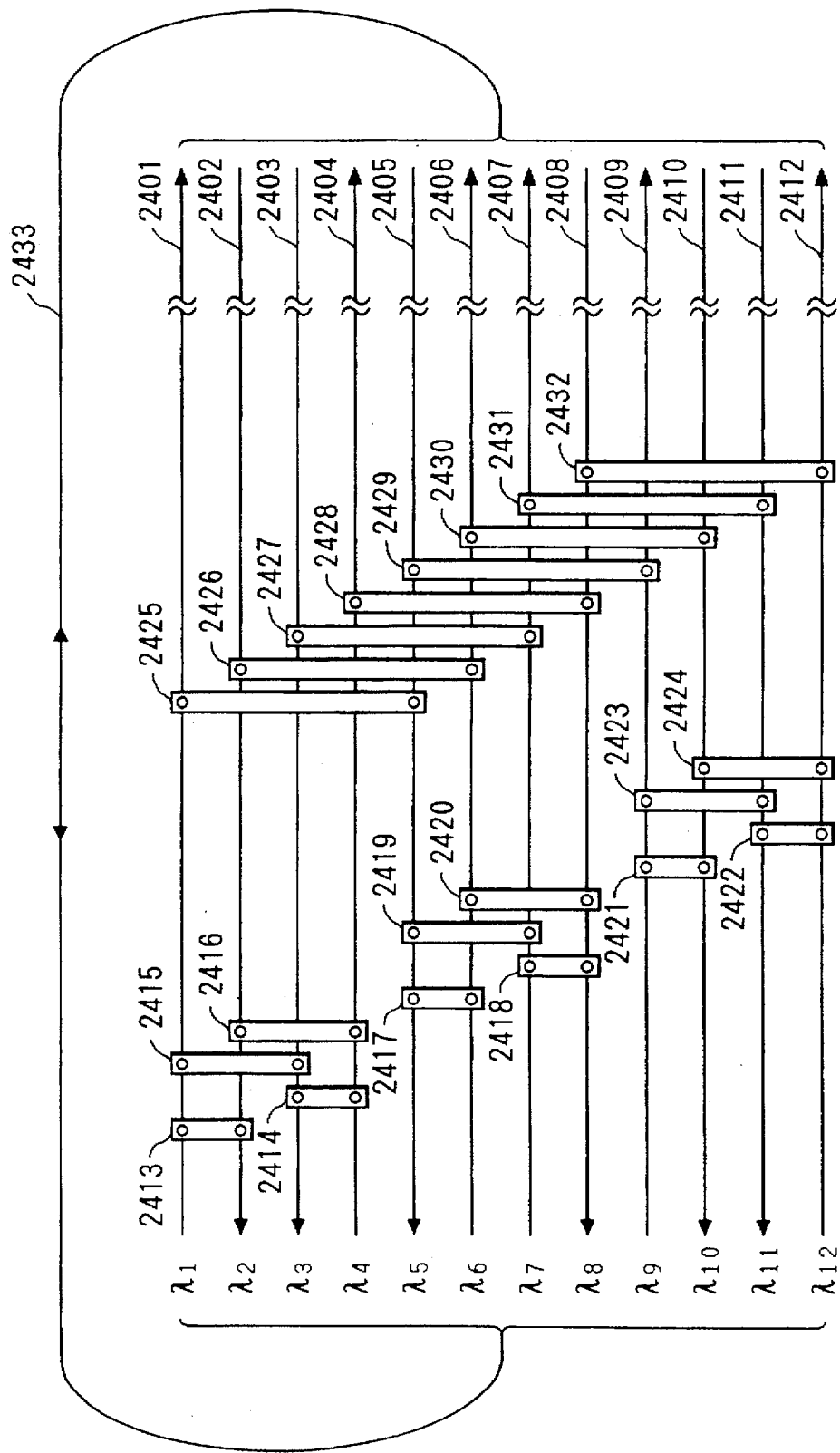
FIG. 24 is a schematic view showing the arrangement of a network according to the ninth embodiment of the present invention.

FIG. 24 shows the arrangement in the ninth embodiment of the present invention. In the arrangement of this embodiment, the total number of channels is 12, the number of channels of each of the first and second channel groups is 6, and the number of channels to be accessed by each node is 2.

Referring to FIG. 24, channels 2401 to 2412 are formed by wavelength multiplexing of 12 wavelengths using an optical fiber 2433 as a transmission medium. Also, nodes 2413 to 2432 have arrangements basically the same as those shown in FIGS. 6 and 22.

In this embodiment, the 12 channels are considered as three groups each including four channels, two-digit binary channel numbers are assigned to the channels 2401 to 2404, and two-digit binary channel numbers are similarly assigned to the channels 2405 to 2408. At this time, in order to distinguish the channel numbers from those of the channels 2401 to 2404, "1" is added to the head of each of the channel numbers of the channels 2405 to 2408. Furthermore, two-digit binary channel numbers are assigned to the channels 2409 to 2412, and "11" is added to the head of each of the channel numbers to distinguish them from other channel numbers (FIG. 25). At this time, channels to be accessed by each node are assigned, so that a node accesses channels with channel numbers having a different value only in one of the last digit and the second digit from the last (the nodes 2413 to 2424). Thereafter, "0" is added to a blank digit ,and channels are assigned so that a node accesses channels with channel numbers having a different value only in one of the third digit from the last and the fourth digit from the last, and it is for example, determined that the node 2425 accesses $\lambda_1$ and $\lambda_5$. Thereafter, channels to be accessed by the nodes 2426 to 2432 are determined. The transmission directions of the channels are determined depending on whether the channel numbers have an odd or even number of "0"s or "1"s as in the eighth embodiment.

When the channels are determined as described above, communications among all nodes between the nodes 2413 and 2432 are guaranteed, and a loop-shaped transmission route can be formed.

In this embodiment, two-digit binary numbers, i.e., "00", "01", "10", and "11" are assigned to the channel numbers as one set, and two-digit binary numbers, i.e., "00", "01", and "11" are added to the heads of the channel numbers. However, two-digit binary numbers to be added to the heads of the channel numbers are not limited to these. In two-digit binary numbers to be added to the heads of the channel numbers, when pairs having different values at single digit places, e.g., (00,01) and (01,11) are formed, an identical number, e.g., "01" exists. A channel having the channel number, the head of which is added with this identical number, has a larger number of nodes to be accessed than those of the remaining channels. For this reason, a two-digit binary number to be added may be determined in consideration of a transmission capacity required in units of nodes, and the characteristics of the channels. For example, assume that "00", "01", and "10" are selected as a set of two-digit binary numbers to be added to the heads of the channel numbers. When pairs having different values at only single digit places are formed, "00" is identical. A channel having the channel number, the head of which is added with "00", has a larger number of nodes to be accessed than those of the remaining channels. In this embodiment, the channel numbers are assigned with two-digit binary numbers as one set. One-digit binary numbers, i.e., "0" and "1" are considered as one set, i.e., two channels are considered as one set, and its channel number is assigned by similarly adding a two-digit binary number to the head of the set. This is effective when the number of channels is 6. When the number of channels is a multiple of 8, three-digit binary numbers are considered as one set. The binary number to be added to the head of the set is not limited to two digits. For example, when the number of channels is 20, two-digit binary numbers are considered as one set as in this embodiment, and a three-digit binary number is added to the head of the set. Also at this time, in a two-digit binary number to be added to the head of the channel number, a channel having the channel number, the head of which is added with an identical number obtained when pairs having different values at only single digit positions are formed, has a larger number of nodes to be accessed than those of the remaining channels. For example, when "000", "001", "010", "011", and "100" are to be added to the heads of the channel numbers, pairs having a different value at only single digit places are (000,001), (000,010), (000,100), (001,011), and (010,011). "000" is identical in three groups. For this reason, a channel having the channel number, the head of which is added with "000", is connected to the largest number of nodes.

(10th Embodiment)

In this embodiment, the total number of channels is 6, and these channels are divided into a first channel group including three channels for rightward transmission and a second channel group including three channels for leftward transmission.

Figure 26:
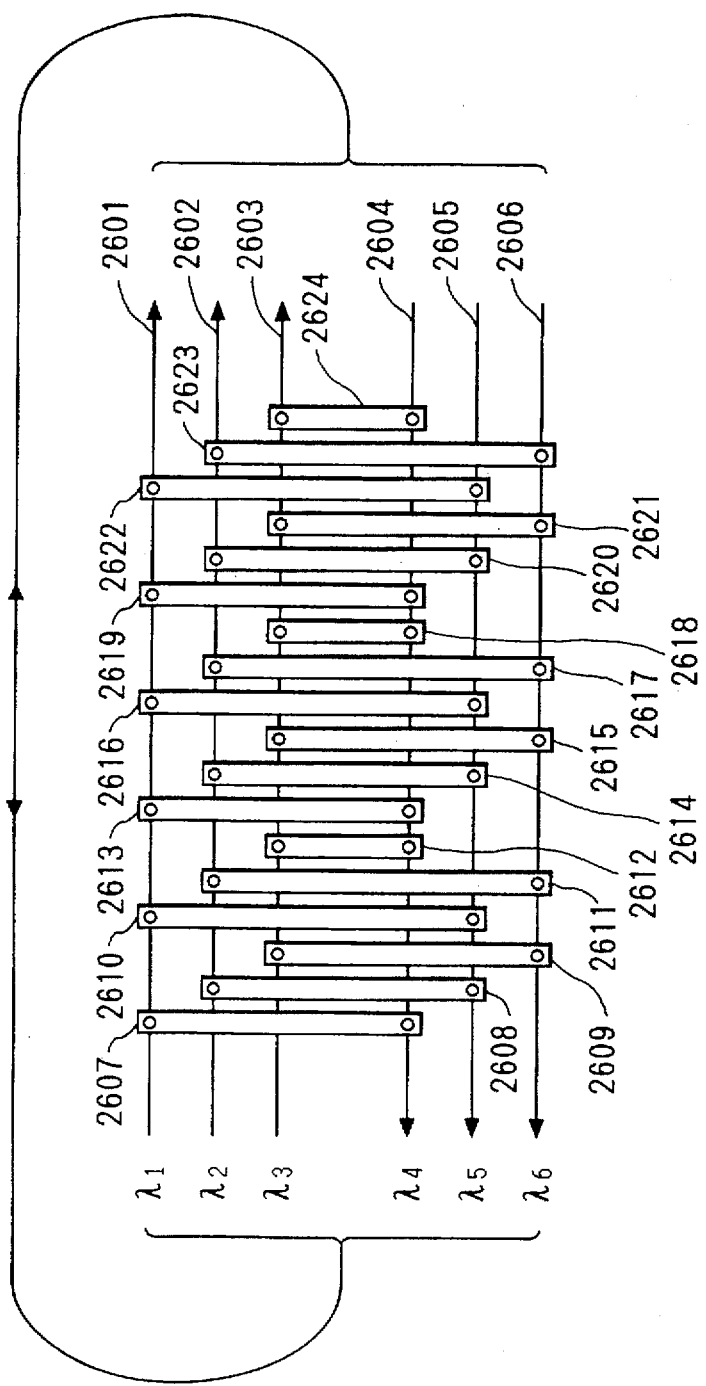
FIG. 26 is a schematic view showing the arrangement of a network according to the 10th embodiment of the present invention.

FIG. 26 shows the arrangement of this embodiment. Channels 2601, 2602, and 2603 constitute the first channel group, and respectively correspond to wavelengths $\lambda_1$, $\lambda_2$, and $\lambda_3$. Channels 2604, 2605, and 2606 constitute the second channel group, and respectively correspond to wavelengths $\lambda_4$, $\lambda_5$, and $\lambda_6$. Nodes form node groups in units of 6 nodes (equal to the number of channels). Each node accesses channels one each of the first and second channel groups. A method of determining channels to be accessed is as follows. The first node in each node group accesses the first channels in the first and second channel groups. The second node accesses the second channels in the first and second channel groups. The third node accesses the third channels in the first and second channel groups. The fourth node accesses the first channel in the first channel group and second channel in the second channel group. The fifth node accesses the second channel in the first channel group and the third channel in the second channel group. The sixth node accesses the third channel in the first channel group and the first channel in the second channel group. The same operation is performed in each node group.

More specifically, when the total number of channels is 2N, 2N channels are divided into a first channel group including N channels for rightward (leftward) transmission, and a second channel group including N channels for leftward (rightward) transmission. In a node group consisting of 2N nodes, the p-th node ($1 \leq p \leq N$, p is an integer) accesses the p-th channels in the first and second channel groups; the q-th node ($N+1 \leq q \leq 2N-1$, q is an integer) accesses the (q-N)-th channel in the first channel group and the (q-N+1)-th channel in the second channel group; and the 2N-th node accesses the N-th channel in the first channel group and the first channel in the second channel group.

In this manner, in each node group, a loop-shaped transmission route which covers all nodes of the node group can be formed. More specifically, in this embodiment, for example, a loop-shaped transmission route in which a signal propagates from the node 2607 to the node 2610 at the wavelength $\lambda_1$, propagates therefrom to the node 2608 at the wavelength $\lambda_5$, propagates therefrom to the node 2611 at the wavelength $\lambda_2$, propagates therefrom to the node 2609 at the wavelength $\lambda_6$, propagates therefrom to the node 2612 at the wavelength $\lambda_3$, and returns to the node 2607 at the wavelength $\lambda_4$, is formed, and transmission in the node group is guaranteed.

(Another Embodiment)

In each of the above embodiments, as an optical coupler of each node, an element for simply dividing or multiplexing optical signals has been exemplified. Alternatively, when an optical wavelength multiplexer/demultiplexer, a wavelength selection switch, or the like, which can separate only a specific wavelength may be used, wavelength filters after the optical coupler can be omitted.

In each of the above embodiment, a plurality of channels are formed by wavelength multiplexing using an optical fiber. However, multiplexing is not limited to wavelength multiplexing. For example, a spatial multiplexing system using a bundle of a plurality of cables may be adopted.

Also, a signal is not limited to an optical signal but an electrical signal or the like may be used. In this case, when signals are multiplexed by, e.g., frequency multiplexing, nodes and connection means can be connected using frequency filters, and the like.

In each of the above embodiments, separate transmission media may be used without multiplexing a plurality of channels. In this disclosure, the term "transmission direction" does not mean a wiring direction when the network of the present invention is actually set, but means a logical direction when the arrangement of the network is one-dimensionally illustrated as in FIG. 5. Therefore, when separate transmission media are used without multiplexing a plurality of channels, a plurality of channels and a plurality of nodes may satisfy the access relationship of the network of the present invention.

What is claimed is:

1. A network constituted by connecting a plurality of nodes, comprising:

a loop-shaped transmission path in which a plurality of channels forming a loop-shaped first transmission route are multiplexed;

a plurality of nodes which are connected to said transmission path; and connection means connected to said transmission path, wherein each of said nodes belongs to a respective one of a plurality of node groups each constituted by a plurality of said nodes, each of said node groups having two opposite ends and said connection means being arranged at both opposite ends of each of said node groups, wherein, in each said node group, each of said nodes can access a common channel and a channel other than said common channel from among said plurality of channels as an accessed channel for outputting a signal thereto, but cannot access all of said plurality of channels, wherein each of said nodes can output a signal inputted from an accessed channel to the same accessed channel from which the signal is input, and wherein, in each said node group, a signal transmitted through said common channel and input to said connection means at one end of the node group is returned by said connection means and input to said connection means at the other end of the node group, and, in each said node group, each of said nodes is connected to a loop-shaped second transmission route formed of said common channel and said connection means at both ends of the node group.

2. A network according to claim 1, wherein nodes located at both opposite ends of each of said node groups function as said connection means.

3. A network according to claim 1, wherein the connection means of one of said node groups does not substantially output a signal, which was input through said common channel and returned by said connection means, to another node group.

4. A network according to claim 1, wherein one of said first and second loop-shaped transmission routes corresponds to a horizontal loop-shaped transmission route of the Manhattan street transfer network and the other of said first and second loop-shaped transmission routes corresponds to a vertical loop-shaped transmission route of the Manhattan street transfer network.

5. A network constituted by connecting a plurality of nodes, comprising:

a loop-shaped transmission path constituted by multiplexing a plurality of loop-shaped transmission channels, said plurality of channels being divided into a first channel group consisting of at least one channel having a first transmission direction, a second channel group consisting of at least one channel having a second transmission direction opposite to the first transmission direction, and a third channel group consisting of at least one channel not belonging to said first and second channel groups;

a plurality of nodes each of which accesses said first channel group and said third channel group;

connection means for outputting a signal inputted thereto from a channel belonging to said first channel group to a channel belonging to said second channel group, and for outputting a signal inputted thereto from a channel belonging to said second channel group to a channel belonging to said first channel group; and connection means for outputting a signal inputted thereto from a channel belonging to said first channel group to a channel belonging to said second channel group, and for outputting a signal inputted thereto from a channel belonging to said second channel group to a channel belonging to said first channel group, wherein a node group is constituted by a plurality of said nodes, said node group having two opposite ends, said connection means is arranged at both opposite ends of said node group, and all of said nodes in said node group are connected to a loop-shaped transmission route formed of said connection means at both opposite ends of said node group and said channels of said first and second channel groups between said opposite ends.

6. A network according to claim 5, wherein said node group is a first node group, and the network further includes a second node group comprising a plurality of nodes each of which accesses at least one channel of said second channel group and at least one channel of said third channel group.

7. A network according to claim 5, wherein said third channel group consists of at least one channel having the first transmission direction and at least one channel having the second transmission direction.

8. A network according to claim 5, wherein at least one node of said node group can access each channel in said third channel group.

9. A network according to claim 8, wherein a number of channels in each of said first channel group and said second channel group is M (=integer), and the connection means for connecting said M channels in said first channel group and said M channels in said second channel group in a one-to-one manner is provided for each of M subgroups.

10. A network according to claim 5, wherein said connection means includes stop means for stopping signals transmitted from the respective channels of said first channel group from being transmitted through the channels of said first channel group beyond said connection means and for stopping signals transmitted from the respective channels of said second channel group from being transmitted through the channels of said second channel group beyond said connection means.

11. A network constituted by connecting a plurality of nodes, comprising:

a loop-shaped transmission path constituted by multiplexing a plurality of loop-shaped transmission channels, said plurality of channels being divided into a first channel group consisting of at least one channel having a first transmission direction and a second channel group consisting of at least one channel not belonging to said first channel group; and a first node group comprising a plurality of nodes each of which accesses said first channel group and said second channel group, wherein said first node group is divided into a plurality of subgroups each of which includes a plurality of nodes, each said subgroup having two opposite ends and including a first one of said nodes at one end of said subgroup and a second one of said nodes at the other end of said subgroup, each of said first and second nodes of each subgroup accessing a first common channel among the channels of said first channel group and a second common channel among the channels of said second channel group, the second common channel having a second transmission direction opposite to a transmission direction of the first common channel, and all of said nodes in each subgroup being connected to a loop-shaped transmission route formed of said first and second nodes and said first and second channels.

12. A network according to claim 11, wherein the nodes belonging to one of the subgroups one subgroup and the nodes belonging to another of the subgroups are alternatively connected to said loop-shaped transmission path along said loop-shaped transmission path.

13. A network according to claim 11, wherein no two nodes in each subgroup accesses the same respective channel in said second channel group other than said common channel.

14. A network constituted by connecting a plurality of nodes, comprising:

a loop-shaped transmission path constituted by multiplexing a plurality of loop-shaped transmission channels, said plurality of channels being divided into a first channel group consisting of at least one channel having a first transmission direction, and a second channel group consisting of at least one channel having a second transmission direction opposite to the first transmission direction; and a plurality of nodes each of which accesses both said first and second channel groups, wherein when N is an integer, a number of channels in each of said first and second channel groups is N, and said plurality of nodes are grouped into node groups each consisting of 2N nodes, and wherein in each of the node groups, a p-th node accesses a p-th channel in said first channel group and a p-th channel in said second channel group, a q-th node accesses a (q-N)-th channel in said first channel group and a (q-N+1)-th channel in said second channel group, and a 2N-th node accesses a N-th channel in said first channel group and a first channel in said second channel group, where p and q are integers, and the following condition is satisfied;

$1 \leq p \leq N$, and $N+1 \leq q \leq 2N-1$.

15. A network constituted by connecting a plurality of nodes, comprising:

a loop-shaped transmission path in which a first plurality of channels forming a loop-shaped first transmission route are multiplexed;

a plurality of nodes which are connected to said transmission path; and connection means connected to said transmission path, wherein each of said nodes belongs to a respective one of a plurality of node groups each constituted by a plurality of said nodes, each of said node groups having two opposite ends and said connection means being arranged at both opposite ends of each of said node groups, wherein, in each said node group, each of said nodes can access any of a second plurality of channels from among said first plurality of channels as an accessed channel for outputting a signal thereto, the second plurality being less than the first plurality, wherein each of said nodes can output a signal inputted from an accessed channel to the same accessed channel from which the signal is input, and wherein, in each said node group, a signal input to said connection means at one end of the node group is returned by said connection means and input to said connection means at the other end of the node group, and, in each said node group, a third plurality of channels from among the second plurality of channels is selected such that each of said nodes is connected to a loop-shaped second transmission route formed of said connection means at both ends of the node group.

16. A network according to claim 15, wherein nodes located at both opposite ends of each of said node groups function as said connection means.

17. A network according to claim 15, wherein the connection means of one of said node groups does not substantially output a signal, which was input through one of said second plurality of channels and returned by said connection means, to another node group.

18. A network according to claim 15, wherein one of said first and second loop-shaped transmission routes corresponds to a horizontal loop-shaped transmission route of the Manhattan street transfer network and the other of said first and second loop-shaped transmission routes corresponds to a vertical loop-shaped transmission route of the Manhattan street transfer network.

* * * * *

UNITED STATES PATENT AND TRADEMARK OFFICE
CERTIFICATE OF CORRECTION

PATENT NO. : 5,742,585

DATED : April 21, 1998

INVENTOR(S) : MITSURU YAMAMOTO, ET AL.

It is certified that error appears in the above-identified patent and that said Letters Patent is hereby corrected as shown below:

On the title page,

<u>AT [56] REFERENCES CITED</u>

<u>U.S. PATENT DOCUMENTS</u>

"4,965,790  10/1990  Nishimo et al." should read
--4,965,790  10/1990  Nishino et al. and
"5,307,535  5/1994  Yamashita et al." should read
--5,307,353  4/1994  Yamashita et al.--.

<u>COLUMN 6</u>

Line 18, delete "82 m," and insert --$\mu$m, --.

<u>COLUMN 9</u>

Line 11, "$\lambda_2$" should read --$\lambda_1$--.

<u>COLUMN 39</u>

Line 40, "satisfied;" should read --satisfied:--.

Signed and Sealed this

Twenty-fourth Day of November, 1998

Attest:

*Attesting Officer*

BRUCE LEHMAN

*Commissioner of Patents and Trademarks*